US012640994B2

(12) United States Patent
Nandy et al.

(10) Patent No.: US 12,640,994 B2
(45) Date of Patent: May 26, 2026

(54) MACHINE LEARNING CLASSIFICATION OF ENCRYPTED NETWORK TRAFFIC

(71) Applicant: Solana Networks Inc., Nepean (CA)

(72) Inventors: Biswajit Nandy, Ottawa (CA); Nabil Seddigh, Ottawa (CA); Donald William Arthur Bennett, Carleton Place (CA); Jingyi Shen, Ottawa (CA); Manjender Nir, Ottawa (CA)

(73) Assignee: Solana Networks Inc., Nepean (CA)

( * ) Notice: Subject to any disclaimer, the term of this patent is extended or adjusted under 35 U.S.C. 154(b) by 0 days.

(21) Appl. No.: 18/622,928

(22) Filed: Mar. 30, 2024

(65) Prior Publication Data

US 2024/0356813 A1 Oct. 24, 2024

(30) Foreign Application Priority Data

Apr. 16, 2023 (CA) ...................................... 3197148

(51) Int. Cl.
*G06F 15/173* (2006.01)
*G06N 3/126* (2023.01)
*H04L 41/16* (2022.01)
(52) U.S. Cl.
CPC ............. *H04L 41/16* (2013.01); *G06N 3/126* (2013.01)
(58) Field of Classification Search
CPC ............................. H04L 41/16; H04L 43/026
See application file for complete search history.

(56) References Cited

U.S. PATENT DOCUMENTS 8,539,221 B2 * 9/2013 Tremblay ............ H04L 63/0428
706/46
10,084,712 B1 9/2018 Li et al.
11,070,458 B2 7/2021 Wong et al.
11,201,877 B2 * 12/2021 Bartos ...................... G06N 3/04
11,310,246 B2 * 4/2022 Rehak ................. H04L 63/1441
(Continued)

OTHER PUBLICATIONS

Gabriel Diaz, Billy Peralta, Luis Caro, Orietta Nicolis, "Co-Training for Visual Object Recognition Based on Self-Supervised Models Using a Cross-Entropy Regularization," Entropy, 23, 423 (2021).
(Continued)

*Primary Examiner* — Padma Mundur
(74) *Attorney, Agent, or Firm* — IP-MEX Inc.; Victoria Donnelly

(57) ABSTRACT

A system for labelling and classification of encrypted network traffic is disclosed. The system employs a Labeler, having a semi-supervised machine learning module for semi-automated labeling of encrypted network traffic, with an initial involvement of a human-in-the-loop intelligence for rapid training of the Labeler. The Labeler produces a labeled training set of encrypted network traffic flows. The system further includes a Modeler having a genetic algorithm module, for automatically selecting a list of network traffic features for further use in real-time classification of the encrypted network traffic, and outputting a corresponding classification model. The system further includes a Classifier for real-time classification of the encrypted network traffic using the classification model. Corresponding methods for labeling and classifying the encrypted network traffic are also provided.

20 Claims, 51 Drawing Sheets

(56)  References Cited

U.S. PATENT DOCUMENTS

| | | | | |
|---|---|---|---|---|
| 11,429,891 | B2 * | 8/2022 | Liu | H04L 41/145 |
| 11,451,578 | B2 * | 9/2022 | Kohout | H04L 41/0686 |
| 11,507,373 | B2 | 11/2022 | Dehon et al. | |
| 11,646,952 | B2 | 5/2023 | Punj et al. | |
| 11,677,757 | B2 * | 6/2023 | El-Moussa | G06N 3/04 |
| | | | | 726/23 |
| 11,689,944 | B2 * | 6/2023 | Vasudevan | H04L 41/147 |
| | | | | 370/252 |
| 11,711,308 | B2 * | 7/2023 | Stepanek | H04L 63/1425 |
| 2020/0322677 | A1 * | 10/2020 | Kovacs | H04N 21/6582 |
| 2021/0303436 | A1 * | 9/2021 | Bigaj | G06F 17/15 |
| 2023/0026463 | A1 * | 1/2023 | Saha | H04L 41/145 |
| 2024/0052729 | A1 * | 2/2024 | Bo | E21B 43/12 |
| 2025/0016107 | A1 * | 1/2025 | Madanapalli | G06F 18/21 |

OTHER PUBLICATIONS

Genetic Algorithm, Wikipedia article, <online:https://en.wikipedia. org/wiki/Genetic_algorithm>.

SciLab Learning Documentation, SciKit-Learn 1.4.1 documentation <online: https://scikit-learn.org/stable/modules/generated/sklearn. semi_supervised.LabelSpreading.html>.

Random Forest, Wikipedia article, <online: https://en.wikipedia.org/ wiki/Random_forest>.

Weighted Voting, Wikipedia article, <online: https://en.wikipedia. org/wiki/Weighted_voting>.

XGBoost, Wikipedia article, <online: https://en.wikipedia.org/wiki/ XGBoost>.

Tianqi Chen, Carlos Guestrin, "XGBoost: A scalable tree boosting system," ACM Digital Library, p. 785-795 (2016).

XGBoost Documentation, dmlc XGBoost article, <online: https:// xgboost.readthedocs.io/en/stable/>.

Youden, W.J. (1950), Index for rating diagnostic tests. Cancer, 3: 32-35, <online: https://doi.org/10.1002/1097-0142(1950)3:1<32::AID-CNCR2820030106>3.0.CO;2-3>.

* cited by examiner

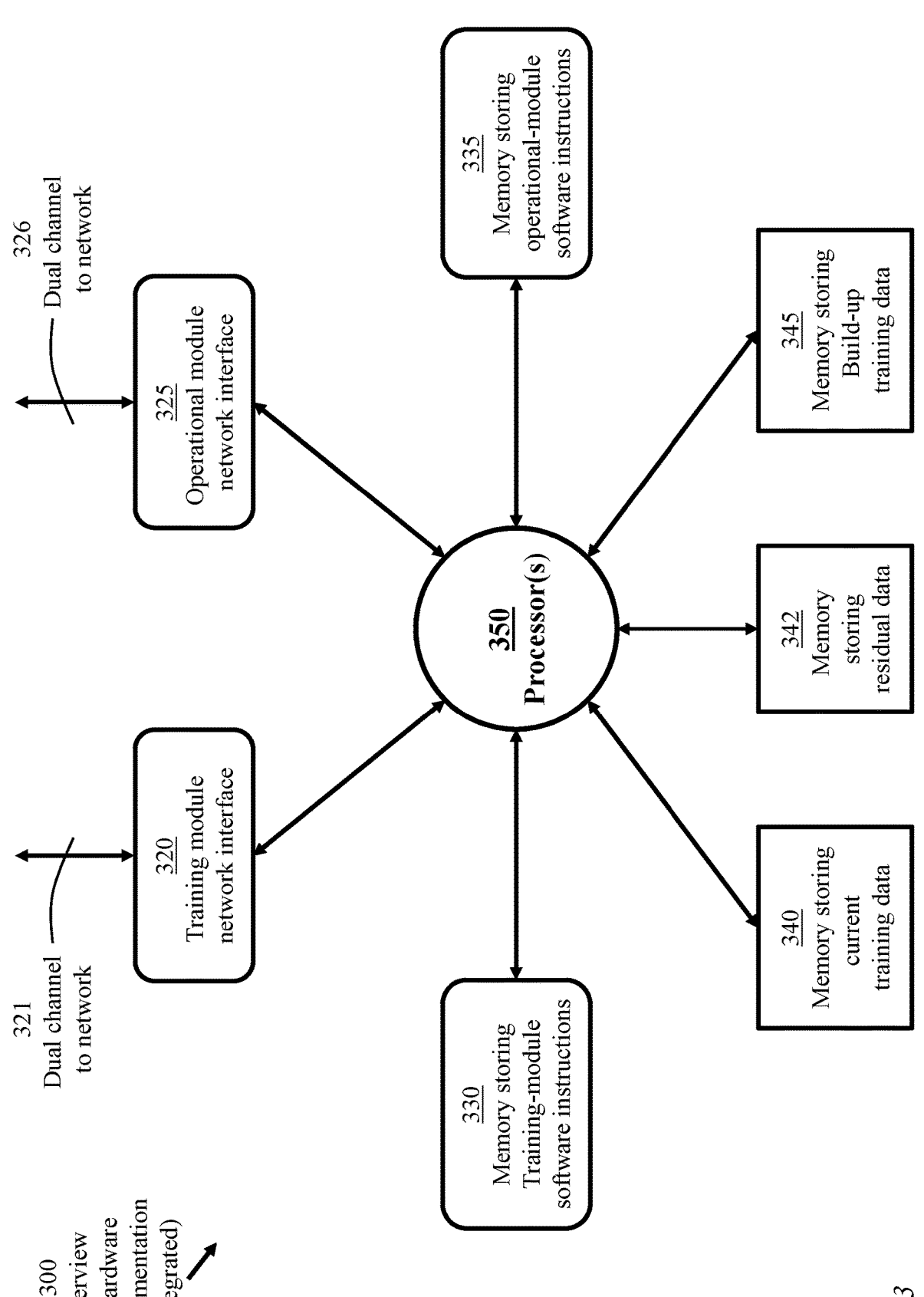

300
Overview
of hardware
Implementation
(integrated)

326
Dual channel
to network

321
Dual channel
to network

335
Memory storing
operational-module
software instructions

325
Operational module
network interface

320
Training module
network interface

350
Processor(s)

345
Memory storing
Build-up
training data

342
Memory
storing
residual data

340
Memory storing
current
training data

330
Memory storing
Training-module
software instructions

FIG. 3

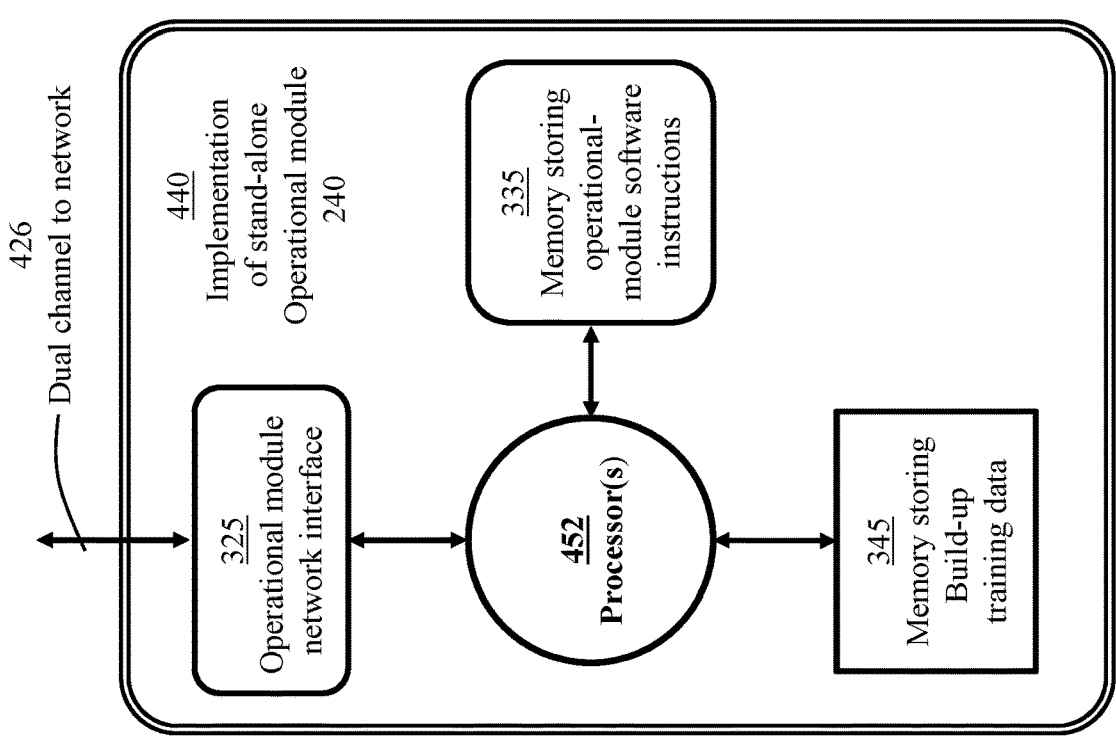
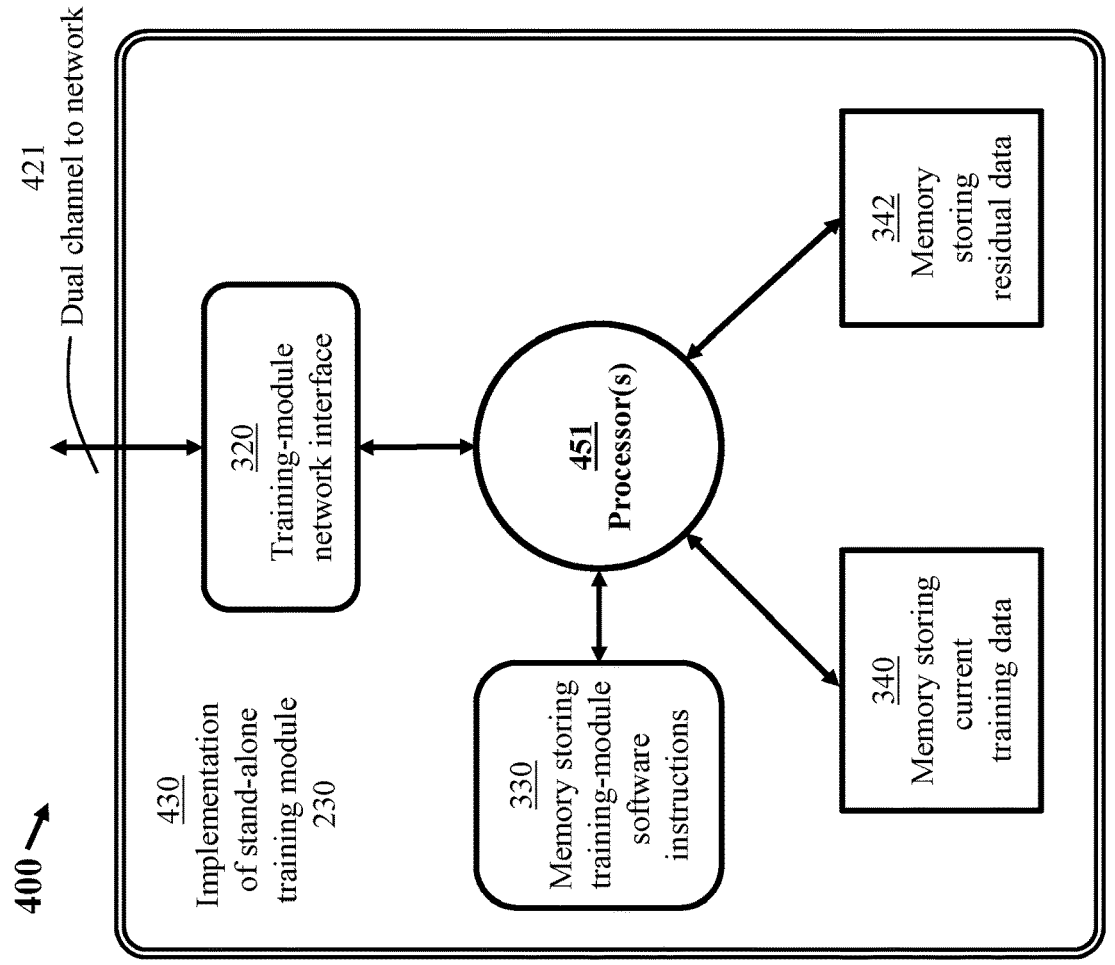
*FIG. 4*

600
System of
Integrated and distributed
Trafficwiz™ appliances
coupled to a data network 700
TrafficWiz™ overview 720
TrafficWiz™ processes 740
Training phase 762
Salting module 760
Labeler 770
Modeler 750
Real-time phase 780
Classifier of fresh traffic records

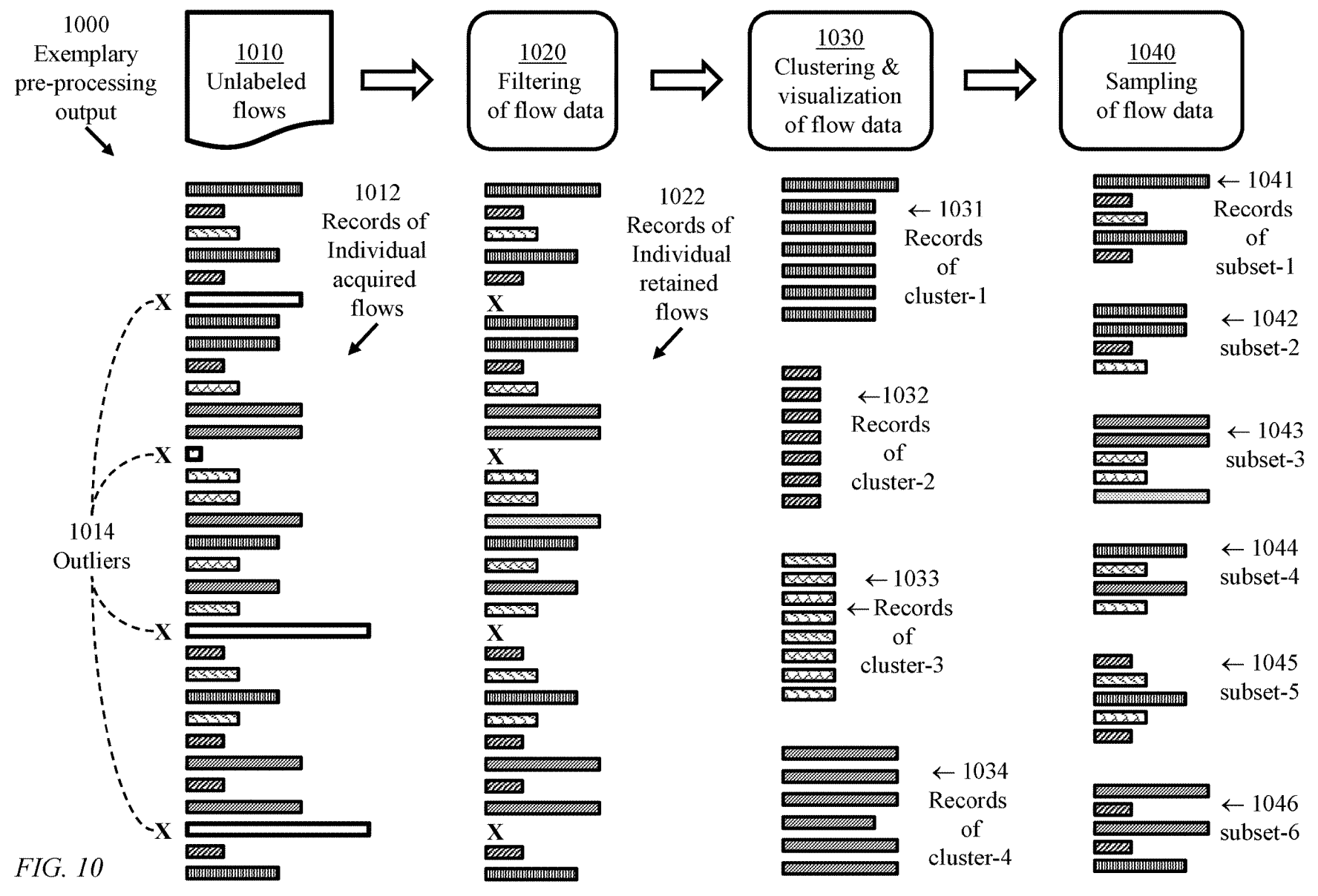

1000 Exemplary pre-processing output

1010 Unlabeled flows

1012 Records of Individual acquired flows

1014 Outliers

1020 Filtering of flow data

1022 Records of Individual retained flows

1030 Clustering & visualization of flow data

1031 Records of cluster-1

1032 Records of cluster-2

1033 Records of cluster-3

1034 Records of cluster-4

1040 Sampling of flow data

1041 Records of subset-1

1042 subset-2

1043 subset-3

1044 subset-4

1045 subset-5

1046 subset-6

*FIG. 10*

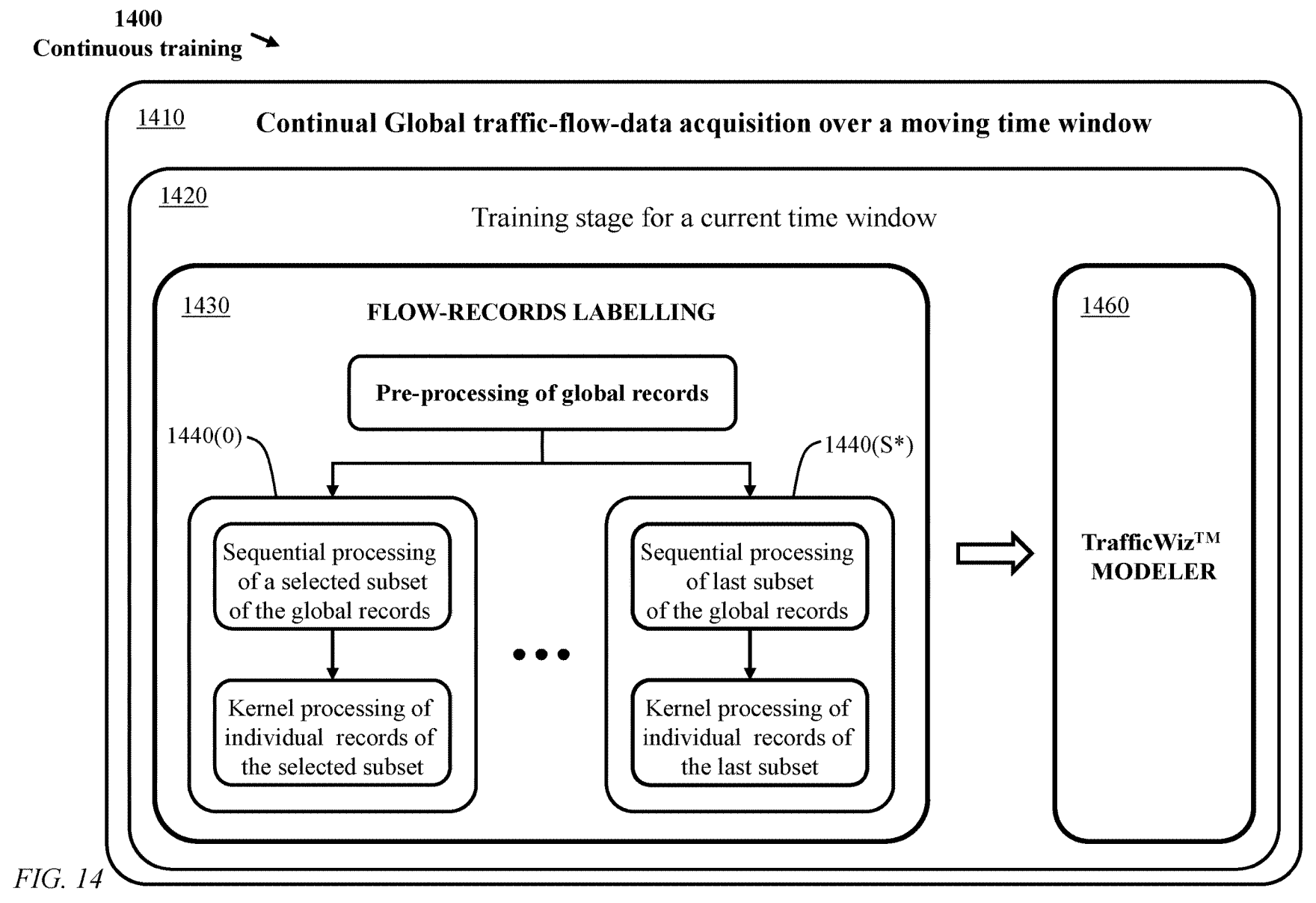

1400
Continuous training

1410  Continual Global traffic-flow-data acquisition over a moving time window

1420  Training stage for a current time window

1430  FLOW-RECORDS LABELLING

Pre-processing of global records

1440(0)

Sequential processing of a selected subset of the global records

Kernel processing of individual records of the selected subset

1440(S*)

Sequential processing of last subset of the global records

Kernel processing of individual records of the last subset

1460  TrafficWiz™ MODELER

FIG. 14

1500
Labeling
stages of
TrafficWiz™

1510
Training-phase update

1520
Pre-processing stage

1530
Sampling-stage processing

1540
Kernel-stage processing

1600
Labeling stages

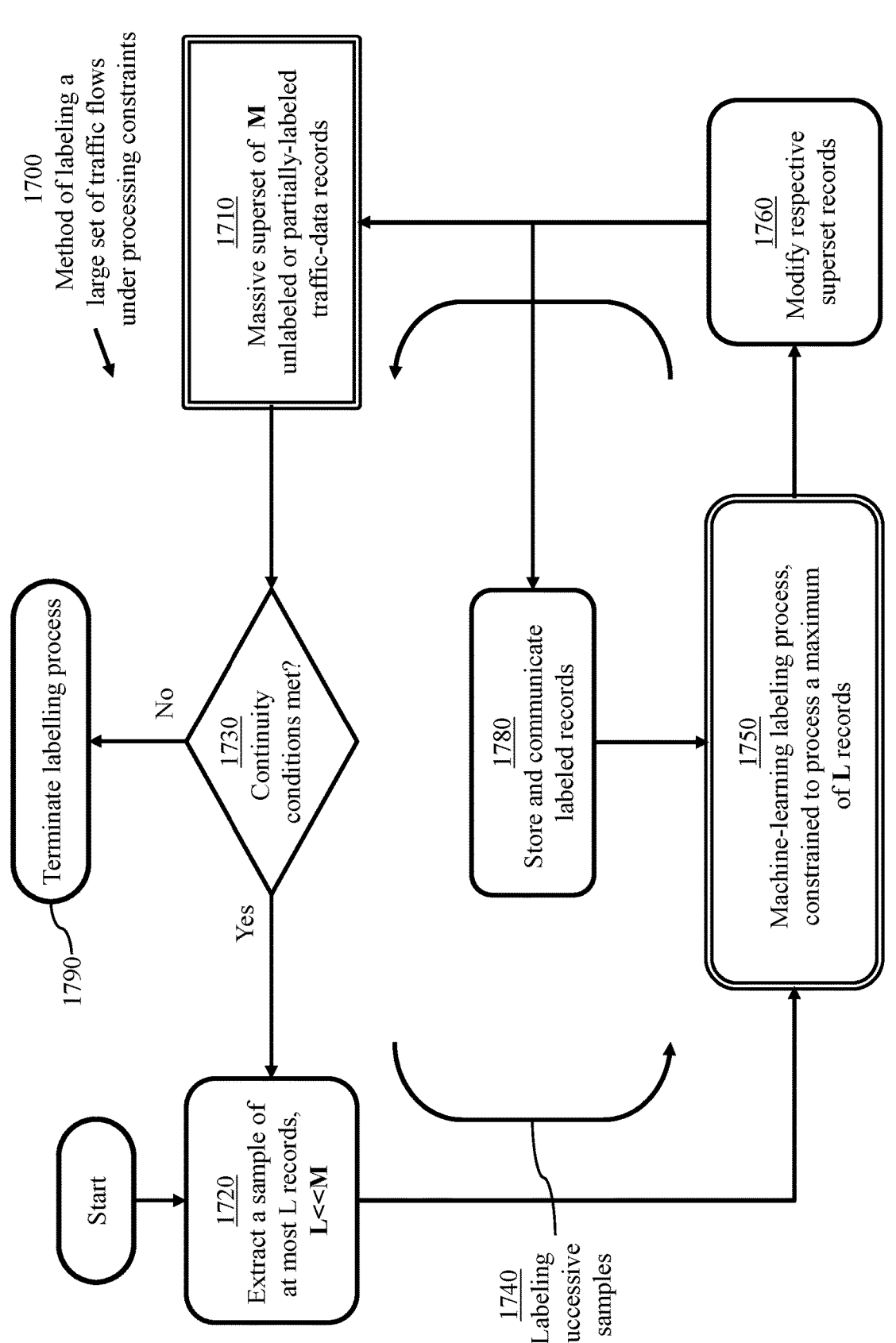

1700
Method of labeling a large set of traffic flows under processing constraints 1710
Massive superset of M unlabeled or partially-labeled traffic-data records 1760
Modify respective superset records Start 1720
Extract a sample of at most L records, L<<M

1730
Continuity conditions met?

No

Yes

1790
Terminate labelling process

1740
Labeling successive samples

1750
Machine-learning labeling process, constrained to process a maximum of L records 1780
Store and communicate labeled records

*FIG. 17*

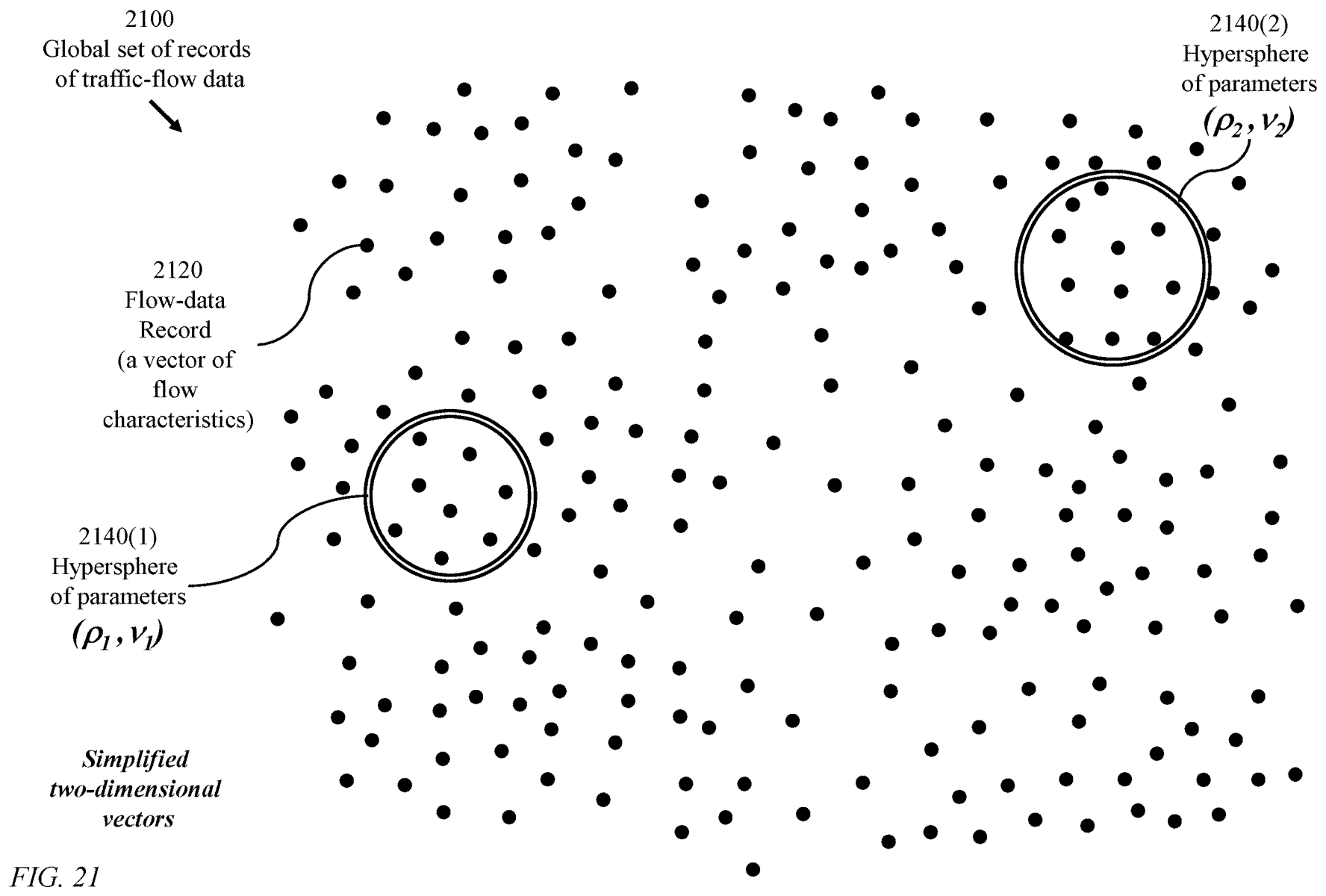

2140(2)
Hypersphere
of parameters
$(\rho_2, v_2)$

2100
Global set of records
of traffic-flow data

2120
Flow-data
Record
(a vector of
flow
characteristics)

2140(1)
Hypersphere
of parameters
$(\rho_1, v_1)$

*Simplified
two-dimensional
vectors*

*FIG. 21*

2200
Clustering
the global
set of
records

2300
Sampling
the global
set of
records

● Flow of the global set

○ Flow that is re-selected until labeled

Figure 25:
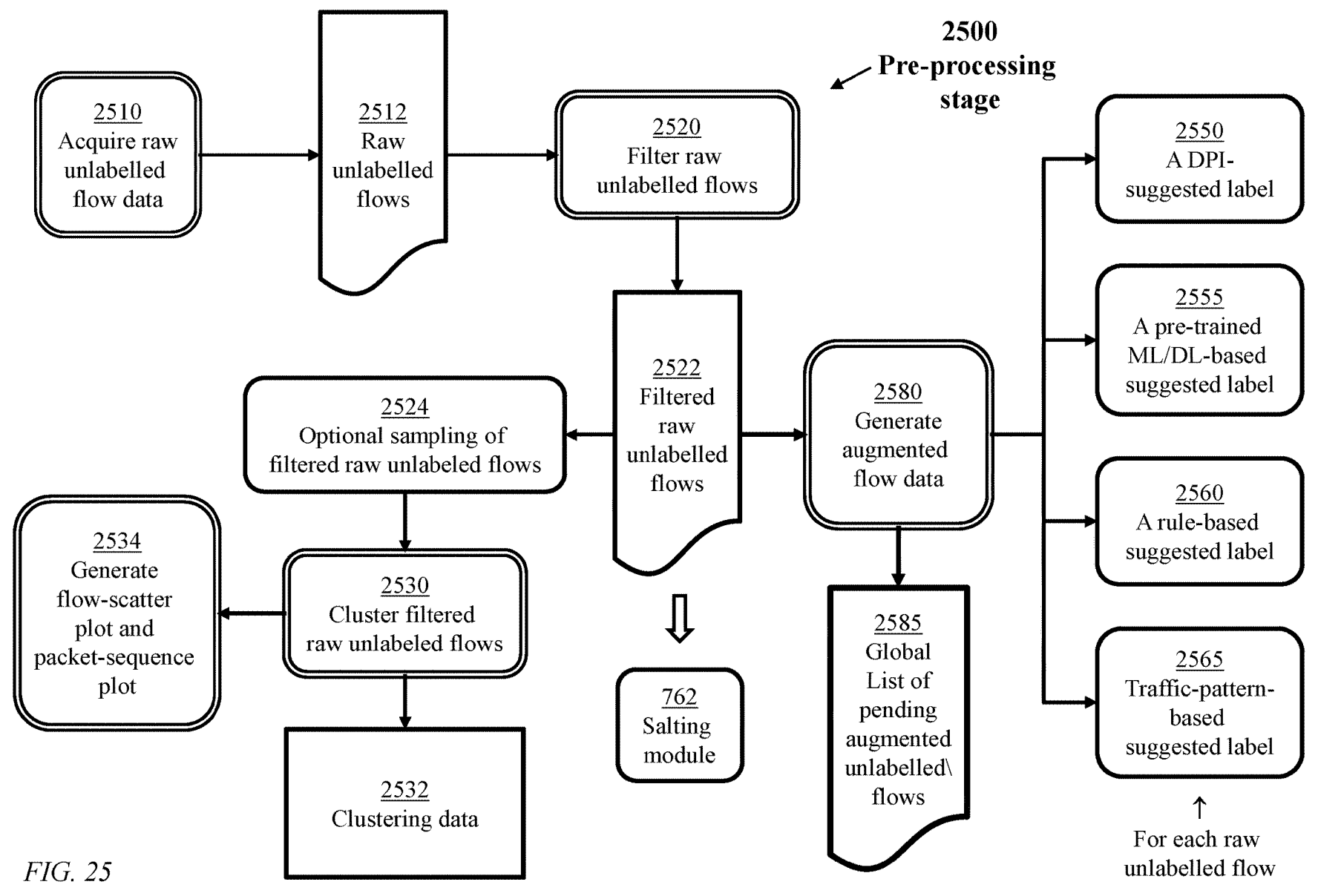

2500

Pre-processing stage

2550
A DPI-suggested label

2555
A pre-trained ML/DL-based suggested label

2560
A rule-based suggested label

2565
Traffic-pattern-based suggested label

For each raw unlabelled flow

2580
Generate augmented flow data

2585
Global List of pending augmented unlabelled\ flows

2520
Filter raw unlabelled flows

2522
Filtered raw unlabelled flows

762
Salting module

2512
Raw unlabelled flows

2524
Optional sampling of filtered raw unlabeled flows

2530
Cluster filtered raw unlabelled flows

2532
Clustering data

2510
Acquire raw unlabelled flow data

2534
Generate flow-scatter plot and packet-sequence plot

3200
Co-training

3220
Training data containing both labeled and unlabeled traffic-flow records

3222
Labeler-B based on packet-inter-arrival time parameters

3224
Predicted flows-B

3226
Update training data

3229
Loop-B 3264
3262
3260
3263
3261

3216
Update training data

3219
Loop-A

3210
Training data containing both labeled and unlabeled traffic-flow records

3212
Labeler-A based on packet-size parameters

3214
Predicted flows-A

4100
Mixture of raw records, labeled records, and classified records at start of successive epochs $\Theta(0). \Theta(1), ..., \Theta\{25\}$ denote classified flows during Epochs(0) to Epoch(25), respectively

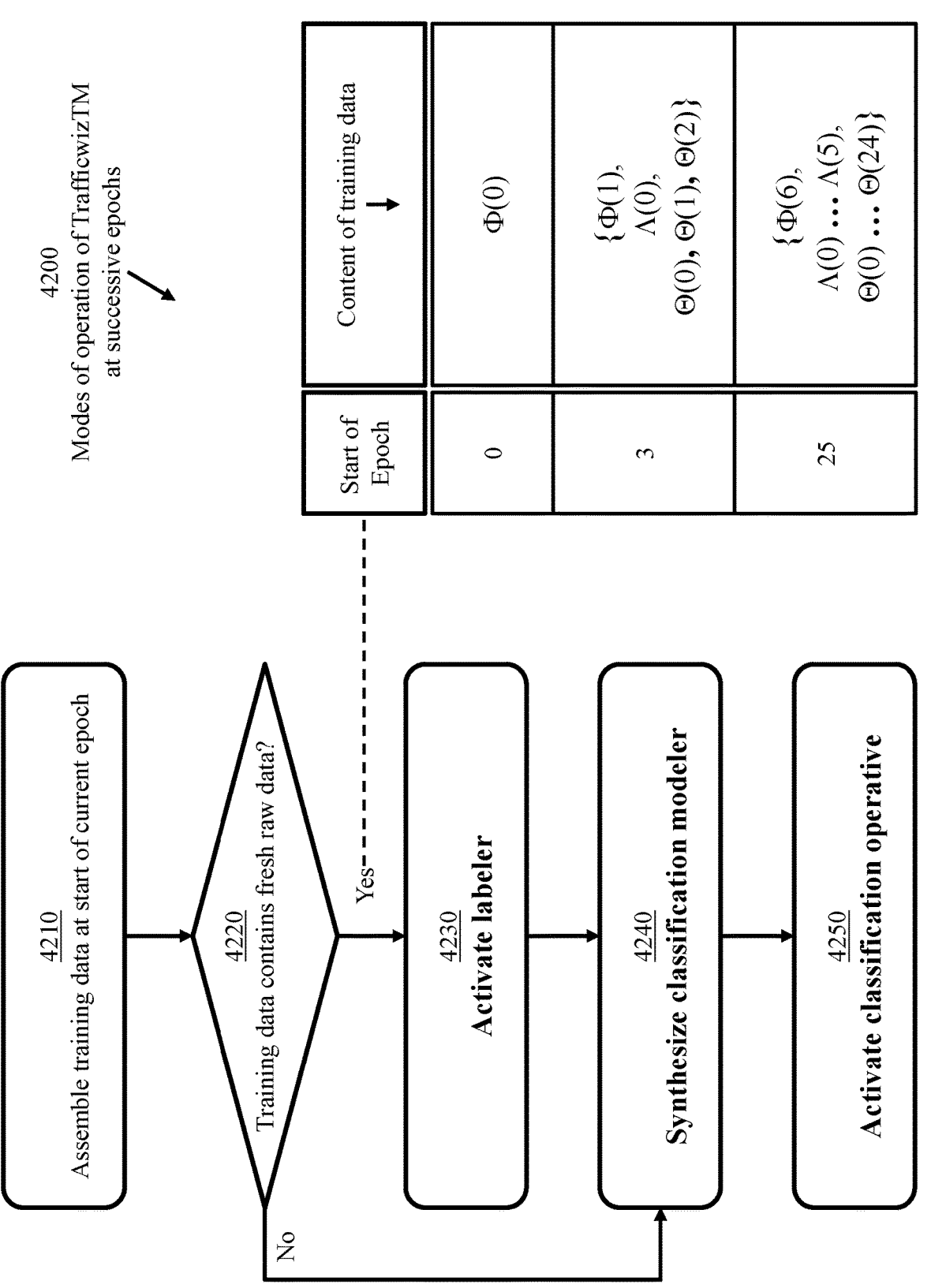

4200
Modes of operation of TrafficwizTM
at successive epochs

| Start of Epoch | Content of training data → |
|---|---|
| 0 | $\Phi(0)$ |
| 3 | $\{\Phi(1), \Lambda(0), \Theta(0), \Theta(1), \Theta(2)\}$ |
| 25 | $\{\Phi(6), \Lambda(0) \dots \Lambda(5), \Theta(0) \dots \Theta(24)\}$ |

4210
Assemble training data at start of current epoch

4220
Training data contains fresh raw data?

No

Yes

4230
Activate labeler

4240
Synthesize classification modeler

4250
Activate classification operative

FIG. 42

4300
Pruning training data

4310
Training data at
start of
Epoch(Q+1), Q>0

4340
Cumulative
Operational-phase
classified records: ΣΘ

4320
Cumulative
Training-phase
labeled records: ΣΛ

4350
Θ–Pruning Filter

4330
Λ–Pruning Filter

4360
Pruned
training data

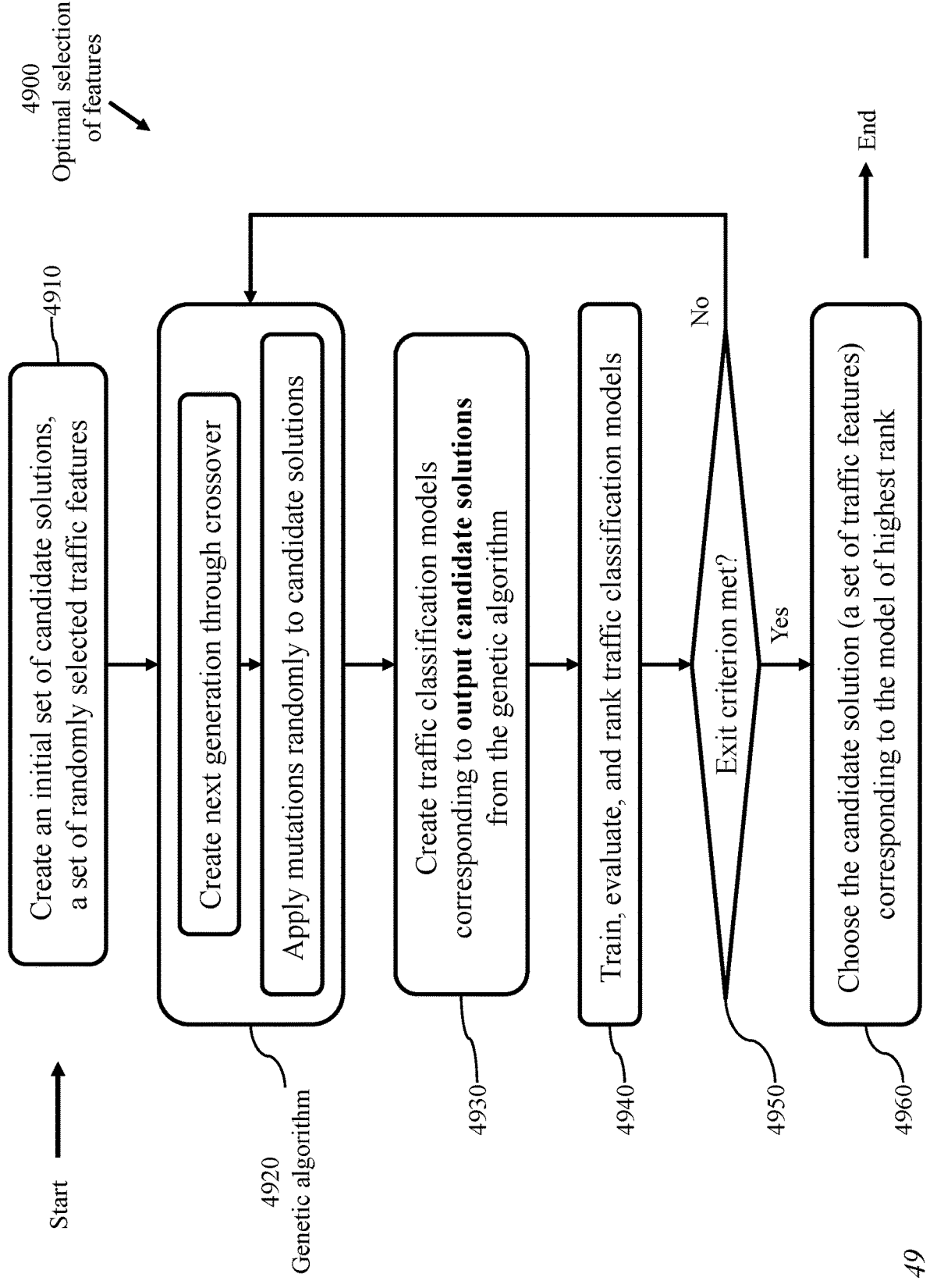

4900
Optimal selection of features

Start

4910
Create an initial set of candidate solutions, a set of randomly selected traffic features 4920
Genetic algorithm Create next generation through crossover Apply mutations randomly to candidate solutions 4930
Create traffic classification models corresponding to output candidate solutions from the genetic algorithm 4940
Train, evaluate, and rank traffic classification models 4950
Exit criterion met?

No

Yes

4960
Choose the candidate solution (a set of traffic features) corresponding to the model of highest rank End

FIG. 49

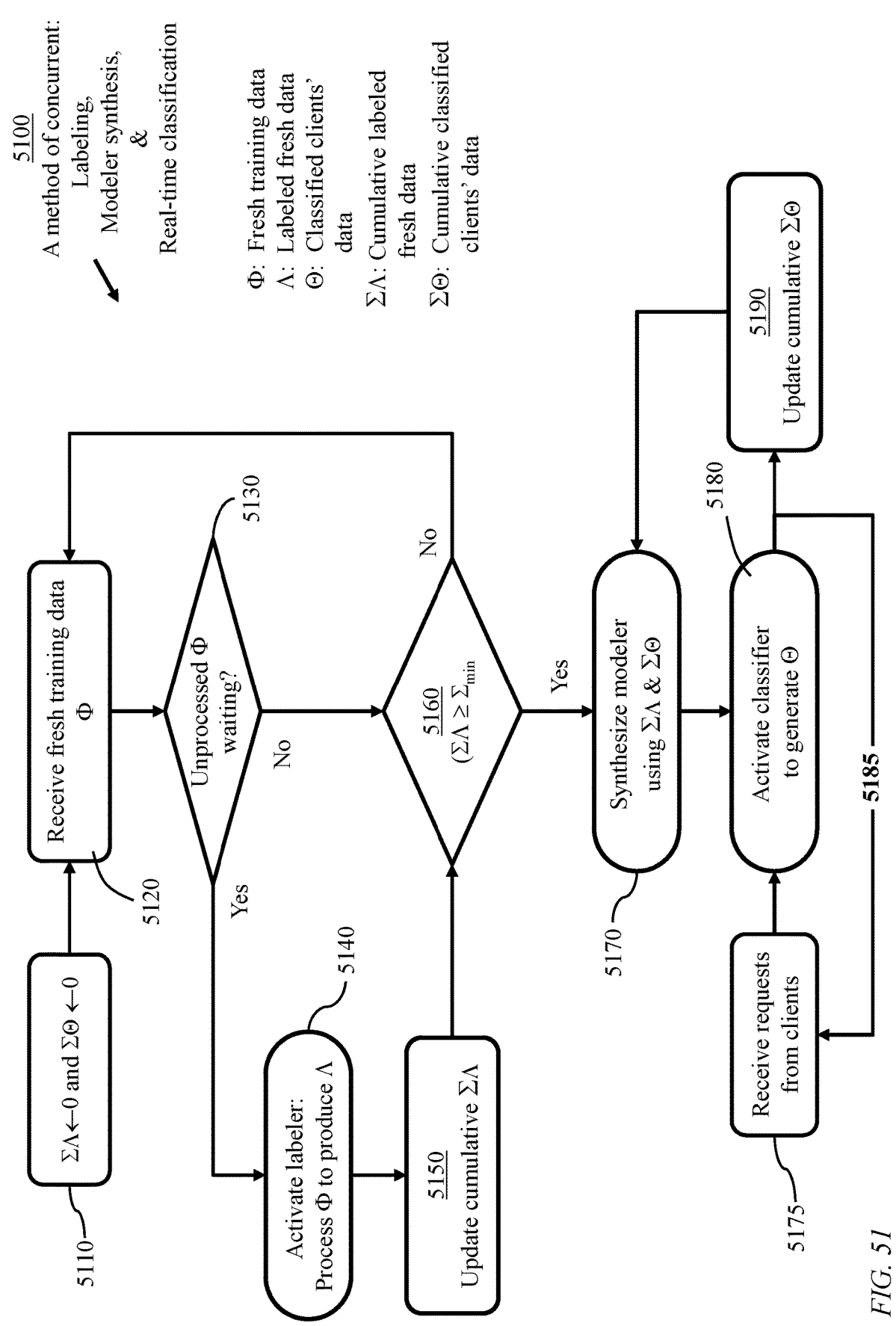

5100
A method of concurrent:
Labeling,
Modeler synthesis,
&
Real-time classification Φ: Fresh training data
Λ: Labeled fresh data
Θ: Classified clients' data
ΣΛ: Cumulative labeled fresh data
ΣΘ: Cumulative classified clients' data 5110  $\Sigma\Lambda \leftarrow 0$ and $\Sigma\Theta \leftarrow 0$ 5120  Receive fresh training data Φ

5130  Unprocessed Φ waiting?

5140  Activate labeler: Process Φ to produce Λ

5150  Update cumulative ΣΛ

5160  $(\Sigma\Lambda \geq \Sigma_{min})$

5170  Synthesize modeler using ΣΛ & ΣΘ

5175  Receive requests from clients

5180  Activate classifier to generate Θ

5185

5190  Update cumulative ΣΘ

FIG. 51

MACHINE LEARNING CLASSIFICATION OF ENCRYPTED NETWORK TRAFFIC

CROSS-REFERENCE TO RELATED APPLICATIONS

The present application claims the benefit of Canadian patent application 3,197,148 filed on Apr. 16, 2023 entitled "Method and System for Classifying Encrypted Network Traffic Using Artificial Intelligence", the entire contents of which are incorporated herein by reference.

FIELD OF THE INVENTION

The present invention relates to labeling and classification of network traffic, and in particular to methods and systems for labeling modeling and classification of the encrypted network traffic using artificial intelligence techniques.

BACKGROUND OF THE INVENTION

A significant portion of network traffic is encrypted. Many applications tunnel traffic over HTTPS to provide data privacy to users. The introduction of Transport Layer Security 1.3 (TLS 1.3), rendered conventional methods of inspecting network traffic unsuitable to use for distinguishing legitimate traffic from illegitimate traffic, blocking illegal applications, enforcing policies, or detecting cyber threats hiding in encrypted traffic.

In addition, the proliferation of the encrypted traffic renders useless many of existing tool-chains for network situational awareness, network planning, and cyberspace operations, which are becoming unable to perform network forensics, obtain visibility into encrypted traffic, secure the network, differentiate subscriber offerings, ensure suitable Quality of Service; or conduct network planning.

Therefore, there is a need for developing improved methods and systems for labeling, modeling and classifying encrypted network traffic, which would solve or at least partially eliminate the above noted problems.

SUMMARY OF THE INVENTION

There is an object of the present invention to provide methods and systems for improved labeling, modeling and classification of the encrypted network traffic.

In accordance to one aspect, the invention provides a method of labeling network flows, implemented at a network appliance employing a hardware processor. The method comprises processes of:

acquiring a first set of records of training flow data containing unlabeled flows;

filtering the first set of records to produce a filtered set excluding records determined to be outliers according to respective criteria;

initializing a second set of labeled-flow records as an empty set; and recurrently labeling successive samples of the filtered set. for at most a prescribed number of cycles.

Each sample is selected to not exceed a preselected number of records from the filtered set. Subject to a determination that the second set contains a number of records at least equal to a prescribed lower bound a semi-supervised learning model is trained based on the second set and used to attempt to label each record of the filtered set to produce a respective label suggestion. The label of each record of the sample is based on respective available label suggestions.

The second set of labeled-flow records is updated to include successfully labeled records and successfully labeled records of the sample are removed from the filtered set.

The process of acquiring the first set of records comprises employing known models to produce, for each acquired unlabeled flow, at least one of: a DPI-suggested label; a suggested label according to a pre-trained machine-learning model; a suggested label according to a pre-trained deep-learning model; a rule-based suggested label; and a suggested label based on traffic-flow pattern.

The recurrent labeling process is terminated upon reaching any of the following conditions:

(a) a number of remaining unlabeled flows of the filtered set is less than a respective predetermined lower bound;

(b) a proportion of unlabeled flows of the filtered set that has been successfully labeled exceeds a respective predetermined upper bound; and (c) a succession of a predetermined number of samples failed to label any unlabeled flow.

Selecting a sample is based on unbiased sampling of unlabeled records of the filtered set.

The method optionally comprises extracting from the filtered set a respective representative set of unlabeled flows of a reduced size applying one of two approaches. A first approach is unbiased selection of the unlabeled flows of the filtered set to pick a desired number of extracted unlabeled flows. The second approach is to apply k-means clustering of the unlabeled flows of the filtered set of unlabeled flows using a number of initial centroid seeds equal to a desired number of extracted unlabeled flow, where each record of the filtered set of records is presented as a respective vector of a multi-dimensional space.

The method further comprises presenting each record of the filtered set of records as a respective vector of a multi-dimensional space and clustering vectors of the filtered set to produce a requisite number of clusters not exceeding a network-appliance-specific upper bound. Suggesting a label for a flow may be based on examining the clusters.

The clustering process is preferably performed using the Density-Based Spatial clustering of Applications with Noise (DBSCAN) with a hypersphere radius and a minimum number of vectors within the hypersphere selected iteratively to yield the requisite number of clusters.

Each unlabeled flow comprises a stream of encrypted packets. Training may be performed as two-view co-training employing a first labeler based on features related to packet-size parameters and a second labeler based on time-domain packet-arrival patterns.

According to one embodiment, co-training is based on (a) supplying training data to the first labeler comprising cumulative labeled flow records determined at the first labeler in addition to switched labeled flow records of a respective most-recent sample determined at the second labeler, and (b) supplying training data to the second labeler comprising cumulative labeled flow records determined at the second labeler in addition to switched labeled flow records of a respective most-recent sample determined at the first labeler.

According to another embodiment, co-training is based on: (C) supplying training data to the first labeler comprising cumulative labeled flow records determined at the first labeler in addition to switched cumulative labeled flow records determined at the second labeler, and supplying training data to the second labeler comprising cumulative labeled flow records determined at the second labeler in addition to switched cumulative labeled flow records determined at the first labeler.

In accordance with another aspect, the invention provides a network appliance for classifying network flows according to a set of flow classifications comprising: (A) a labeler configured to receive a set of unlabeled training flows and label individual flows according to predefined flow classifications to produce a set of labeled training flows; (B) a modeler configured to determine classification of a flow comprising a stream of encrypted packets based on the set of labeled training flows; and (C) a classifier configured to classify, in real time, flows received from users of the network appliance using the modeler.

The labeler comprises: a pre-processing module; a sampling module configured to select successive samples of the filtered set, each sample not exceeding a preselected number of records from the filtered set; and a kernel module for labeling individual unlabeled flows of each sample.

The preprocessing module is configured to: filter the set of unlabeled training flows to produce a filtered set of unlabeled flows excluding outliers; cluster one of the filtered set and the representative set to produce a requisite number of clusters not exceeding a specified upper bound; and optionally extract a representative set of unlabeled flows of a reduced size.

The pre-processing module is further configured to employ known models to produce, for each unlabeled flow of the filtered set of unlabeled flows, at least one of: (I) a DPI-suggested label; (II) a suggested label according to a pre-trained machine-learning model; (III) a suggested label according to a pre-trained deep-learning model; (IV) a rule-based suggested label; and (V) a suggested label based on traffic-flow pattern.

According to a first embodiment, the network appliance is implemented as an integrated appliance comprising a training component, an operational component activated in real-time in a continuous operational phase, and a module for updating the training data based on outcome of the operational phase; the training component configured to produce models and corresponding parameters to be used for real-time classification.

According to a second embodiment, the network appliance as implemented as a partitioned appliance comprising a stand-alone training module communicatively coupled to a stand-alone operational module, each having a respective processor.

According to a third embodiment, the network appliance is implemented as a spatially distributed appliance comprising a central training module distributing training results to multiple operational modules and receiving results of real-time classifications from the operational modules.

In a preferred implementation, the labeler, the modeler, and the classifier are interconnected in a closed loop with the labeler receiving fresh training data from external sources and feedback data from the classifier comprising data relevant to real-time classified flow to be used for enhanced labeling.

The labeler, the modeler, and the classifier are configured to be activating concurrently to label received fresh training data, periodically re-synthesize the modeler, and continually classify flow data received from users directing classification results to respective users and simultaneously to the labeler through the closed loop.

A pruning filter may be used for trimming training data according to predefined criteria. The sampling module comprises a semi-supervised model for use in the kernel module. The semi-supervised model comprises a co-training module employing a first labeler based on packet-size parameters and a second labeler based on time-domain packet-arrival patterns.

Thus, improved methods and systems for labeling, modeling and classifying the encrypted network traffic using artificial intelligence techniques have been provided.

BRIEF DESCRIPTION OF THE DRAWINGS

Embodiments of the present invention will be further described with reference to the accompanying exemplary drawings, in which:

FIG. 3 illustrates the main hardware components of the appliance of FIG. 1 implemented as an integrated apparatus, in accordance with an embodiment of the present invention;

FIG. 4 illustrates hardware implementation of the appliance of FIG. 2 in the form of two stand-alone modules, a training module and an operation module, that may be coupled directly or through a data network, in accordance with an embodiment of the present invention;

FIG. 10 illustrates an exemplary training set of traffic flows to be labeled, according to the predefined homogeneous and composite traffic flows, undergoing preparatory operations of filtering, clustering, and sampling;

FIG. 14 illustrates a scheme for continuous training of the Trafficwiz™ appliance (whether integrated or distributed), in accordance with an embodiment of the present invention;

FIG. 17 illustrates a method of labeling a massive set of unlabeled or tentatively labeled traffic-flow records, based on progressively modifying the composition of the massive set as traffic-flow records get labeled, in accordance with an embodiment of the present invention;

FIG. 21 illustrates an exemplary global set of traffic flows, each traffic flow presented as a vector of a multi-dimensional space, a simplified two-dimensional space is used for ease of presentation;

FIG. 25 illustrates processes of the pre-processing stage of FIG. 15, in accordance with an embodiment of the present invention;

FIG. 29 is a continuation of FIG. 28;

FIG. 42 illustrates modes of operation of the Trafficwiz™ appliance, in accordance with an embodiment of the present invention;

FIG. 49 illustrates use of a method for selecting network traffic features using a genetic algorithm, for building an AI model for the encrypted network traffic classifier;

FIG. 51 illustrates a method of concurrent labeling, mod-eler synthesis, and real-time classification, in accordance with an embodiment of the present invention.

REFERENCE NUMERALS

Figure 1:
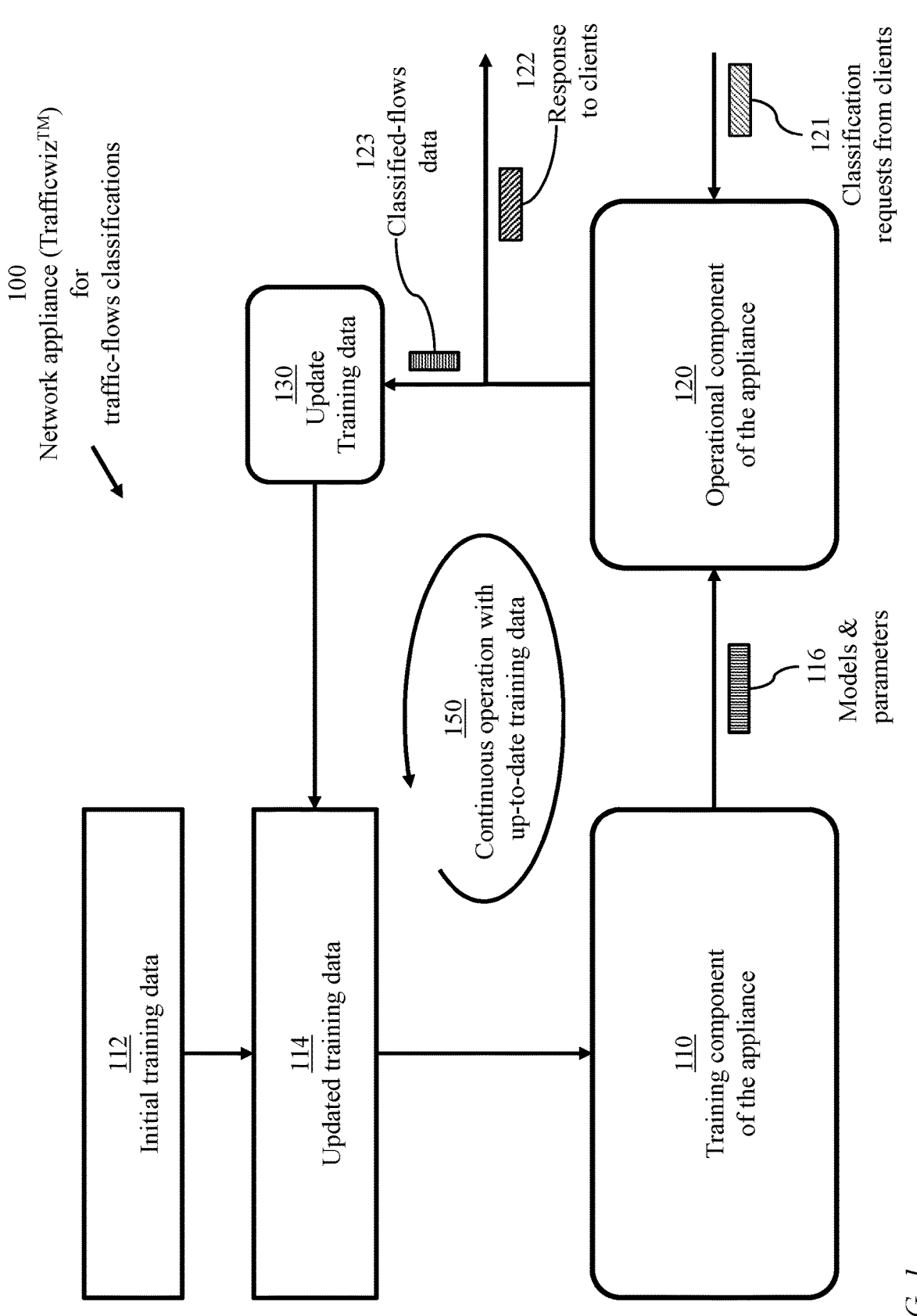
FIG. 1 is a schematic of a network appliance, herein references as Trafficwiz™, for traffic-flow characterization, in accordance with an embodiment of the present invention.

100: Schematic of a network appliance (Trafficwiz™) for traffic-flow characterization implemented as an inte-grated appliance

110: Training component of appliance 100 activated dur-ing a training phase

112: A memory device storing Initial global training data

114: A memory device holding updated training data

116: AI model and parameters for use in real-time clas-sification

120: Operational component of appliance 100 activated in real-time in a continuous operational phase

121: Traffic-flow classification requests received from users (also referenced as "clients") of appliance 100

122: Responses to classification requests 122

123: Data relevant to classified users' traffic flows, defined in requests 121, supplied to process 114 for continually updating the training data

130: Process of updating the training data based on output of the operational component

150: Continuous recursive circulation during successive training epochs activating the training component 110, the operational component 120, and updating process 130 leading to a continually improved and updated training data 114

200: A partitioned arrangement of network appliance 100

220: A data network

230: A stand-alone training module (a training part of integrated network appliance 100)

240: A stand-alone operational module (a classification part of integrated network appliance 100)

300: Hardware components of the appliance of FIG. 1 implemented as an integrated appliance

320: A network interface of a training module of network appliance 100

321: A dual channel to a data network

325: A network interface of an operational module of network appliance 100

326: A dual channel to a data network

330: A memory device storing training software instructions

335: A memory device storing operational software instructions

340: A memory device storing current training data (initially storing pre-determined training data)

342: A memory device storing records of training traffic flows that were not labelled during a training epoch for use in further analyses

345: A memory device storing additional traffic-flow records acquired during the operational phase (real-time classification phase) of a training epoch to be used in a subsequent training epoch

350: A processor; generally, an assembly of hardware processing units operated in parallel and/or in a pipelined arrangement

400: Hardware implementation of the appliance of FIG. 2 in the form of two stand-alone modules, a training module and an operation module, that may be coupled directly or through a data network

430: Implementation of stand-alone training module 230

440: Implementation of stand-alone operational module 240

500: A spatially distributed appliance for traffic-flow characterization comprising a training module and operational modules that may be spatially distributed

510: Downstream training results to an operational module 550

520: Upstream classification results from an operational module 550 to central training module 530

530: A central training module similar to stand-alone training module 230

532: A network interface of the central training module 530

550: An operational module similar to stand-alone operational module 240

552: A network interface of an operational module 550

600: Integrated Trafficwiz™ appliance communicatively coupled to a plurality of clients through a data network as well as a distributed appliance comprising a stand-alone training module communicatively coupled to multiple stand-alone operational modules through the network, each operational stand-alone module being configured to communicate with the plurality of clients through the data network

700: An overview of the main processes performed by a Trafficwiz™ appliance (integrated or partitioned)

720: processes of integrated appliance 100 or partitioned appliance 200

740: Training phase

750: Real-time operational phase (classification of received traffic flows—from users or via the network)

760: Labeler

762: Salting module

770: Modeler

780: Classifier of fresh traffic flows received from clients

800: Processes performed at integrated appliance 100 or partitioned appliance 200

820: Process of acquiring a set of traffic records for training

830: A process of acquiring or specifying a set of recognizable traffic-flow classifications

822: A process of attempting to label each of the traffic records

840: A process of synthesizing a traffic-flow modeler based on successfully labeled traffic-flow records

850: A process of synthesizing a real-time traffic-flow classifier

860: A process of continually receiving fresh traffic-flow data from the network or from users (clients) through network interface 325 or 552

880: A process of real-time traffic-flow classifications using synthesized classifier generated by the modeler 850

890: Classified traffic flows transmitted to concerned party

900: An exemplary predefined set of homogeneous traffic flows, as well as a predefined set of composite traffic flows each formed as a multiplex of a respective subset of the set of homogeneous traffic flows

1000: An exemplary training dataset of traffic flows to be labeled, according to the predefined homogeneous and composite traffic flows, undergoing preparatory (training) operations of filtering, clustering, and sampling

1010: Unlabelled flows

1012: Records of individual traffic flows

1014: Records filtered out as outliers

1020: Process of filtering of flow data

1022: Records of individual retained traffic-flow records after filtering

1030: Process of clustering and visualization of flow data

1031: Records of cluster-1

103$j$: Records of cluster-j,$i{\le}j{\le}J$, J being the total number of clusters

1040: Process of sampling of training traffic-flow records, extracting subsets of a specified number of records

1041: Records of subset-1 of training traffic-flow records

104$k$: Records of subset-k of training traffic-flow records, $0{\le}k{\le}K$, K being an index of the last subset to be drawn during a training epoch; K may be predefined or determined according to a criterion such as exhaustion of the training dataset of a current training epoch or labeling saturation.

1100: Traffic-flow characterization

1120: A specific traffic flow

1121: Identifier of the specific traffic flow

1122: Features (also referenced as "descriptors", "metadata" or "statistics") specific to the traffic flow

1130: A tuple uniquely identifying the specific traffic flow

1140: A table of a superset of predefined features characterizing traffic flows in general

1150: A code indicating traffic-flow direction(s)—the terms "upstream" and "downstream" directions are synonymous with "forward" and "backward"

1151: Values of code 1150: a code of "00" indicates that a corresponding feature is not relevant to specific traffic flow 1120, a code of "01" indicates that the specific flow is an upstream flow only, a code of "10" indicates that the specific flow is a downstream flow only, and a code of "11", indicates a dual flow comprising an upstream flow and a downstream flow

1160: Specifics of each feature of the superset of features

1161: An index of a feature of the superset of features

1200: Sorting (grouping) a superset of traffic-flow features according to predefined feature categories

1210: A predefined set of Γ feature categories, Γ>1, individually the feature categories are referenced as 1212(1) to 1212(Γ)

1220: A predefined superset, or an extracted set, of features

1240: A process of sorting (grouping) the features according to predefined feature categories

1260: Indices 1161 of features of each feature category (individually 1260-1 to 1260-M)

1300: Optimal selection of a set of prominent features from a superset of predefined features

1320: A process of feature data adaptation for processing in a genetic-algorithm module

1330: A selected genetic-algorithm module

1340: A produced set of prominent features; output of the genetic-algorithm module

1400: A scheme for continuous training of the Trafficwiz™ appliance (whether integrated or distributed)

1410: A process of continually acquiring global training traffic-flow records on a regular/periodic basis, such as training epoch of a predetermined duration (a day, a week, etc.)

1420: A training stage for a current time-window (a current epoch)

1430: A process of labeling samples (subsets) of the global training flow records

1440: Processing of a selected subset

1450: Processing of a last subset

1460: Synthesis of the operational-modeler 770

1500: Nesting of stages of scheme 1400, where each training phase of a continual sequence of training epochs includes multiple preprocessing stages, each preprocessing stage including multiple sampling stages, each sampling stage including multiple single-flow processing stages (referenced as Kernel stages)

1510: Training-phase update performed during a training epoch

1520: Pre-processing of a training dataset specific to the training epoch

1530: Processing successive samples (successive subsets) of the training dataset

1540: Sequentially processing individual traffic flows of each sample (each subset) of the training dataset

1600: Recursive execution of the stages of scheme

1610: Outer loop of processes executed during successive time windows (successive training epochs)

1612: Refreshed training data for use in a current time window (a current training epoch)

1614: Data of a current subset of training dataset

1616: Data of a single traffic flow

1620: Intermediate loop of processes executed during successive sampling periods, i.e., periods of attempting to label successive subsets of traffic flows

1630: Processing of one traffic flow at a time until all flows in the subset are processed—exhaustive selection

1700: A method of labeling a massive set of unlabeled or tentatively labeled traffic-flow records, based on progressively modifying the composition of the massive set as traffic-flow records get labeled

1710: A memory device storing a superset of M unlabeled, or partially labeled, traffic-flow records. M being a relatively large integer

1720: A process of extracting a sample of at most a predefined number, L, of traffic-flow records from the training dataset stored in memory 1710. L<<M

1730: A process of determining whether all records from original M have been processed or that successive executions of process 1750 failed to label pending records

1740: Loop of recursive processes executed subject to a need for continuity as determined in process 1760

1750: A process of machine-learning or deep-learning limited to handle at most L records

1760: Process of updating the superset of training records stored in memory 1710 to account of any successful labeling of process 1750

1780: Process of storing data relevant to records successively labeled in process 1750

1790: Process of terminating the labeling stage

1800: A flow chart of a specific implementation of method 1700

1810: Process of initializing a file, referenced as a "label file", for holding labeled records of traffic flows. Initially, the labeled file is set as an empty file

1820: Process of assembling records of training data in a "global file"—for a first training epoch, the global file contains only unlabeled records, for subsequent training epochs, the global file contains a mixture of prior residue records as well as newly acquired unlabeled records

1835: Loop of processes 1830, 1840, 1845, 1850, 1860, 1865, 1870, 1880

1840: Process of selecting a sample (a subset) of a preselected number of records from the global file

1845: Checking count of labeled flows to determine whether use of a semi-supervised learning model is appropriate

1850: Process of training a semi-supervised learning model based on labeled records

1860: Processes of attempting to label each record of the sample

1870: Process of inserting successfully labeled records into the label file

1880: Process of removing successfully labeled records of the sample from the global file and revisiting branching point 1830

1900: An example of labeling of successively selected subsets of the training dataset

1901: Count of initial unlabeled records

1902: Count of initial labeled records (zero)

1920: Counts of unlabeled records after processing successive samples

1940: Counts of labeled records after processing successive samples

1950: Counts of all records of training data after processing successive samples

1960: Count of residual records of the global file that were not labeled

2000: Labeling attainment for successive subsets of the training dataset based on changing proportion of labeled traffic-flows records of the global traffic-flow records 2010: Successive samples; individually 2010(*j*), j≥0 till a last sample of a current epoch 2020: Labeled and unlabeled records of each processed sample with updates of the superset of records 2100: An exemplary global set of traffic flows each traffic flow presented as a vector of a multi-dimensional space, a simplified two-dimensional space is used for ease of presentation 2120: A record of a traffic flow; a vector of flow characteristics 2140: A hypersphere of a radius ρ containing a number, ν, of records; two hyperspheres, individually 2140(1) and 2140(2), are indicated of parameters $(\rho_1, \nu_1)$ and $(\rho_2, \nu_2)$.

2200: Exemplary clusters of the global set of traffic flows

2300: Successive samples (subsets of the training dataset) 2320 drawn from the global set of traffic flows 2320: Individual samples individually identified as 2320 (1) to 2320(8)

2400: Details of sampling the global file with partial replacement

2410: Exemplary clusters of the flows of FIG. 21, individually referenced as 2410(1) to 2410(5)

2420: Successively drawn samples, $S_1$ to $S_8$, from the global file, with partial replacement, individually referenced as 2420(1) to 2420(8)

2500: Processes of the pre-processing stage of FIG. 15

2510: Process of acquiring raw unlabeled flow data

2512: A memory device holding unlabeled flow data

2520: Process of filtering the raw unlabeled flow data to exclude outliers

2522: A memory device holding filtered raw unlabeled flow data; optionally, the filtered data may be stored in a division of memory device 2512

2530: Process of clustering the filtered flow data

2532: A memory device storing clustering data

2534: Process of generating a flow-scatter plot and a packet-sequence plot

2550: Process of producing a DPI suggested label for each unlabelled flow

2555: A process of producing a suggested label for each unlabelled flow based on a pre-trained (apriori-trained) ML/DL model 2560: A process of producing a suggested label for each unlabelled flow based on specific rules 2580: A process of generating augmented filtered raw unlabeled flow data indicating the suggested labels produced in processes 2550, 2555, 2560 and 2565

2585: A memory device storing the augmented filtered raw unlabeled flow data

2600: Processes of the sampling stage of FIG. 15

2620: A branching point at which continuity or completion of the sampling stage of a current training epoch is determined 2610: A process of initializing a set of labeled flows as an empty set 2640: A process of selecting a sample (a subset) of the augmented records for processing in the kernel stage 2642: Module to train a semi-supervised model 2650: Recursion of selecting samples of the augmented unlabeled flows until completion of the sampling stage for a current training epoch 2670: A process of updating the set of labeled flows based on receiving results from the Kernel module 2680: Indicate that processing of a current sample is complete 2700: Processes of the kernel stage of FIG. 15

2720: A branching point at which continuity of processing records of a current sample, or completion, is determined 2725: Process of selection of an unlabeled flow of a current sample (current subset) of flows 2730: A loop of individual flow processing 2740: A branching point which initially bypasses process 2745

2745: A process of suggesting a label using a semi-supervised model

2750: A process of producing a system suggested label based on all label suggestions of the current flow 2760: A process of verifying the system suggested label 2765: A branching point at which a current flow remains unlabeled or proceed to a further process of machine evaluation 2770: A process of machine evaluation of the current suggested labels 2775: A branching point at which the current flow remains unlabeled or transferred from the global file to the label file 2780: A process of updating the global file and the label file to account for successful labeling of the current flow 2800: Processes of labeling subsets of the training dataset for a case of a relatively small global set of traffic flows and, consequently, a relatively small sample size 2810: A sample space of 40 unlabeled flows 2812: A first sample (first subset, 10 flows) of sample space 2810

2814: A number (six) of successfully labeled flows of the first sample

2820: An updated sample space (34 flows) comprising sample space 2810 excluding labeled flows of the first sample (six flows)

2822: A second sample (second subset, 10 flows) drawn from the updated sample space 2820

2824: A number (eight) of successfully labeled flows of the second sample

2830: An updated sample space (26 flows) comprising sample space 2820 excluding labeled flows of the second sample (eight flows)

2832: A third sample (third subset, 10 flows) drawn from the updated sample space 2830

2834: A number (eight) of successfully labeled flows of the third sample

2835: Remaining unlabeled flows (18 flows) after processing the third sample

2900: Continuation of processes 2800

2940: An updated sample space (18 flows) comprising sample space 2830 excluding labeled flows of the third sample (eight flows)

2942: A fourth sample (fourth subset, 10 flows) drawn from the updated sample space 2940

2944: A number (eight) of successfully labeled flows of the fourth sample

2950: An updated sample space (ten flows) comprising sample space 2940 excluding labeled flows of the fourth sample (eight flows)

2952: A fifth sample (fifth subset, ten flows) comprising the entire updated sample space 2950

2954: A number (six) of successfully labeled flows of the fifth sample

2960: An updated sample space (four flows) comprising sample space 2950 excluding labeled flows of the fifth sample (six flows)

2962: A last sample (last subset, four flows) comprising the entire updated sample space 2960

2964: A number (four) of successfully labeled flows of the last sample

3000: Process of updating training data supplied to semi-supervised models 2745

3010: An unlabeled flow

3020: Initial sample space of current training epoch (40 flows)

3030: Sample space (28 flows) after processing $N_1$ samples, $N_1 > 0$

3032: A labeled flow

3035: A set of labeled flows (12 flows) used to augment training data for semi-supervised models 2745 after processing the $N_1$ samples ($N_1$ subsets)

3040: Sample space (18 flows) after processing $N_2$ samples, $N_2 > N_1$

3045: A set of labeled flows (22 flows) used for training semi-supervised models 2745 after processing the $N_2$ samples ($N_2$ subsets)

3100: Sequence of generating a suggested label for a flow

3180: Potential new label suggestions in process 2760

3190: Evaluation in processes 2760 and 2770

3200: Processes of co-training employing two labelers (classifiers)

3210: Training data containing both labeled and unlabeled traffic-flow records

3212: A first labeler (classifier) based on packet-size parameters

3214: A set of predicted flows of the first labeler

3216: A process of updating training data 3210

3219: A loop of successive activation of the first labeler to sequentially label unlabeled flow records

3220: Training data containing both labeled and unlabeled traffic-flow records

3222: A second labeler (classifier) based on packets arrival patterns (generally, time-domain packet-arrival patterns, including packets inter-arrival time patterns)

3224: A set of predicted flows of the second labeler

3226: A process of updating training data 3210

3229: A loop of successive activation of the second labeler to sequentially label unlabeled flow records

3260: A two-state switch

3261: An input port for supplying output of labeler 3212 to switch 3260

3262: An input port for supplying output of labeler 3222 to switch 3260

3263: An output port for transferring switched flow records from labeler 3222 to update training data 3210

3264: An output port for transferring switched flow records from labeler 3212 to update training data 3220

3300: Composition of training data at start of labeling each sample, according to a first co-training method

3310: Initial unlabeled records

3316: Unlabelled flow records

3320: Labeled flow records from the first labeler 3212

3330: All flow records labeled at the first labeler 3212

3335: Residual flow records after processing all samples in the first labeler 3212

3350: Switched labeled flow records from the first labeler 3212

3351: Switched labeled flow records from the second labeler 3222

3356: Unlabelled flow records

3370: Labeled flow records from the second labeler 3222

3380: All flow records labeled at the first labeler 32212

3385: Residual flow records after processing all samples in the second labeler 3222

3400: Composition of training data at start of labeling each sample, according to a second co-training method

3500: Successive, non-overlapping, training epochs

3520: Cumulative training data over multiple training epochs

3600: A first scheme of concurrent processes of training and real-time classification

3640: Additional training data determined from classification of clients-provided flows

3700: A second scheme for concurrent real-time classifications and updating training data

3720: A process of acquiring predetermined training data to be used for synthesizing a real-time classification model for Epoch(0)

3740: Concurrent operations during even-numbered epochs, starting with epoch(0)

3741: Processes of receiving flow-classification requests from clients and determining a respective class for each flow

3742: Processes of updating training data for an immediately succeeding epoch (an odd-numbered epoch) and synthesizing a real-time classification model to be used in processes 3761

3750: Transition to subsequent-epoch (an odd-numbered epoch) processing

3760: Concurrent operations during odd-numbered epochs, starting with epoch(1)

3761: Processes of receiving flow-classification requests from clients and determining a respective class for each flow

3762: Processes of updating training data for an immediately succeeding epoch (an even-numbered epoch) and synthesizing a real-time classification model to be used in processes 3741

3770: Transition to subsequent-epoch (an even-numbered epoch) processing

3780: An indication of continual activation of the loop of concurrent operations 3740 and concurrent operations 3760, necessitating continuous concurrent activation of the training component 110 and the real-time operational component 120 of Trafficwiz™ (FIG. 1).

3800: Coupling processes of successive epochs to update training traffic records

3810: A set of training traffic-flow records for a current epoch of index Π, Π≥0

3820: Training-phase processes (labeling and modeling)

3825: Traffic records received from users (clients) or the live network during Epoch(Q)

3830: Real-time classification processes of Epoch(Q)

3840: Processes of communicating classification results

3850: A subset of the set of training flows, successfully labeled during Epoch(Q) in the training phase 3820

3855: A process of age-filtering, applicable to Epochs succeeding the initial Epoch(0), where records of flows exceeding a prespecified age are excluded.

3860: A process of retaining traffic-flow records and corresponding successful classifications to include in the set of training records of epoch(Q+1)

3870: A process of combining age-filtered flow records from process 3855 and retained flow records from process 3860 to produce a set of training data for epoch(Q+1)

3880: Set of training data 3880 for epoch(Q+1).

3900: Exemplary outcome of the labeling stage for multiple training epochs

3920: Labeled records used in the training phases of successive epochs, individually identified as 3920(0), 3920(1), etc.

3940: Records of successfully classified flows corresponding to classification requests received from clients during successive epochs; individually identified as 3940(0), 3940(1), etc.

3950: Composition of flow records after completion of an epoch, individually identified as 3950(0), 3950(1), etc., for Epoch(0), Epoch(1), etc., respectively.

4000: Growth of training data

4020: Cumulative counts of flow records labeled in the training phase

4040: Cumulative counts 4040 of clients' flow records classified in the operational phase

4100: Candidate Training data comprising raw unlabeled records, labeled records, and classified records

4110: Unlabeled records

4120: A mixture of labeled records and classified records

4200: Modes of operation of the Trafficwiz™ appliance

4210: Process of assembling training data at start of a current epoch

4220: Steo of skipping the labeling stage if the training data does not contain unlabeled flow records

4230: Process of activating the labeler

4240: Process of synthesizing a classification modeler

4250: Process of activating a real-time classification operative

4300: Process of pruning training data

4310: Training data at start of an Epoch

4320: Cumulative training phase labeled records

4330: A first pruning filter

4340: Cumulative operational-phase classified records

4350: A second pruning filter

4400: An overview of a classifier

4410: Unlabeled training flow data

4420: A binary AI classifier module with integrated Receiver-Operating-Characteristics (ROC) sub-module

4440: Non-payload flow data

4450: Payload-carrying flow data

4460: Multi-class AI model configured to predict flow traffic classes/categories and/or labels

4500: Growth of a training dataset with unconstrained inclusion of training data acquired from the real-time classification stages

4510: A point representing unconstrained cumulative training data size at a corresponding instant of time

4520: Size (number of flow records) of initial training data

4530: Size of training data extracted from the real-time classification stages of preceding epochs

4600: Growth of a training dataset with constrained inclusion of training data acquired from the real-time classification stages according to a first policy of age filtering of training data

4610: A point representing constrained cumulative training data size at a corresponding instant of time (under the first policy)

4620: Declining size (number of flow records) of retained portion of the initial training data (of size 4520)

4630: Size of age-filtered training data extracted from the real-time classification stages of preceding epochs

4700: Growth of a training dataset with constrained inclusion of training data acquired from the real-time classification stages according to a second policy of age filtering of training data

4710: A point representing constrained cumulative training data size at a corresponding instant of time (under the second policy)

4730: Size of age-filtered training data extracted from the real-time classification stages of preceding epochs

4800: Classification AI modeler components to generate an AI model for classification

4805: A storage medium holding labeled AI training data

4810: A data-cleansing module

4820: A data imputation module

4830: A module for removing flow records considered to be outliers

4840: A data-transformation module

4850: A feature-computation module

4860: A feature-extraction module

4870: A feature-selection module

4880: A model-tuning module

4890: A memory device holding an encoded AI model and specific parameters for use in real-time classification

4900: Showing the processes and modules for Optimal selection of features used in AI model and real-time classifier

5000: Closed-loop network, application and device traffic-flow classification

5010: External AI training data

5020: Clients' classification requests and/or live unclassified network traffic

5030: Classified-flow data to clients

5040: Classified-flow data to feedback to labeler for use as additional training data

5100: A method of concurrent activation of labeler 760, synthesis of modeler 770, and real-time classification at classifier 780

DETAILED DESCRIPTION

Classifying Encrypted Network Traffic Flows

The network appliance of the present invention extracts invariant features of encrypted traffic that are used to uniquely identify different applications. Such invariant features of encrypted traffic can be relied upon to pinpoint specific types of traffic without examining the contents of the traffic payload. AI models, whether Machine learning (ML) or Deep Learning (DL) models are trained on features extracted from representative traffic. The trained AI/ML models are then used for detection in future new traffic. It is understood that for the purposes of this document, the term AI is used to encompass ML, DL and related approaches, and may sometimes be used inter-changeably.

The premise behind the TrafficWiz ML-based Traffic Classification is that the network traffic generated by applications have unique temporal and spatial statistical properties, which are resilient to encryption and generally resilient to routine changes in application signaling protocols. If AI/ML systems are trained to learn the network behaviour for each class of applications, then the systems can be used to classify new network traffic based on the trained models. Further, this classification works accurately even if the traffic is encrypted. The statistical properties are reflected in statistical metrics extracted from the network traffic. Therefore, the classification also works even if there are minor changes in underlying protocol signaling behaviour for an application.

In AI/ML terminology, the statistical metrics which uniquely identify a particular application are referenced as "features". These features are defined and extracted from network traffic flows. There are literally thousands of features which can be defined and tracked for a given traffic flow. However, not all features can facilitate robust and accurate AI classification models nor can all features facilitate real-time operation of the AI model classifiers on requisite high speed networks. Examples of such features are metrics associated with packet inter-arrival times distribution, byte counts, packet counts, flow duration, as well as more sophisticated metrics such as entropy (measure of randomness).

Once an artificial-intelligence (AI) model has been developed, TrafficWiz™ utilizes the model to examine and classify incoming encrypted network traffic and identify the underlying applications which generated the traffic.

A number of steps are required to develop an ML model for the TrafficWiz toolset, which would robustly encapsulate and represent the behaviour of network traffic, and suitably classify network traffic with a specified accuracy.

FIG. 1 is a schematic 100 of a network appliance, herein referenced as Trafficwiz™, for traffic-flow characterization implemented as an integrated appliance. A traffic flow is hereinafter referenced as a "flow" for brevity.

The integrated appliance comprises a training component 110 activated during a training phase, an operational component 120 activated in real-time in a continuous operational phase, and a module 130 for updating the training data based on outcome of the operational phase. The training component produces a specific ML model and associated parameters 116 to be used for real-time classification in component 120.

A memory device 112 stores initial global training data which may be totally unlabeled or partially labeled. The training data is organized into records of individual flows. As illustrated in FIG. 10 to FIG. 13, to be described below, a record of a flow indicates a unique identifier and a respective superset of features (also referenced as "descriptors", "metadata" or "statistics". A superset of features may be reduced to a representative set of prominent features. A memory device 114 holds the initial global training data which is gradually updated to include training data that may be extracted during the operational phase.

The operational component 120 is configured to receive flow classification requests 121 from users (also referenced as "clients", FIG. 6) of appliance 100, or from live network traffic and produce respective per-flow classifications. The operational phase forms responses 122, to classification requests 121 whether from users or from live network traffic, and communicates the responses through a network interface illustrated in FIG. 3. The produced individual, per-flow, classifications are also supplied to module 130; data 123 relevant to classified flows defined in requests 121 is supplied to module 130 for continually updating the training data and restructuring the training data stored in memory device 114.

In a preferred implementation, a continuous recursive training-data procedure 150 is performed during successive predefined training epochs, activating the training component 110, the operational component 120, and module 130 leading to a continually improved updating training data of memory device 114 of gradually increased proportion of labeled flows (labeled records).

Figure 2:
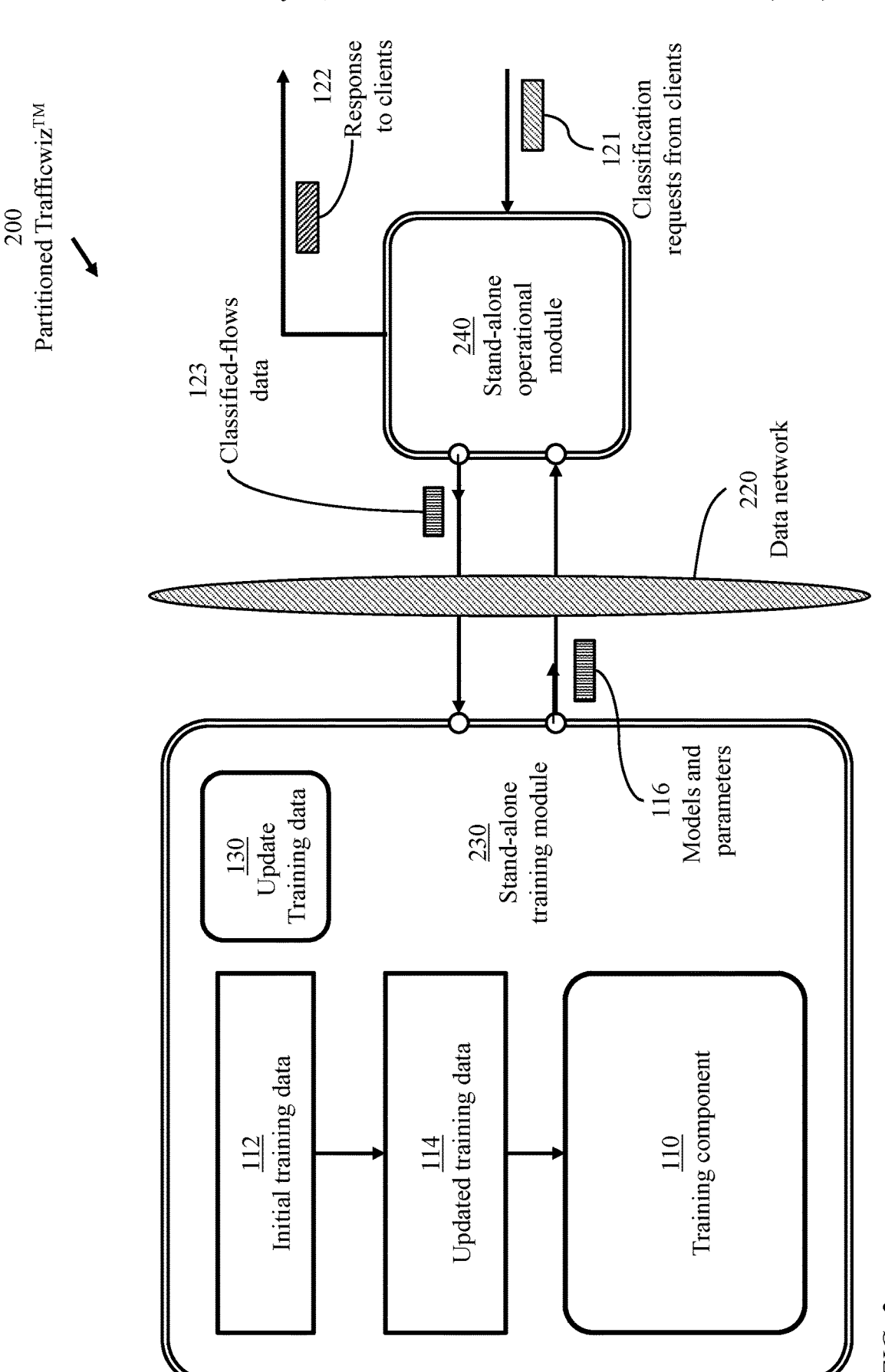
FIG. 2 illustrates a partitioned arrangement of the network appliance of FIG. 1.

FIG. 2 illustrates a partitioned arrangement 200 of the network appliance of FIG. 1 functioning as a partitioned appliance (a partitioned Trafficwiz™). The partitioned appliance comprises a stand-alone training module 230 (a training part of integrated network appliance 100) and a stand-alone operational module 240 (a classification part of integrated network appliance 100). The stand-alone training module 230 and the stand-alone operational module 240 are hardware entities, as illustrated in FIG. 4) which may be collocated or geographically separated. Modules 230 and 240 may be interconnected directly, or through a dual path in data network 220. The dual path may be a dedicated path or a switched path through a network.

FIG. 3 illustrates main hardware components 300 of the appliance of FIG. 1 implemented as an integrated appliance. The appliance communicates with sources of information and users of the appliance through network interfaces. A training module of network appliance 100 communicates through a respective network interface 320 and a dual channel 321 to a data network. An operational module of network appliance 100 communicates through a respective network interface 325 and a dual channel 326 to the data network. A memory device 330 stores training instructions specific to the training functions. A memory device 335 stores software instructions specific to the real-time classification functions. A memory device 340 stores current training data (initially storing pre-determined training data of memory device 112). A memory device 342 stores records of training flows (training records) that were not labelled during a training epoch for use in further analyses. A memory device 345 stores additional flow records acquired during the operational phase (real-time classification phase) of a training epoch to be considered as candidate training data for use in a subsequent training epoch. A processor 350 is coupled to the network interface 320, network interface 325, memory devices 330, 335, 340, 342, and 345. Processor 350 is generally implemented as an assembly of hardware processing units operated in parallel and/or in a pipelined arrangement.

FIG. 4 illustrates hardware implementation 400 of the appliance of FIG. 2 in the form of two stand-alone hardware entities that may be coupled directly or through a data network. The stand-alone training module 230 is implemented as a hardware structure 430. The stand-alone operational module is implemented as a hardware structure 440.

Figure 5:
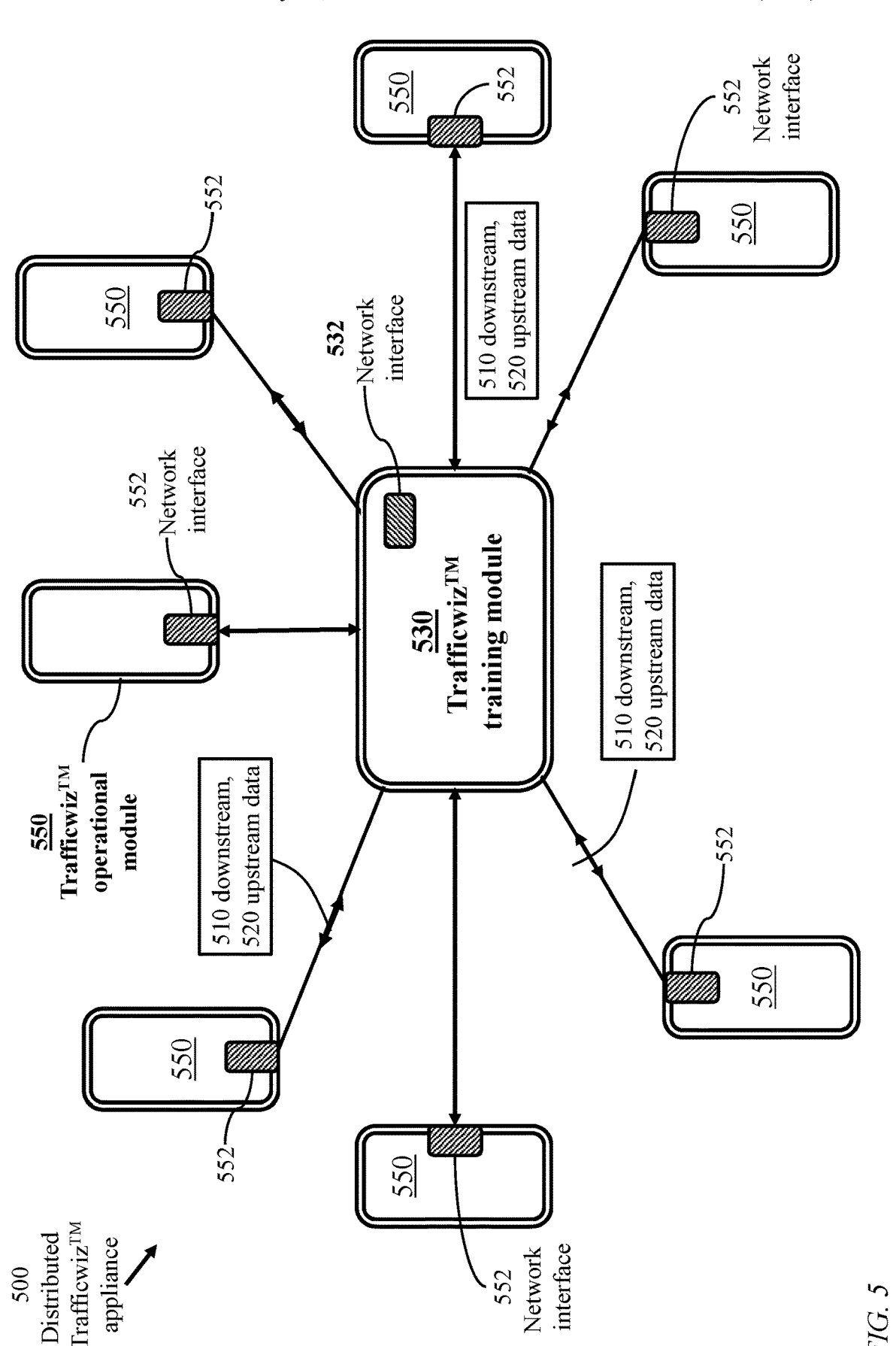
FIG. 5 illustrates a spatially distributed apparatus for traffic-flows characterization comprising a training module and operational modules that may be spatially distributed, in accordance with an embodiment of the present invention.

FIG. 5 illustrates a spatially distributed appliance 500 for flows characterization comprising a central training module 530, similar to training module 230 (implementation 430), and multiple operational modules 550, individually 550(1), 550(2), etc., each operational module 550 being similar to module 240 (implementation 440) of the partitioned arrangement 200 (implementation 440). The central training module 530 comprises a network interface 532, similar to network interface 320 of FIG. 3. The multiple operational modules 240 (implementation 440) that may be geographically distributed and connected in a star configuration to the central training module 530 through a data network. The central training module 230 distributes training results 510 to the operational modules and receives results 520 (individually 520(1), 520(2), etc.) of real-time classifications from the operational modules 550. Each operational module 550 comprises a respective operational-module network interface 552.

Figure 6:
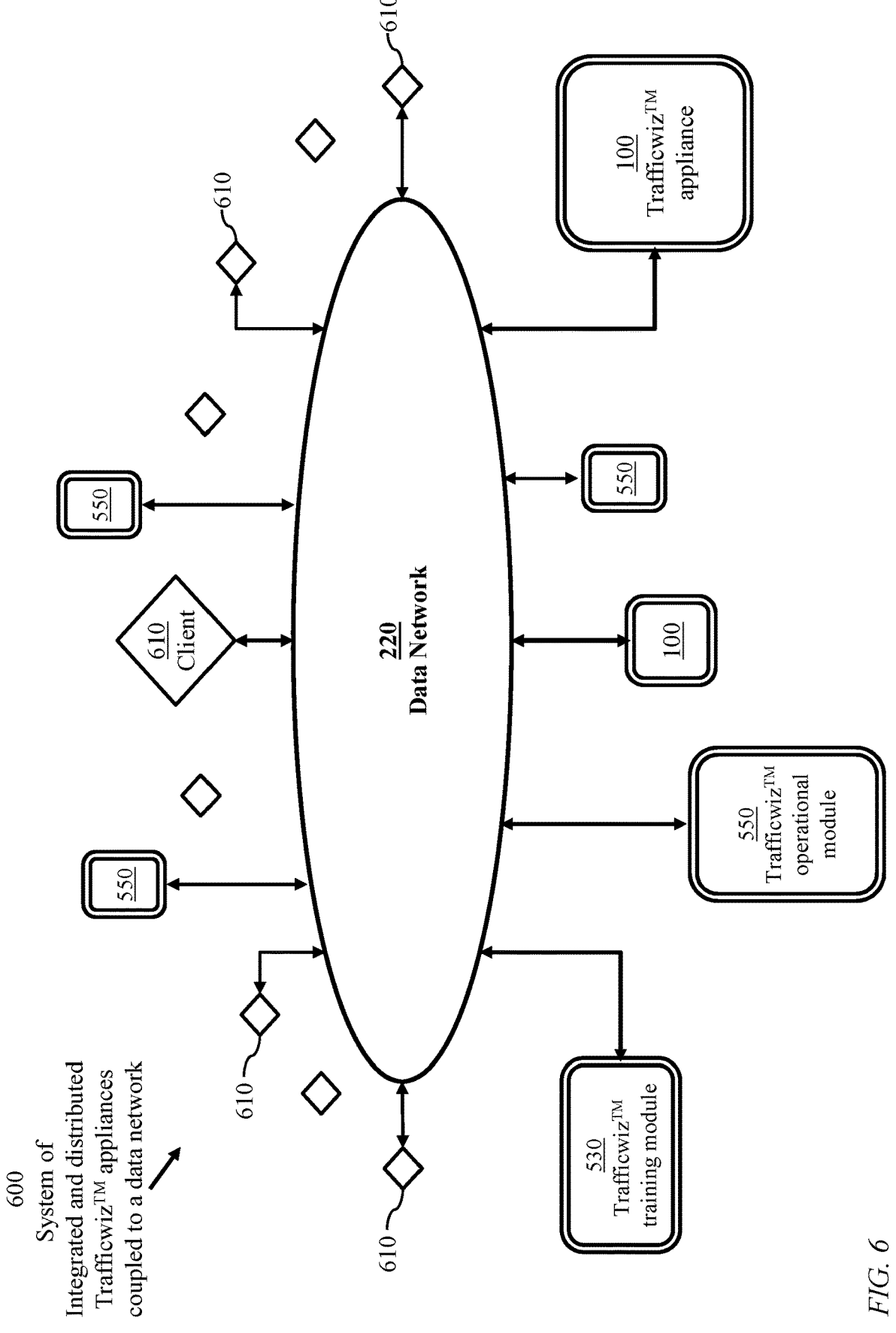
FIG. 6 illustrates two integrated Trafficwiz™ appliances communicatively coupled to a plurality of clients through a data network as well as a distributed appliance comprising a stand-alone training module communicatively coupled to multiple stand-alone operational modules through the network, each operational stand-alone module being configured to communicate with the plurality of clients through the data network, in accordance with an embodiment of the present invention.

FIG. 6 illustrates a system 600 of integrated and distributed Trafficwiz™ appliances coupled to data network 220. Two integrated Trafficwiz™ appliances 100, as well as a distributed appliance 500 are communicatively coupled to a plurality of clients 610 through the data network. The distributed appliance comprises a stand-alone training module 530 communicatively coupled to multiple stand-alone operational modules 550 through the network. Each operational stand-alone module 550 is configured to communicate with the plurality of clients 610 through the data network.

Figure 7:
FIG. 7 is an overview of the main processes performed by a Trafficwiz™ appliance, integrated or partitioned, in accordance with an embodiment of the present invention.

FIG. 7 is an overview 700 of the main processes 720 performed by a Trafficwiz™ appliance, whether integrated, partitioned, or distributed, comprising training-phase processes 740 and operational-phase real-time processes 750. Processes of the training phase 740 comprise labeling of unlabeled flow records performed at a labeler 760 and synthesizing an AI model by a Modeler 770 to be used by the classifier 780 in the operational phase. Processes of the operational phase 750 comprise classifying fresh traffic flows received from the live network or from clients using the classifier 780.

Figure 8:
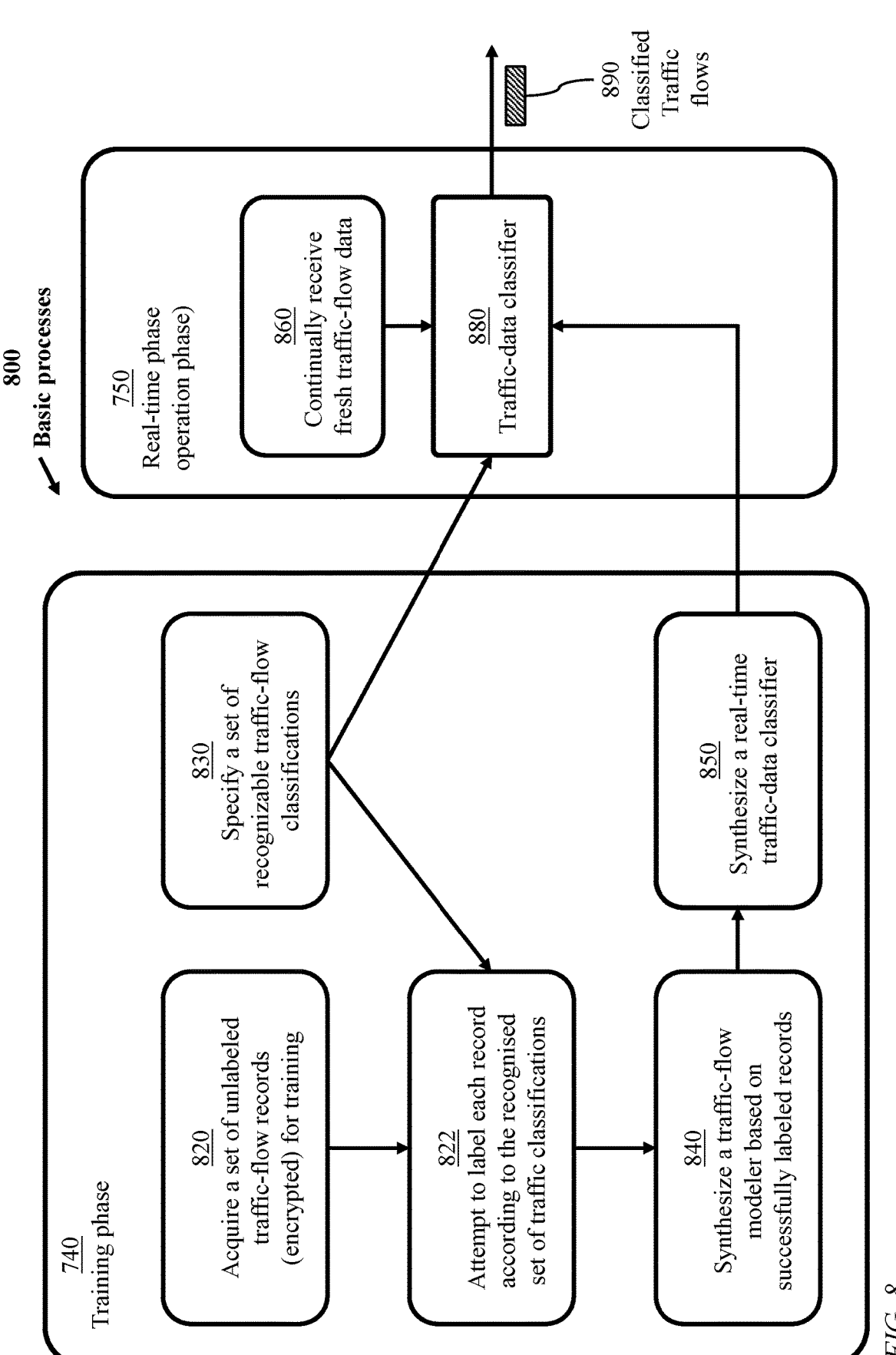
FIG. 8 illustrates more detailed processes performed at a Trafficwiz™ appliance.

FIG. 8 illustrates more detailed basic processes 800 performed at a Trafficwiz™ appliance whether integrated (FIG. 1), partitioned (FIG. 2), or distributed (FIG. 5). Process 820 acquires set of traffic records for training (comprising an initial predetermined set of traffic records and any traffic records labeled during the real-time operational phase). Process 830 acquires or specifies a set of recognizable traffic-flow classifications. Process 822 attempts to label each of the traffic records. Process 840 synthesizes a traffic-flow modeler based on successfully labeled traffic-flow records. Process 850 synthesizes a real-time traffic-flow classifier. Process 860 continually receives fresh flow data from clients or live network traffic 610 through network interface 552 (FIG. 5). Process 880 performs real-time traffic-flow classifications using synthesized classifier 850 to produce respective flow classifications 890.

Figure 9:
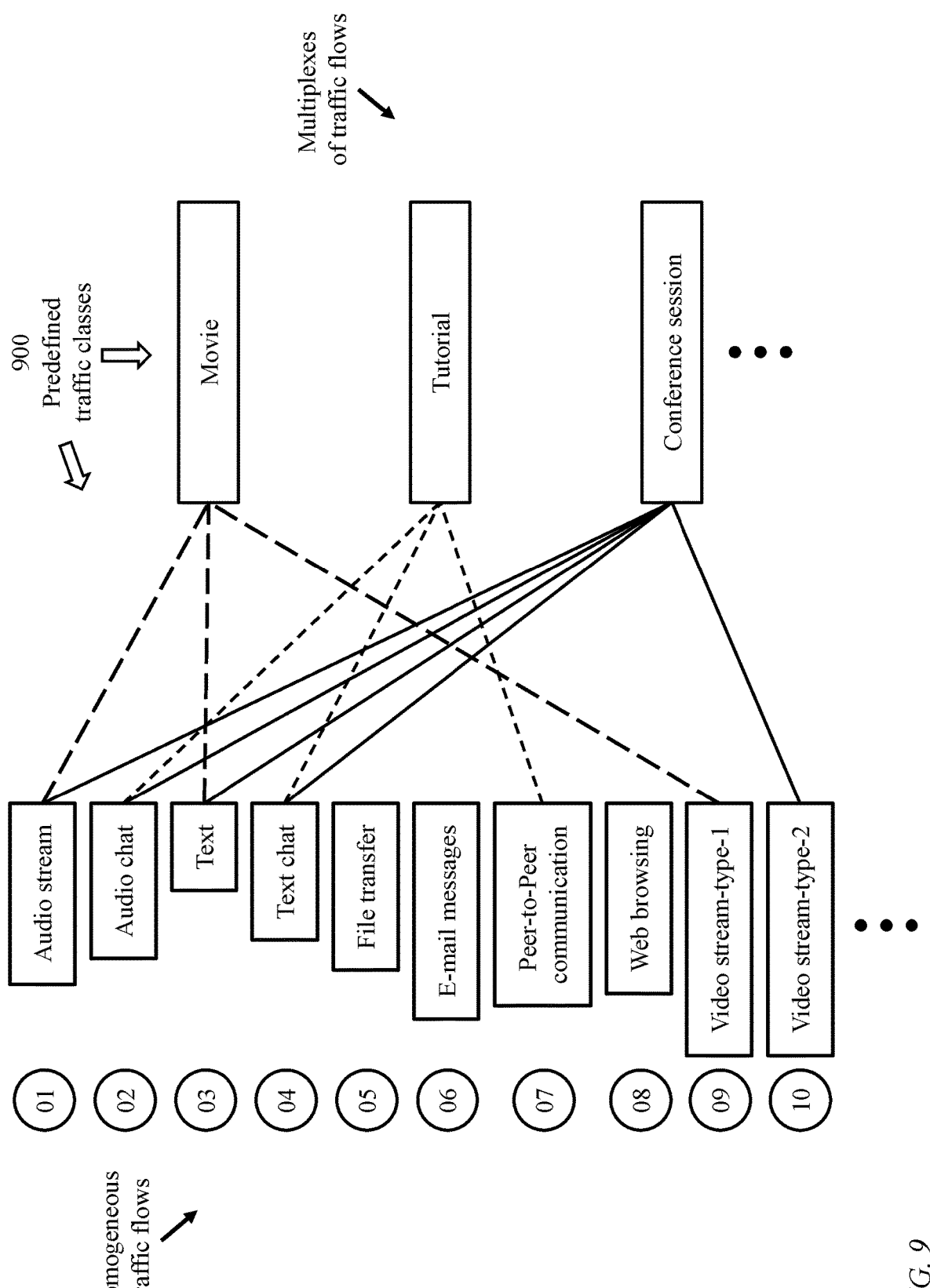
FIG. 9 illustrates an exemplary predefined set of homogeneous traffic flows, as well as a predefined set of composite traffic flows each formed as a multiplex of a respective subset of the set of homogeneous traffic flows.

FIG. 9 illustrates an exemplary predefined set 900 of flows comprising homogeneous flows, as well as a pre-defined set of composite flows each formed as a multiplex of a respective subset of the set of homogeneous traffic flows.

The exemplary set of homogeneous flows (indexed as 01 to 10, comprises: an audio stream (a one-directional, downstream flow); an audio conversation (colloquially "audio chat"); a one-directional text; a two directional text; a file transfer; an e-mail message; a point-to-point communication; a web browsing session; a video-stream of a first type (e.g., low resolution, a specific family of protocols; etc.); and a video stream of a second type (e.g., high-definition video streams).

Given the continuously evolving communication services, a set of composite flows, each encoded as a multiplex of homogeneous flows may be considered. For example, a typical video stream comprises, in addition to video signals, audio signals and -encoded texts.

FIG. 10 illustrates an exemplary training dataset 1000 of flows to be labeled, according to the predefined flow classes, undergoing preparatory (training) operations of filtering, clustering, and sampling. An initially acquired set 1010 of unlabelled flows, stored in a respective memory device, comprises records 1012 of individual flows which may include outliers 1014 which would be filtered out.

A process 1020 filters the flow records of the set 1010 of unlabeled flows according to pre-established criteria which may be periodically or occasionally updated as the need arises. The filtering process produces a set 1022 of flow records retained to be used in the processes of the training phase. Process 1030 clusters and visualizes the flow records 1022 using any of well-established techniques. Four clusters of records, referenced as 1032(1) to 1032(4) are illustrated.

Due to feasibility considerations, labeling of set 1022 of filtered flows is performed using successive subsets of set 1022, selected according to an appropriate sampling method. The selected subsets are also referenced as "samples". Set 1022 is a sampling space which is modified after drawing and processing each sample.

Process 1040 samples set 1022 of filtered flows to extract subsets of a number of flow records within a specified range of the number of flows per sample. In the illustrated example, six samples (six subsets) of set 1022, individually labeled as samples 1042(1) to 1042(6). Each sample may include flows belonging to different clusters. As indicated in the exemplary case of FIG. 10, each sample includes flows from each of the four produced four clusters. Conversely, each of the four clusters is represented in each of the six samples.

It is important to note that the samples are drawn during successive time periods and the subset of flows in each sample may not be entirely labeled. Labeled flows of each sample are removed from set 1022 of filtered flows while unlabeled flows of a sample remain in the sampling space. Thus, successive samples may include common flows. The intersection of successive samples is not illustrated in FIG. 10 but will be elaborated in other drawings; see, for example, FIGS. 28 to 30.

Generally, a large filtered set of flow records may be processed for labeling in numerous samples (numerous subsets or flow records). The number of successive subsets to be drawn during a training epoch may be predefined or determined according to a criterion such as exhaustion of the training dataset of a current training epoch or labeling saturation. Labeling saturation occurs if a predefined number of successive samples fail to increase the number of labeled flow records, i.e., the remaining sample space does not change. This condition may arise when the set of filtered flow records 1022, which excludes outliers, may contain flows that cannot decisively be associated with any of the pre-defined flow classes.

Figure 11:
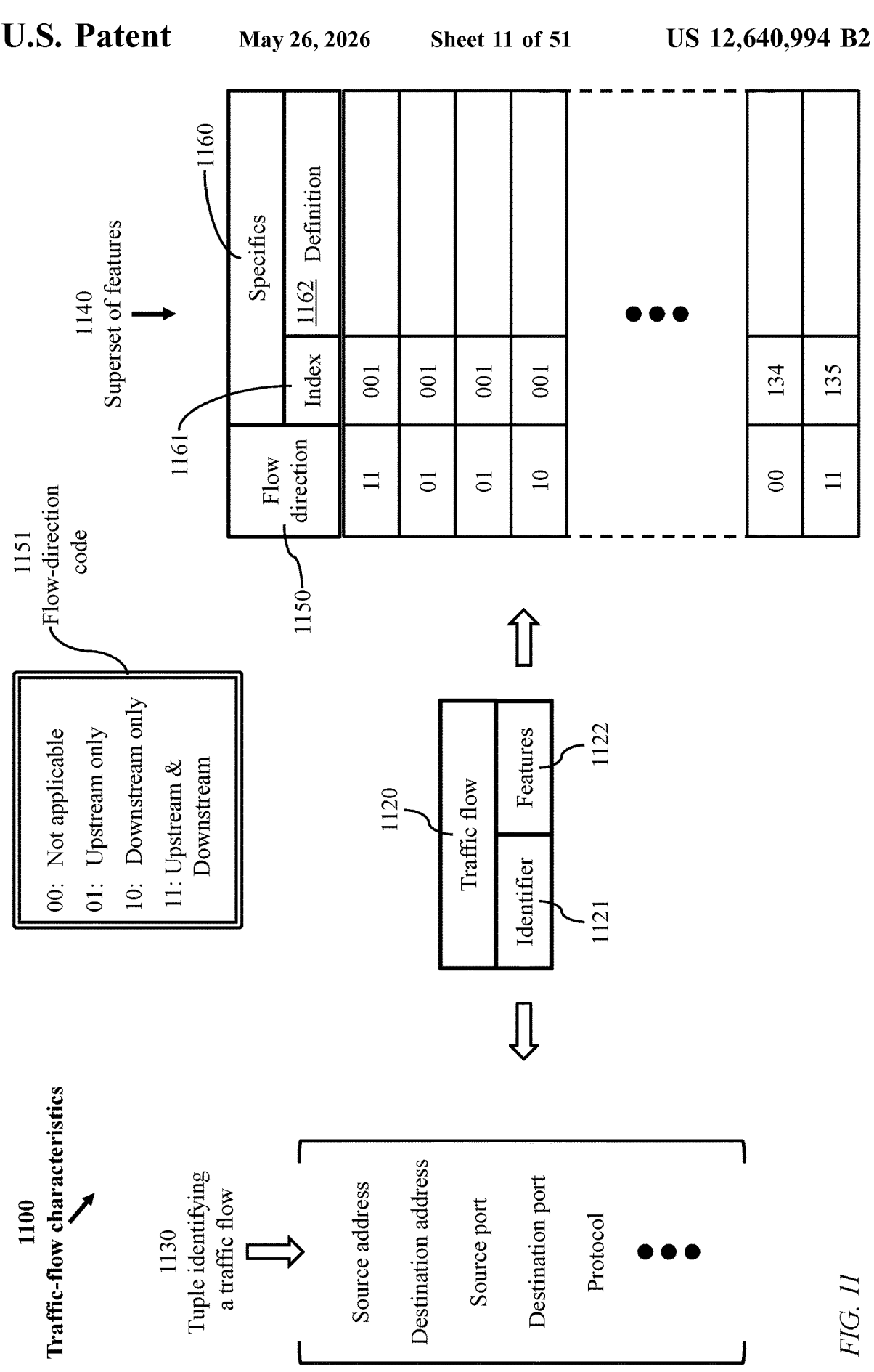
FIG. 11 illustrates traffic-flow characterization, for use in an embodiment of the present application.

FIG. 11 illustrates an example 1100 of flow characterization. An identifier 1121 and specific characteristics 1122 are associate with each flow 1120. The identifier 1121 is preferably expressed as a tuple 1130 containing at least five entries {Source address; destination address; source port; destination port; protocol according to which the flow is structured}. The characteristics 1122 of a flow are preferably organized as a table 1140 of a superset of predefined generic features, each feature associated with a respective flow-direction code 1150. The features are also referenced as "descriptors", "metadata" or "statistics".

The values 1151 of code 1150 indicate flow-direction pertinence of respective features. For example, a code of "00" indicates that a corresponding feature is not relevant to a specific flow 1120 under consideration, a code of "01" indicates that a respective feature is applicable in the upstream (forward) direction only, a code of "10" indicates that a respective feature is applicable in the downstream (backward) direction only, and a code of "11", indicates a respective feature is applicable in both the upstream and downstream directions. Feature specifics 1160 include at least a respective index 1161 and a respective coded definition of each feature.

The flow features are captured for each direction, i.e., forward and backward, and comprise:

(1) Four features capturing Minimum, mean, maximum, standard deviation of packet sizes;
    (2) Four features capturing Minimum, mean, maximum, standard deviation of packet inter-arrival time;
    (3) Two features capturing total number of packets;
    (4) Two features capturing total bytes in a flow;
    (5) Two features capturing total payloads in a flow;
    (6) Two features capturing total number of payload packets in a flow;

(7) Four features capturing entropy of packet sizes and entropy of inter-packet arrival time;

(8) Fifty features capturing probability of state transition between consecutive packets with same and different packet sizes;

(9) Fifty features capturing probability of state transition between consecutive packets with same and different inter-packet arrival time; and

(10) Four feature capturing probability of state transition for packet direction between consecutive packets.

These features are key to representing temporal and spatial characteristics of encrypted traffic. It is understood that additional features can be defined and added to the above set of features.

Figure 13:
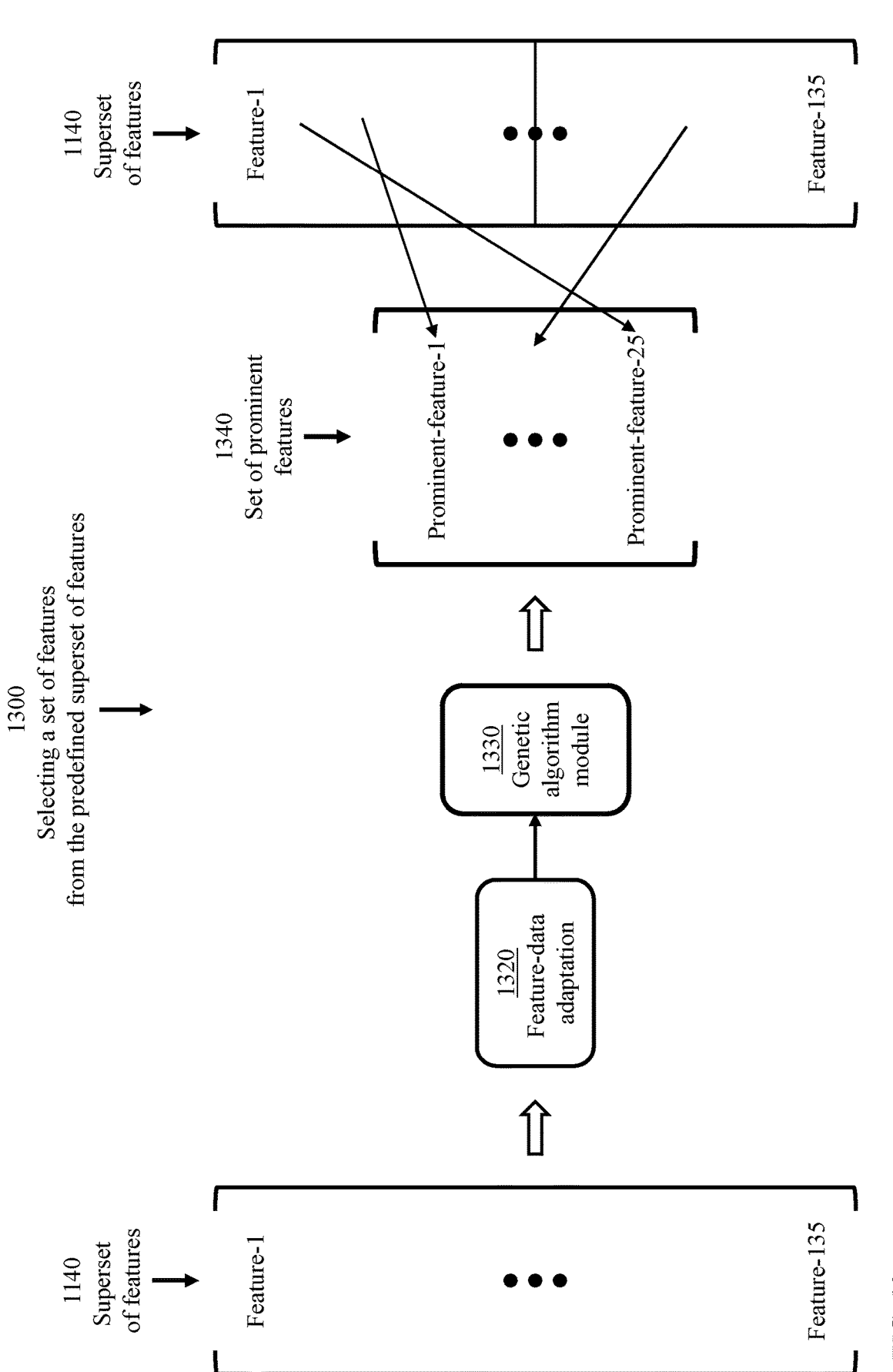
FIG. 13 illustrates optimal selection of a set of prominent features from the predefined superset of features, for use in an embodiment of the present application.

The superset of features may be pruned to a smaller set of features without sacrificing labeling accuracy as illustrated in FIG. 13.

Figure 12:
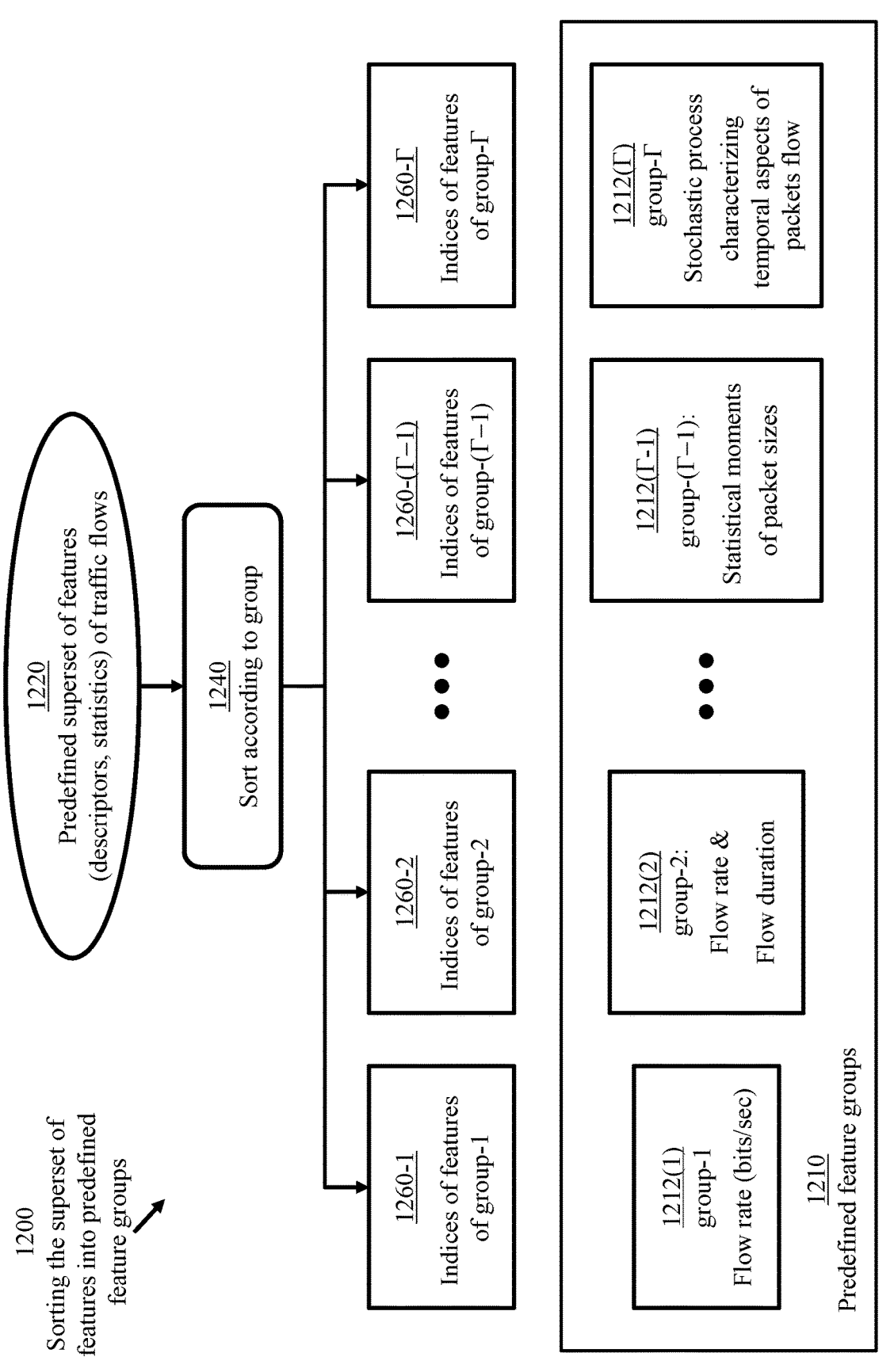
FIG. 12 illustrates grouping a predefined superset of traffic-flow features according to a predefined set of feature categories, for use in an embodiment of the present application.

FIG. 12 illustrates a process 1200 of sorting the predefined superset 1140 of flow features according to a predefined set of feature categories to facilitate a process of co-training to be discussed below. To start, a predefined set 1210 of $\Gamma$ feature categories, $\Gamma > 1$, individually referenced as 1212(1) to 1212($\Gamma$), is acquired. A process 1240 sorts features of the superset 1140 of features according to the predefined set 1210 of feature categories to produce $\Gamma$ bins 1260 of category-specific features, the bins are individually referenced as 1260(1) to 1260($\Gamma$). Each bin includes indices 1161 of features of the superset of features 1140. Separately, the grouping of features can be utilized as the basis of generating different AI models for classification.

FIG. 13 illustrates a process 1300 of optimal selection of a set of prominent features from the predefined superset of features 1140. Process 1320 illustrates one embodiment of optimal selection which adapts feature data for processing in a genetic-algorithm module 1330. The genetic algorithm is activated to produce a set 1340 of prominent features extracted from the predefined superset of features.

FIG. 14 illustrates a scheme 1400 for continuous training of the Trafficwiz™ appliance (whether integrated 100, partitioned 200, or distributed 500). A process 1410 continually acquires global training flow records (global training dataset) over a moving time window, such as a moving training epoch of a predetermined duration (a week, a month, etc.). In a training stage 1420 for a current time-window (a current epoch), processes 1430 selects successive samples (subsets) of the global training flow records of the current time-window. Each of processes 1440(0) to **1440(S*)**, S*being an index of a last sample of the current time window, attempts to label each constituent flow. The labeling processing may conclude with successfully labeling all, or some, flows of the global training dataset. The successfully labeled flows are used in process 1460 to synthesize the modeler 770, i.e., generate the model and associate algorithmic determine parameters defining the operational modeler 770.

Figure 15:
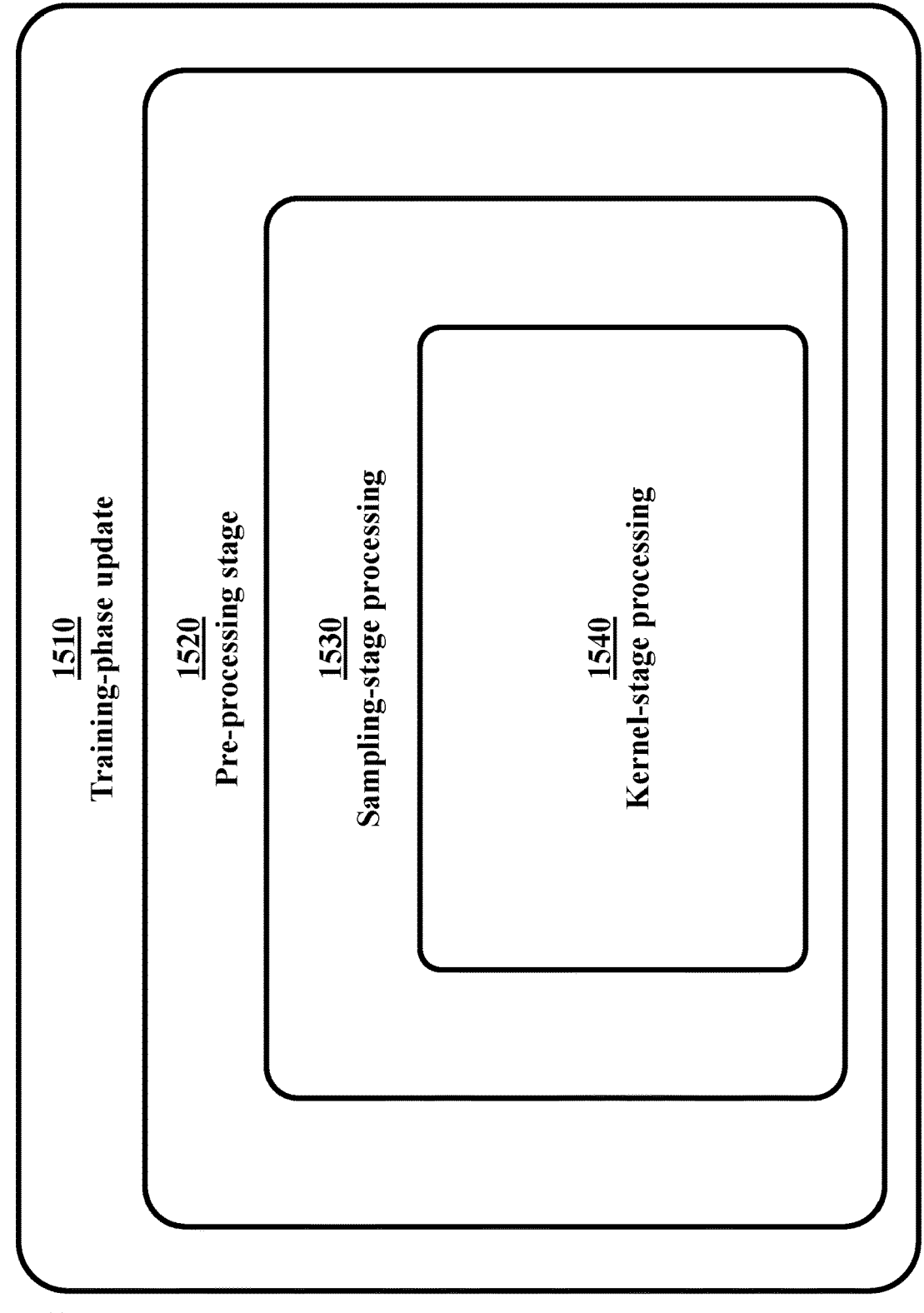
FIG. 15 illustrates nesting of stages of the scheme of FIG. 14, where each training phase of a continual sequence of training epochs includes multiple preprocessing stages, each preprocessing stage including multiple sampling stages, each sampling stage including multiple single-flow process-ing stages (referenced as Kernel stages), in accordance with an embodiment of the present invention.

FIG. 15 illustrates nesting arrangement 1500 of stages for the scheme of FIG. 14, where each training phase 1510 of a continual sequence of training epochs includes multiple preprocessing stages 1520, each preprocessing stage including multiple sampling stages 1530, each sampling stage including multiple single-flow processing stages 1540 (referenced as Kernel stages).

Figure 16:
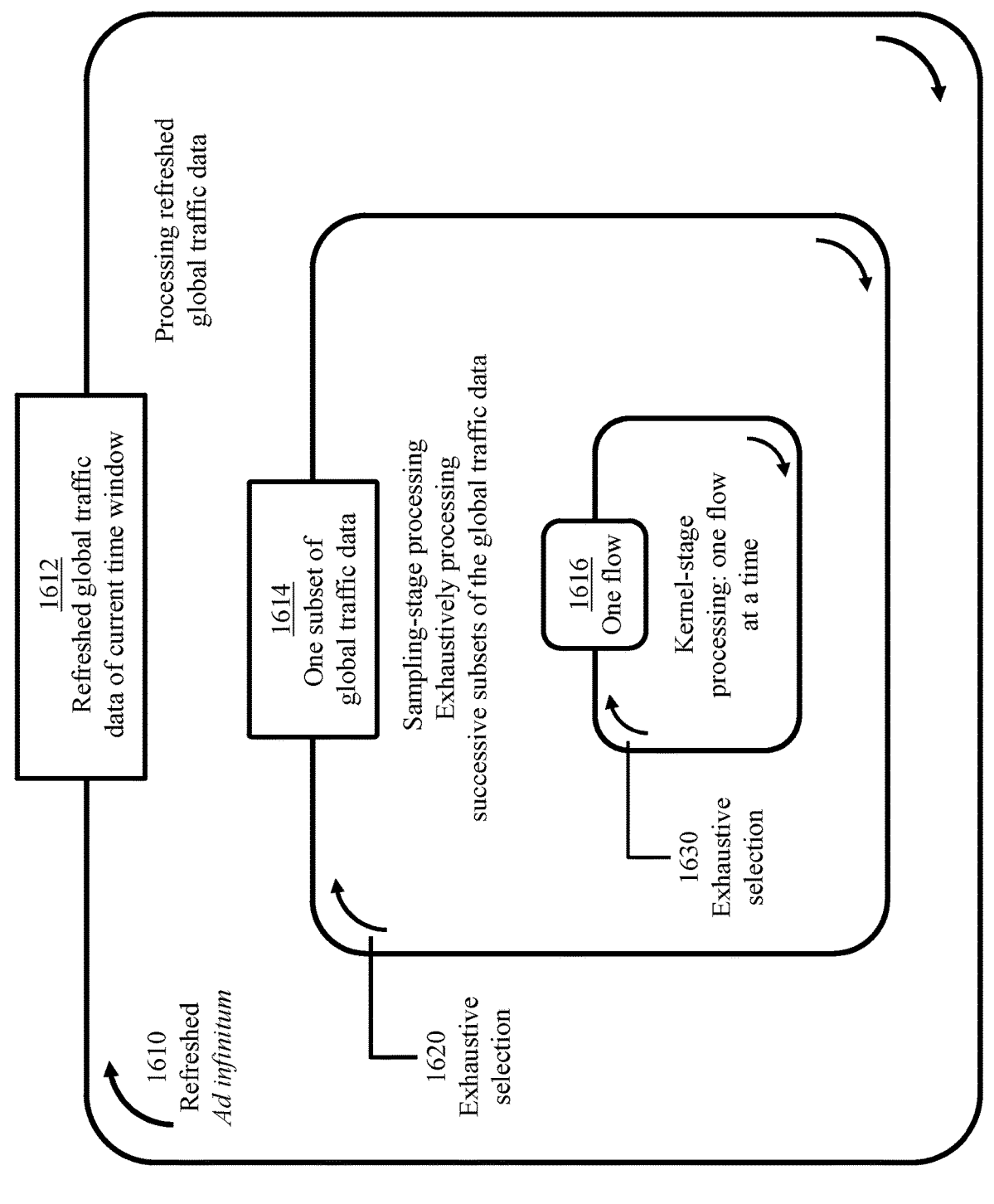
FIG. 16 illustrates further details of the stages of FIG. 15.

FIG. 16 further details the stages of FIG. 15 indicating recursive processes 1600 of updating of the global training dataset. Processes of outer loop 1610 are activated during successive time windows (successive training epochs) to produce refreshed training data 1612 for use in a current time window (a current training epoch). Processes 1620 of intermediate loop 1620 selects successive subsets 1614 of the training dataset executed during successive sampling periods, i.e., periods of attempting to label successive subsets of traffic flows. Processing 1630 of the inner loop 1630 selects a flow of one traffic flow, with corresponding data 1616, and attempts to label the flow.

FIG. 17 illustrates a method 1700 of labeling a massive set of unlabeled or tentatively labeled traffic-flow records, based on progressively modifying the composition of the massive set as traffic-flow records get labeled.

Initially, a memory device 1710 stores a superset of M unlabeled flow records, M may be a relatively large integer. To start, a process 1720 extracts a sample of at most a predefined number, L, L<<M, of flow records from the unlabeled flow records stored in memory device 1710. The sample is presented to process 1750 which carries out a labeling process utilizing multiple approaches including AI and machine-learning approaches, limited to handle at most L records at a time. After attempting to label all flows of the sample, process 1760 places records of successfully labeled flows in a memory device 1780 and updates the content of memory device 1710 to remove records of the successfully labeled flows. Process 1730 then determines whether another sample need be drawn.

Recursive process 1740 cyclically activates processes 1720, 1750, 1760, and 1730 until a termination condition is reached.

Process 1730 revisits process 1720 to extract another sample if none of predetermined conditions is reached. The predetermined conditions may include:

(1) the number of remaining unlabeled flow records in memory 1710 is less than a respective predetermined lower bound;

(2) the proportion of the initial total number, M, of unlabeled records that has been successfully labeled exceeds a respective predetermined upper bound;

(3) a succession of a predetermined number of samples failed to produce any labeled flow records (which may trigger an alarm signal); and (4) any criterion for ending the recursive process 1740 has been attained.

If any of the four conditions is reached, process 1790 terminates the labeling process for a current time window (a current epoch).

Figure 18:
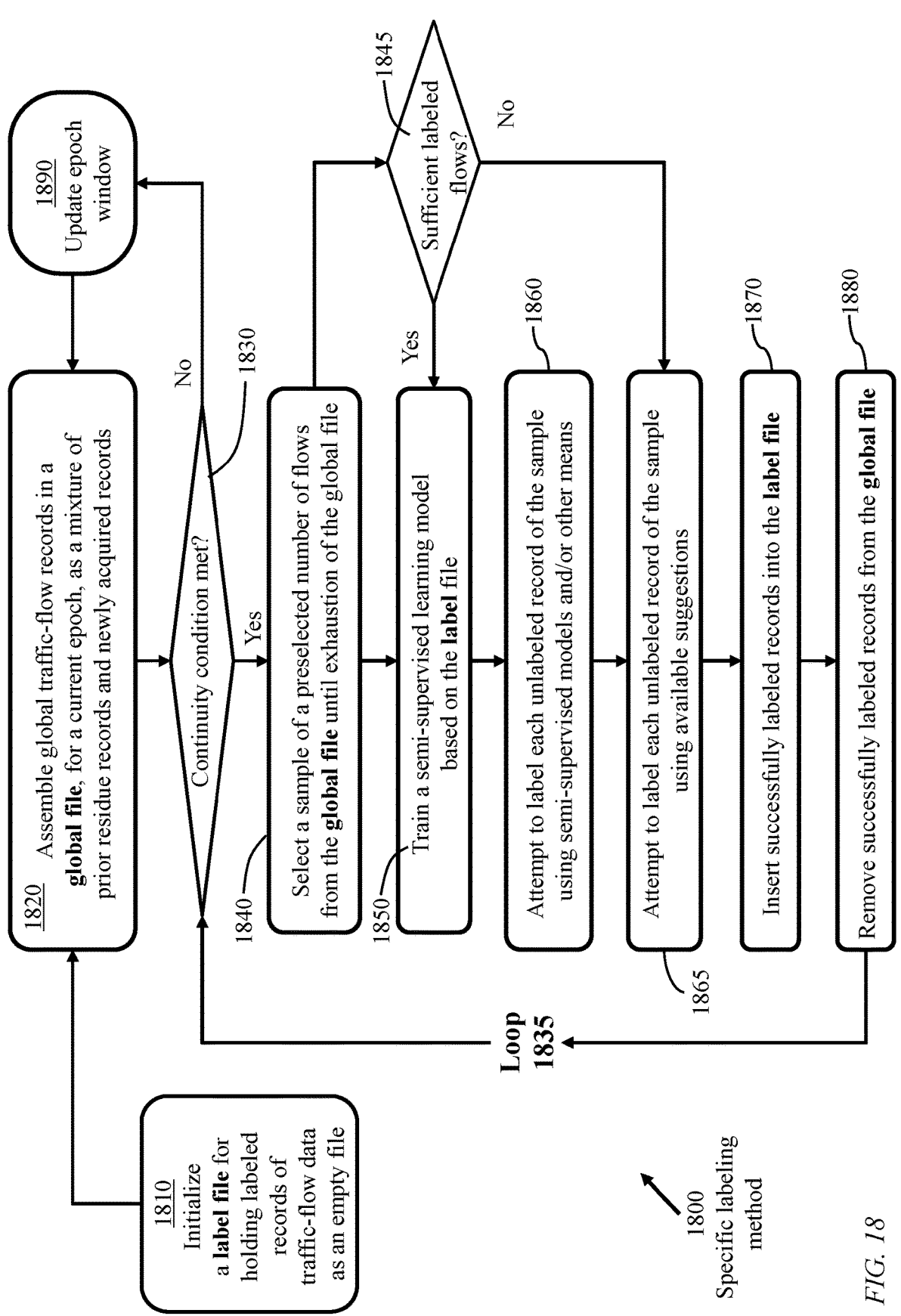
FIG. 18 illustrates an exemplary application of the method of FIG. 17, in accordance with an embodiment of the present invention.

FIG. 18 is a flow chart 1800 of a specific implementation of the method of FIG. 17 In process 1810, a file, referenced as a "label file", for holding labeled records of traffic flows, is initialized as an empty file. Process 1820 assembles records of candidate training data in a "global file". For a first training epoch (training time window), the global file contains only unlabeled records. For subsequent training epochs, the global file may contain a mixture of prior records as well as newly acquired records. At branching process 1830, loop 1835 is activated if a condition for continuing processing of a current epoch is met; otherwise training data is prepared for a new epoch (new time window) in process 1890 then process 1820 is revisited.

Loop 1835 activates processes 1840, 1850, 1860, 1865, 1870, and 1880 before returning to branching process 1830:

process 1840 selects a sample (a subset) of a preselected number of records from the global file;

Branching process 1845 proceeds to process 1850 if the label file contains a sufficient number of labeled flow records, otherwise 1845 proceeds directly to process 1860 where labeling is attempted without the benefits of the semi-supervised learning model;

process 1850 trains a semi-supervised learning model based the label file;

process 1860 attempts to label each record of the selected sample;

process 1865 attempts to label each unlabeled record of the sample using available suggestions;

process 1870 inserts successfully labeled records into the label file;

process 1880 removes successfully labeled records of the sample from the global file then returns to branching process 1830.

Figure 19:
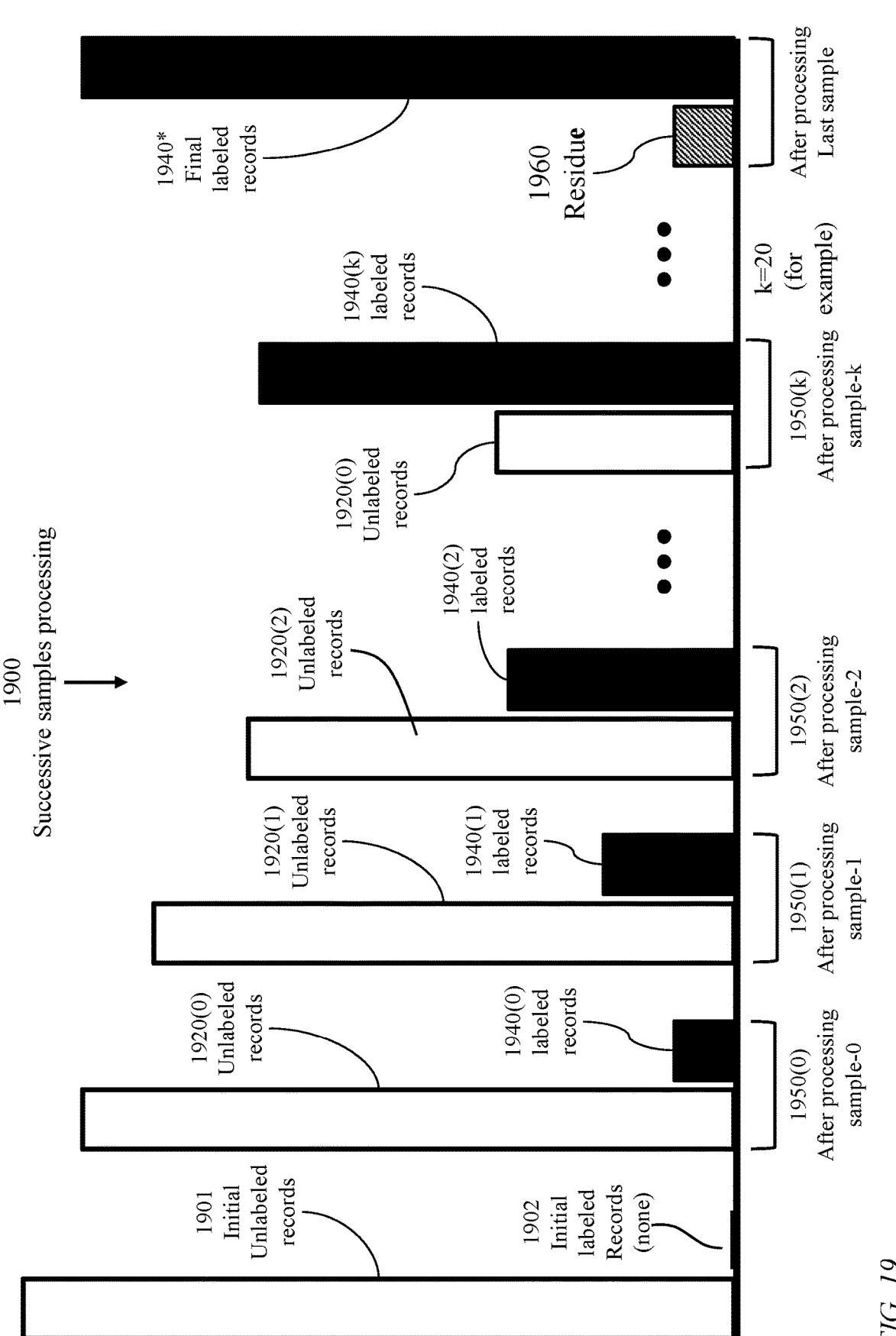
FIG. 19 illustrates an exemplary outcome of applying the method of FIG. 18.

FIG. 19 illustrates an exemplary outcome 1900 of applying the implementation of FIG. 18, indicating growth of the number of labeled records during successively selected subsets of the training dataset. Initially, the global file contains a number M, reference 1901, of unlabeled flow records and the label file contains zero labeled flow records (reference 1902). After processing a number a (at least one) of seed samples to build-up the label file to a prerequisite level, subsequent samples are drawn from the global file to be processed with the benefit of the semi-supervised learning module (process 1860). Counts of unlabeled records after processing successive samples, starting with the last seed sample, are individually referenced as 1920($\alpha$+j), $0 \leq j \leq j^*$, where $j^*$ is determined at the branching process 1830. Counts of labeled records after processing successive samples, starting with the last seed sample, are individually referenced as 1940($\alpha$+j), $0 \leq j \leq j$. Counts of all records after processing successive samples, starting with the last seed sample, are individually referenced as 1950($\alpha$+j), $0 \leq j \leq j$. A count (reference 1960) of residual flow records of the global file is indicated. The residual flow records are flow records that were not labeled, due to reaching any of conditions (1) to (4) recited above in the description of FIG. 17.

Thus, residual flow records contain unlabeled flows, which may belong to legitimate network traffic, or may contain malicious code which does not fit into traffic classification types. Therefore filtering residual flows may improve computer security, by separating the malicious traffic from labeled classified traffic flows.

Figure 20:
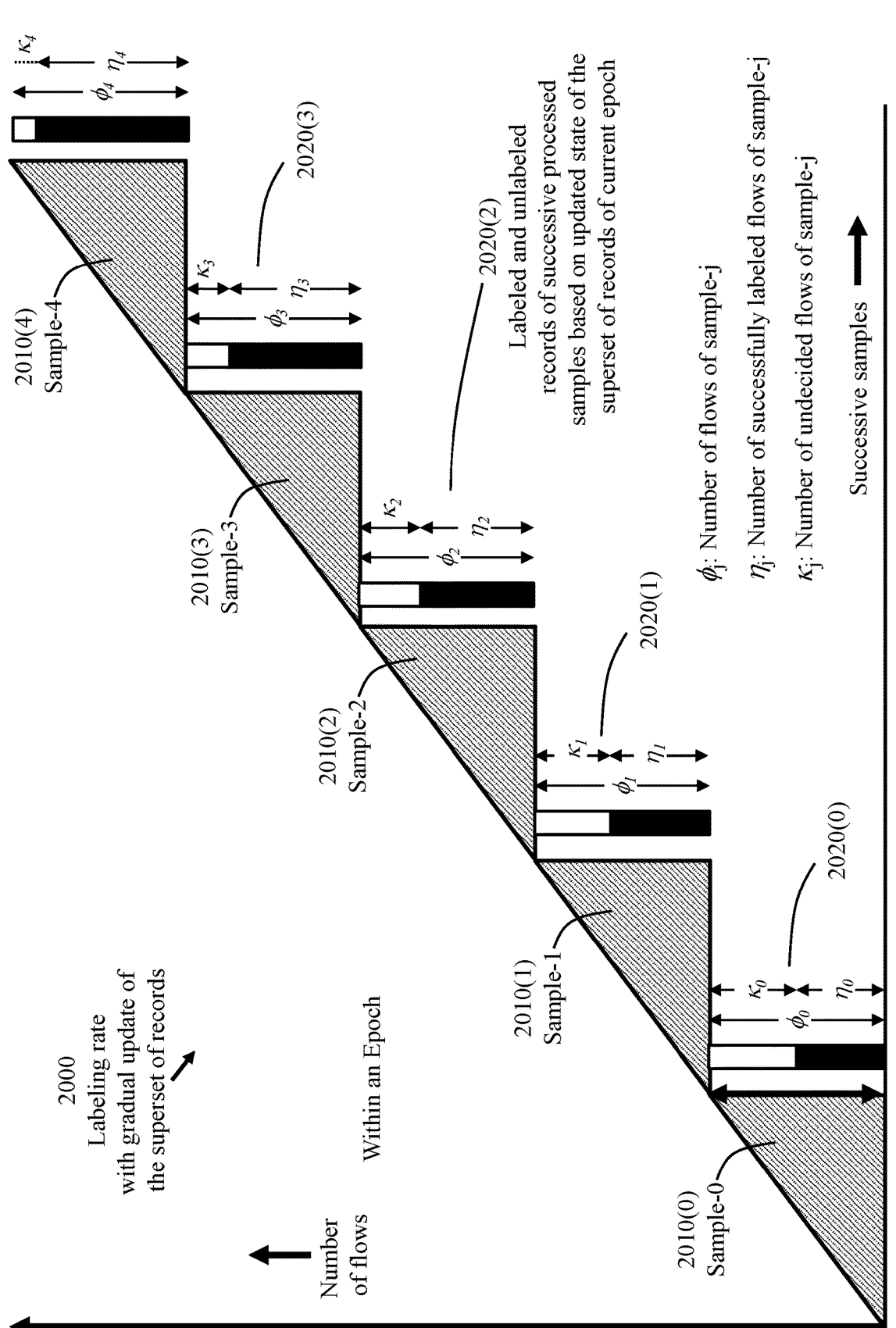
FIG. 20 illustrates labeling attainment for successive samples based on changing composition of the global traf-fic-flow records.

FIG. 20 illustrates labeling attainment 2000 for successive samples based on growth of the overall number of trained flow records as successive samples are drawn from the global file and processed for labeling. The sample sizes 2020 are individually referenced as 2020($\Theta$+j), $0 \leq j \leq j^*$, where $j^*$ is determined at the branching process 1830. The number 2020($k$) of drawn flow records of a sample of index k, $\Theta \leq k \leq (\Theta + j^*)$, is denoted $\phi_k$. The numbers of labeled and unlabeled flow records are denoted $\eta_k$ and $\lambda_k$, respectively: $\eta_k + \lambda_k = \phi_k$.

As illustrated in FIG. 18, when the cumulative number of labeled flow records is smaller than a predefined threshold, labeling of pending unlabeled flows is performed without the benefit of the semi-supervised learning model. As more flows are successfully labeled, the probability of successful labeling in a single attempt increases leading to an increase in the ratio ($\eta_k/\phi_k$) over successive samples. As illustrated, the ratio ($\eta_4/\phi_4$) is significantly larger than the ratio ($\eta_1/\phi_1$).

FIG. 21 illustrates an exemplary global set 2100 of flows, where each flow is presented as a vector 2120 of a multi-dimensional space. A simplified two-dimensional space is used for ease of presentation. A vector 2120 of flow characteristics is also referenced as a flow record, or simply a "record", and illustrated as a dot in FIG. 21. The global set of flows may be divided into a set of clusters, each cluster containing a number of records. Several clustering methods may be employed.

In a popular clustering method known as the k-mean method, a number of clusters is specified, each initialized to have a proposed centroid, which may be selected from the global set 2100, then clusters are formed according to proximity-to-centroid criteria. With the number of centroids specified, the resulting cluster sizes (numbers of flows within each cluster) may vary significantly and iterative revisions may be applied to redistribute flows of clusters of sizes outside an acceptable range.

In another popular clustering method known as the DBSCAN method (density-based spatial clustering of applications with noise), two parameters, $\rho$ and $\nu$, are specified where $\rho$ denotes a radius of a hypersphere and $\nu$ denotes a minimum number of vectors within a hypersphere of radius $\rho$. Both $\rho$ and $\nu$ are scalars. For a given global set of records (vectors), specified values of a pair $\{\rho, \nu\}$ leads to a respective number of clusters. The labeling process (FIG. 7, FIG. 10. FIG. 15) relies on clustering the global set of vectors with a preferred number of clusters in the range 20 to 25. Thus, if the DBSCAN method is employed, the parameters $\{\rho, \nu\}$ have to be selected to produce the desired number of clusters. There may be numerous paired values that produce a target number of clusters. Starting with a lower bound $\rho_1$ of $\rho$ and an upper bound $\rho_2$ of $\rho$, corresponding values of $\nu_1$ and $\nu_2$, respectively of $\nu$ may be determined based on a predefined function of $\rho$. A value of $\rho$ that yields the target number of clusters may be determine using well known methods such as successive bisection, successive linear interpolation, or a combination of linear interpolation and parabolic interpolation. Two hyperspheres 2140(1) and 2140(2), of radii $\rho_1$ and $\rho_2$, are illustrated. Each of the corresponding encompassed numbers of vectors, $\nu_1$ and $\nu_2$, exceeds or equals a corresponding lower bound.

Figure 22:
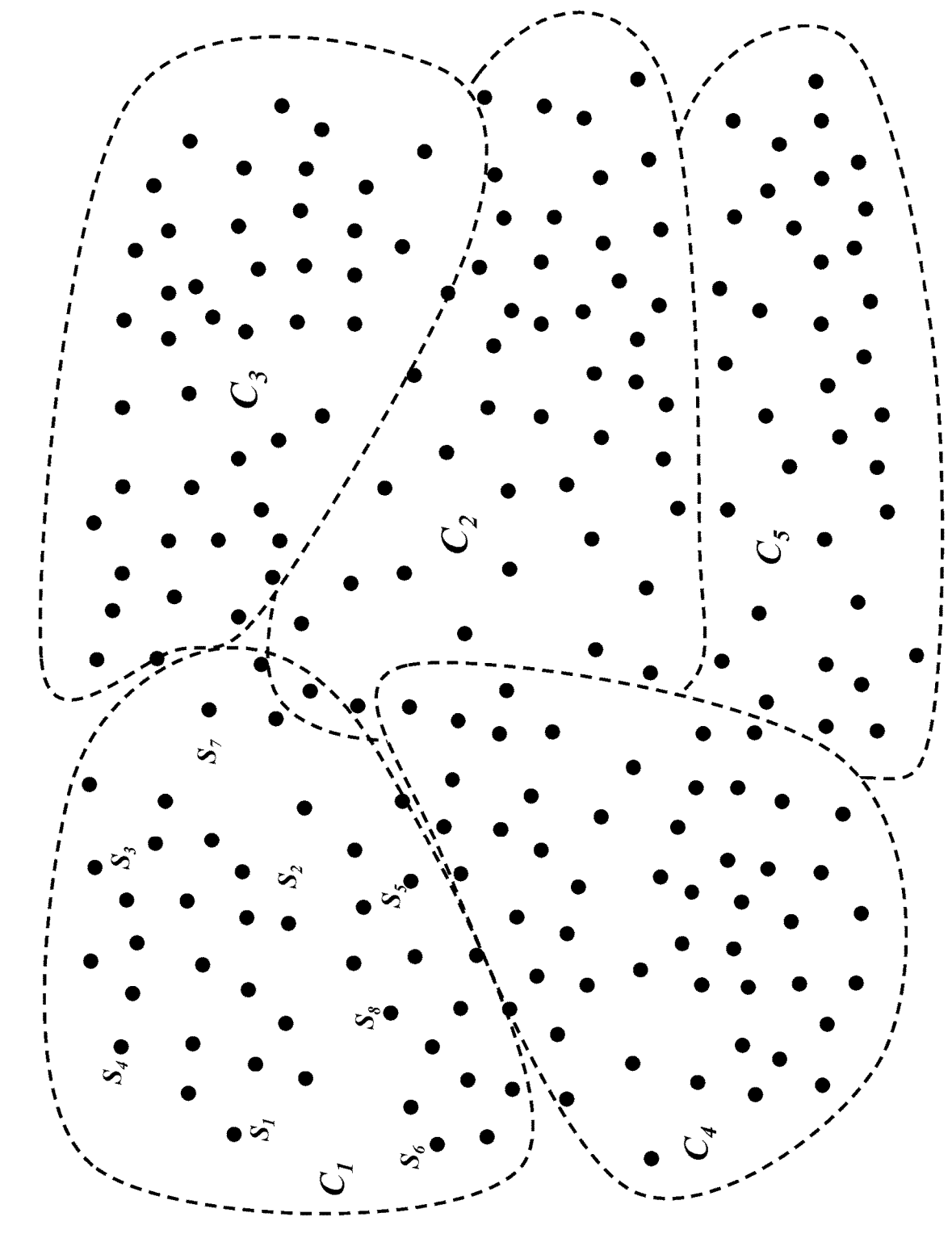
FIG. 22 illustrates exemplary clusters of the global set of traffic flows, for use in an embodiment of the present invention.

FIG. 22 illustrates an example 2200 of clusters C1, C2, C3, C4, and C5 of the global set of flows. With appropriate random selection of flows of each sample (each subset of flows), flows of each cluster would be selected in several samples.

Figure 23:
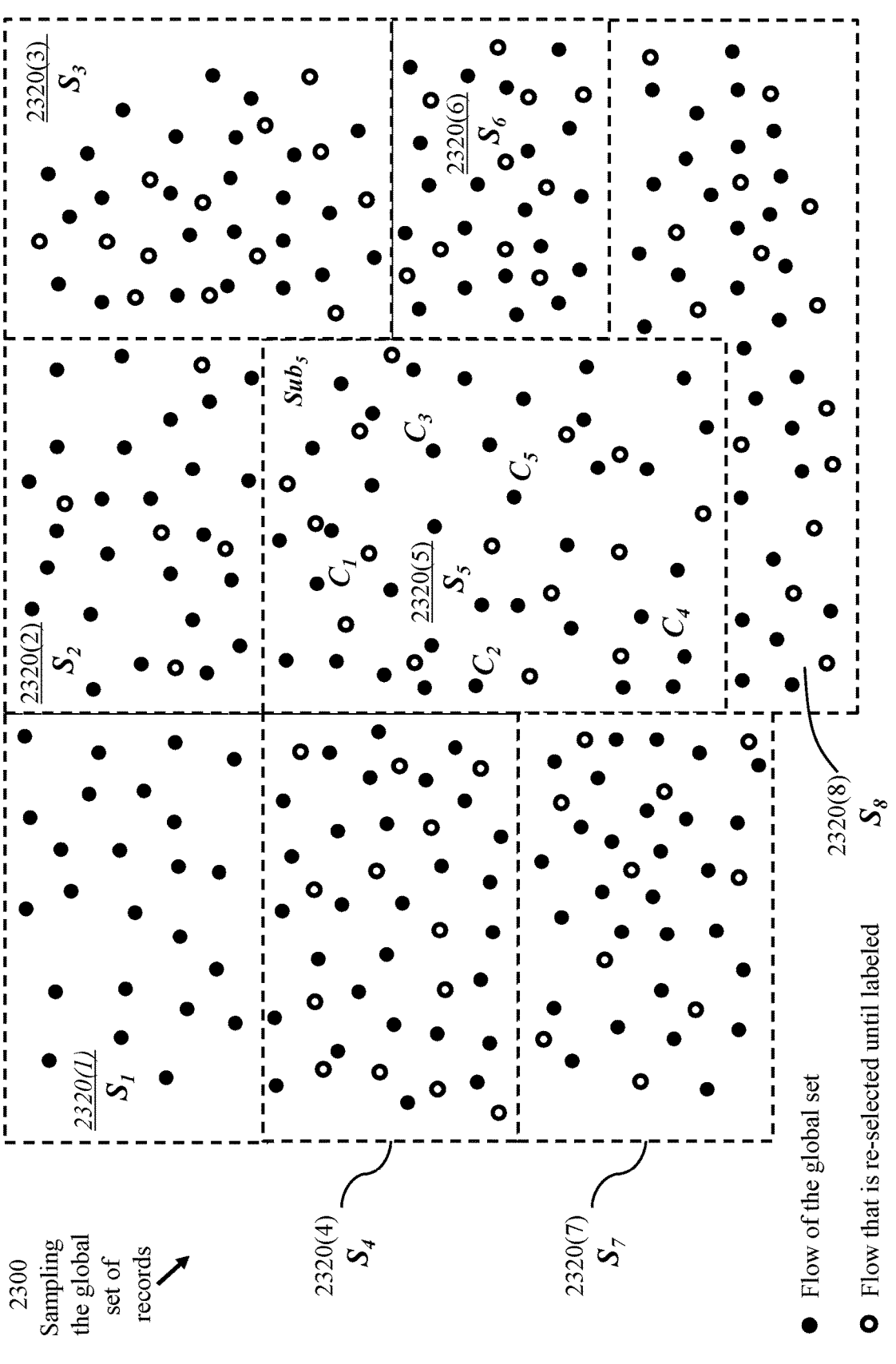
FIG. 23 illustrates successive samples drawn from the global set of traffic flows, for use in an embodiment of the present invention.

FIG. 23 illustrates an example 2300 of successive samples $S_1, S_2, \ldots, S_8$, (reference 2320(1) to 2320(8)) drawn from the global set 2100 of flows, with partial replacement where flows of any sample that could not be decisively labeled are returned to the global set. As illustrated in FIG. 20, the proportion of successfully labeled flows within each sample grows steadily in successive samples because any flows not labeled during the pass of a particular sample will be considered for labeling in the pass of a future sample. The number $\lambda_k$ of unlabeled flows in a sample of index k, $k \geq 0$, remains in the global file. In the illustrated example, the first drawn sample $S_1$ contains 25 unlabeled flows. selected from the initial flows present in the global file, of which several flows were not successfully labeled and remained in the global file. The second sample $S_2$ drawn from the reduced global set 2100 contains 30 unlabeled flows of which 5 flows were considered in sample $S_1$. The formation of successive samples continues with each sample potentially containing a mixture of flows which were not considered yet as well as flows that may have been considered, but are still unlabeled, in the processing of preceding samples.

Appropriate random selection of constituents of each sample is of paramount importance.

Figure 24:
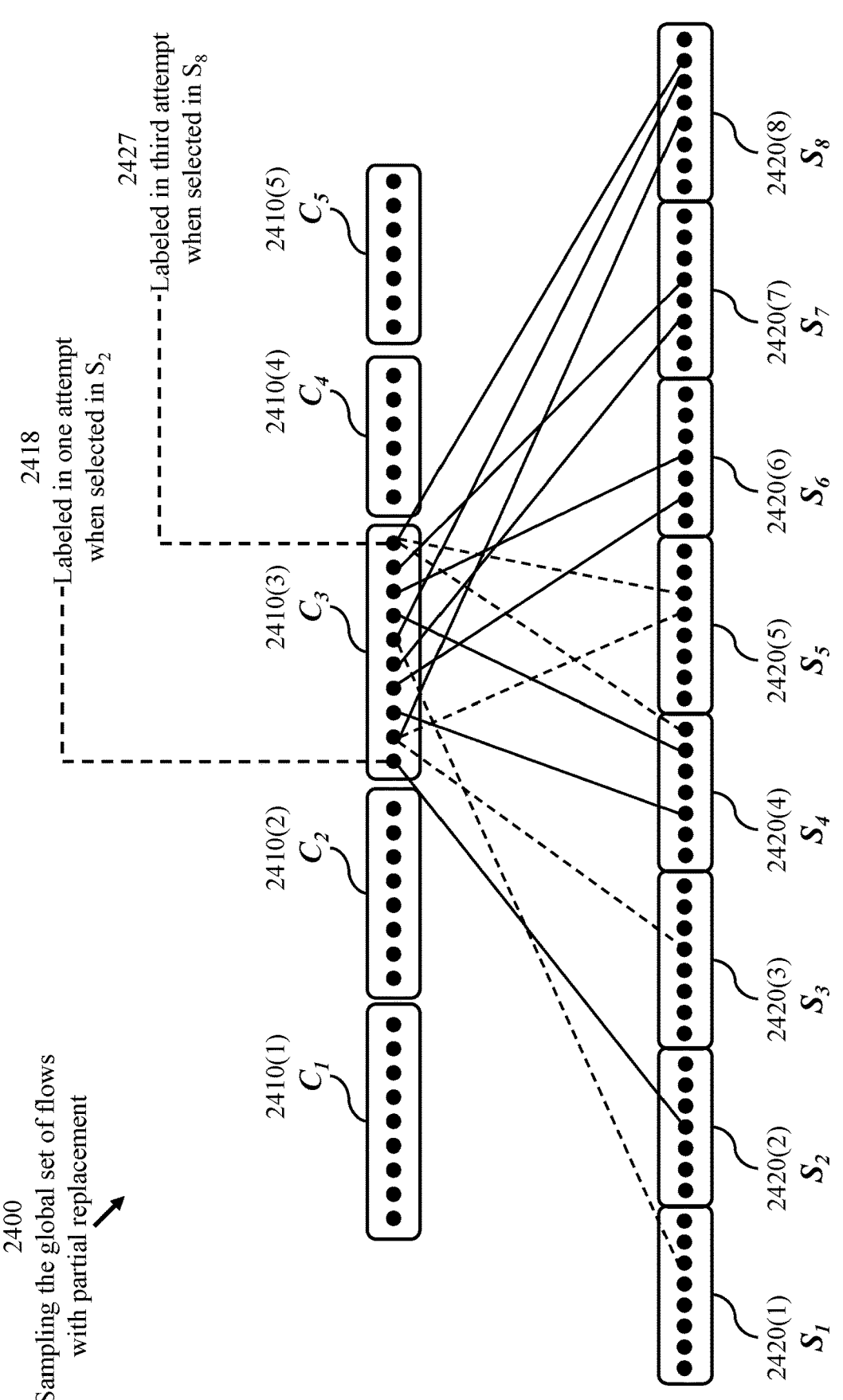
FIG. 24 illustrates a process of sampling with partial replacement of the global set of flows.

FIG. 24 illustrates a process 2400 of sampling with partial replacement. A miniature global file containing only 40 flows is clustered into five clusters 2410(1) to 2410(5), denoted $C_1$ to $C_5$, respectively. Following the process of FIG. 23, eight samples 2420(1) to 2420(8), denoted $S_1$ to $S_5$, respectively are formed. The combined content of the eight samples is larger then 40 because several flows were not labeled in a first attempt of a respective sample-processing stage. The sample of index 18 of the clustered flows was selected once and successfully labeled in sample $S_2$. However, the sample of index 27 was selected in samples $S_4$, $S_5$, and $S_8$, where it was successfully labeled in the latter.

FIG. 25 illustrates processes 2500 of the pre-processing stage. Process 2510 acquires raw unlabeled flow records to be stored in a respective memory device 2512. Process 2520 filters the raw unlabeled flow records to exclude flow records considered to be outliers according to respective methods. Resulting filtered raw unlabeled flow records may be stored in a separate memory device 2522 or in a partition of memory device 2512. The filtered raw unlabeled data is supplied to a clustering process 2530 and to a process 2580 for generating augmented flow records.

Process 2530 performs a clustering process of the filtered raw unlabeled flow records, stored in memory device 2522, according to any of known techniques as discussed above with reference to FIG. 23. Relevant clustering data, indicating flow records of each cluster, is stored in a memory device 2532. Process 2534 generates a flow-scatter plot and a packet-sequence plot.

Process 2550 produces a DPI (Deep packet inspection) suggested label for each unlabelled flow. It is noted that DPI of encrypted packets relies on metadata.

Process 2555 produces a suggested label for each unlabelled flow based on a pre-trained ML/DL (machine learning/deep learning) model. Process 2560 produces a suggested label for each unlabelled flow based on specific rules. Process 2565 produces a suggested label based on traffic patterns Process 2580 processes the filtered raw unlabeled data stored in memory device 2522 to produce augmented filtered raw unlabeled flow data indicating, for each unlabeled flow, the suggested labels produced in processes 2550, 2555, 2560, and 2565.

The augmented filtered raw unlabeled flow data is stored in a memory device 2585 to be used in the labeling process.

Figure 26:
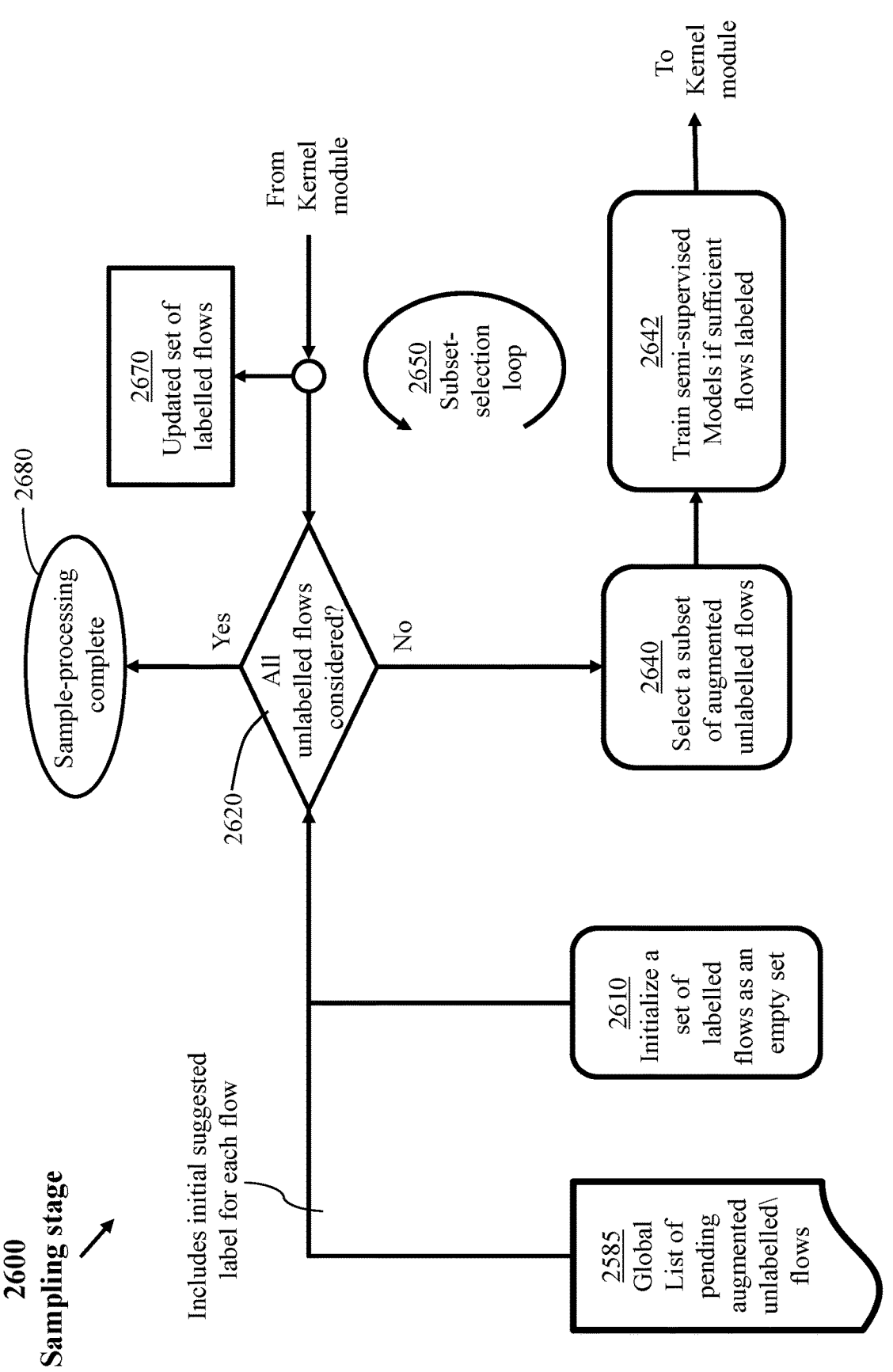
FIG. 26 illustrates processes of the sampling stage of FIG. 15, in accordance with an embodiment of the present inven-tion.

FIG. 26 illustrates processes 2600 of the sampling stage 1530, 1614. Process 2610 initializes a set of labeled flows as an empty set. Branching process 2620 determines completion, or otherwise, of processing unlabeled flows of a current training epoch. If completion condition of a current epoch is met, process 2620 branches to process 2680 to deliver results to processes 770 (FIG. 7) of deriving operational models and start a new epoch. Otherwise, process 2620 branches to process 2640 to select a sample (a subset) of the global set of pending augmented unlabeled records and submit individual flow records of the sample to the kernel module. The Kernel module returns, for each unlabeled flow, either a respective label or an indication of unsuccessful labeling.

Recursion 2650 selects samples of the augmented unlabeled flows for processing in the kernel module until a completion condition for a current training epoch is met. Process 2670 updates a set of cumulative labeled flows resulting from processing individual flows of a current sample. As in the generic method of FIG. 17, The completion conditions may include:

(a) the number of remaining unlabeled flow records in the global set 2585 of pending augmented unlabeled flows is less than a respective predetermined lower bound;

(b) the proportion of the initial total number of unlabeled records that has been successfully labeled exceeds or equals a respective predetermined target;

(3) a succession of a predetermined number of samples fails to produce any labeled flow records (which may trigger an alarm signal); and (4) any other criterion for ending the recursive process 2650 has been attained.

Figure 27:
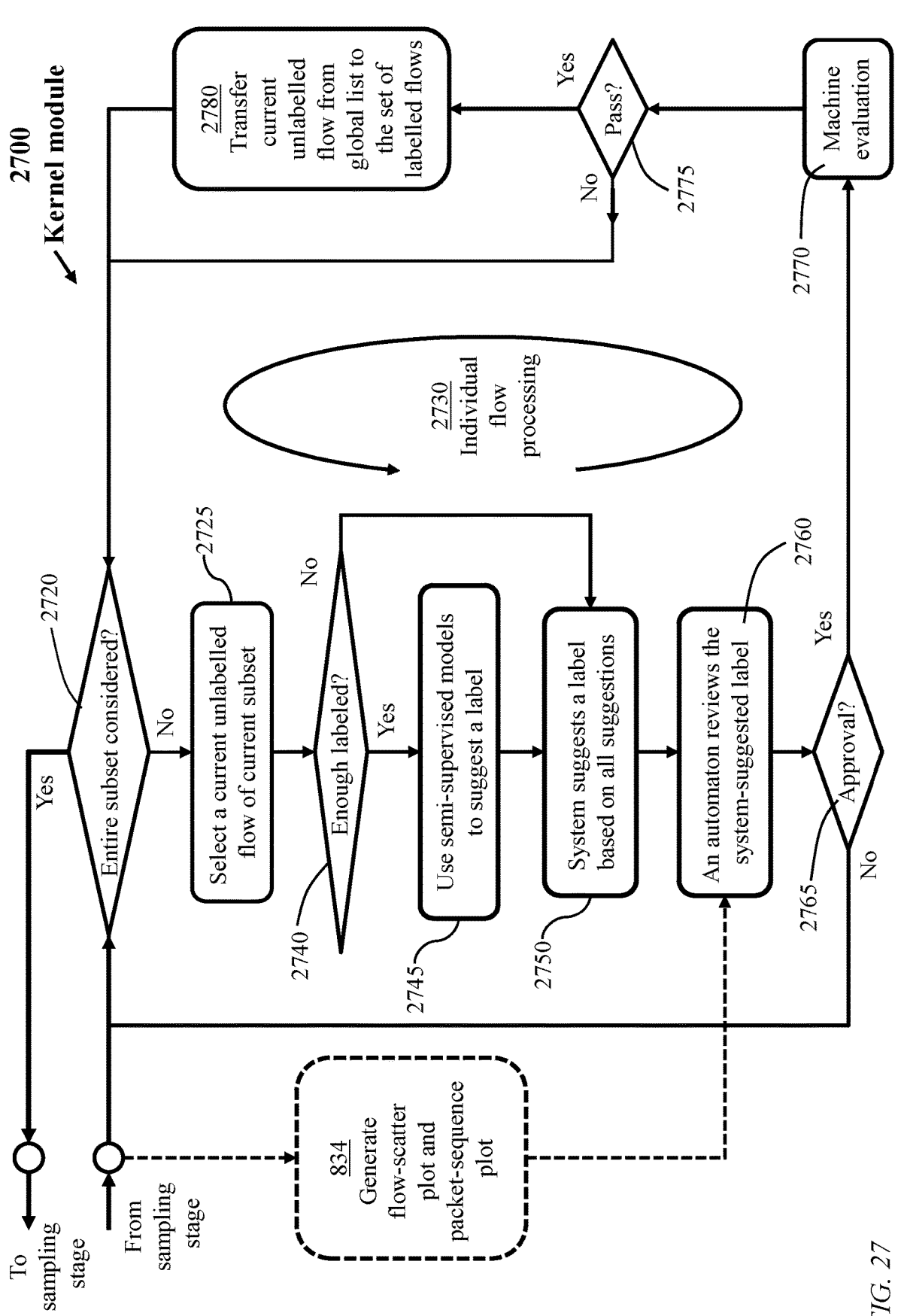
FIG. 27 illustrates processes of the kernel stage of FIG. 15, in accordance with an embodiment of the present inven-tion.

FIG. 27 illustrates processes 2700 of the kernel stage 1540, 1616. Branching process 2720 receives flow records of a current sample from process 2640 of sampling stage 2600 as well as results of processing of individual records of the current sample and determines continuity or completion of processing records of the current sample. If completion is determined, labeling results 2795 are communicated to the sampling stage 2600. Otherwise, the loop 2730 of processes 2725, 2740, 2745, 2750, 2760, 2765, and back to 2720 is followed until process 2720 determines completion of considering each record of the sample.

Process 2725 selects an unlabeled flow of the current sample. Branching process 2740 determines whether the cumulative number of labeled records of the current epoch is sufficient to train a semi-supervised model. If the cumulative number of labeled records is below a respective specified lower bound, process 2750 is activated, bypassing process 2745; otherwise process 2745 is activated to train semi-supervised models and suggest a label accordingly. One example of the semi-supervised model is based on co-training algorithm that will be described in more detail with regard to FIG. 32. Alternatively, a label spreading algorithm may be used for semi-supervised models for suggesting labels in the process 2745, as cited in the information disclosure statement. In the description of FIG. 27 it is understood that in some embodiments multiple flows may be selected in 2725 in order to enhance performance, in which case all corresponding steps in FIG. 27 would thus process a set of flows in batch instead of one at a time.

Process 2750 produces a system-suggested label based on all produced label suggestions of the current flow (with or without the suggested label of process 2745). Process 2760 verifies, and may modify, the system suggested label. Process 2760 employs an automaton to review the system-suggested label; the automaton may be a human analyst.

Branching process 2765 returns to process 2720 without further processing if process 2760 rejects, and does not modify, the system suggested for a current flow (thus, the current flow remains unlabeled) or proceeds to a further process 2770 of machine evaluation.

Branching process 2775 returns to process 2720 without further processing if process 2770 rejects the outcome of process 2760, despite approval or modification in process 2765, thus the current flow remains unlabeled. Otherwise, the current flow is labeled and transferred from the global file to the label file in process 2780. Process 2780 further removes the current labeled flows from the global file.

Figure 28:
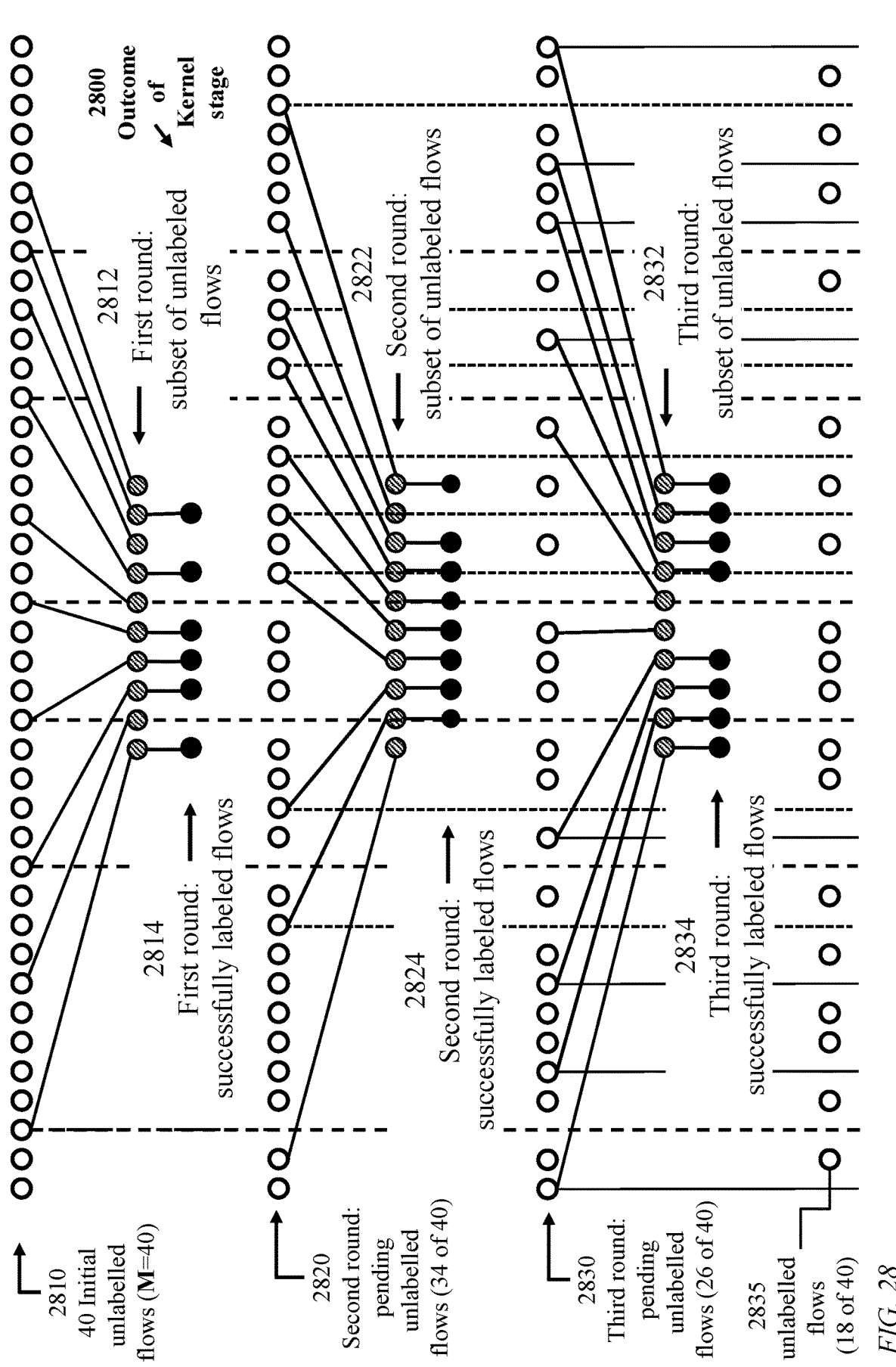
FIG. 28 illustrates outcome of the labeling stages of FIG. 16 for an exemplary case of a relatively small global set of traffic flows and, consequently, a relatively small sample size
Figure 29:
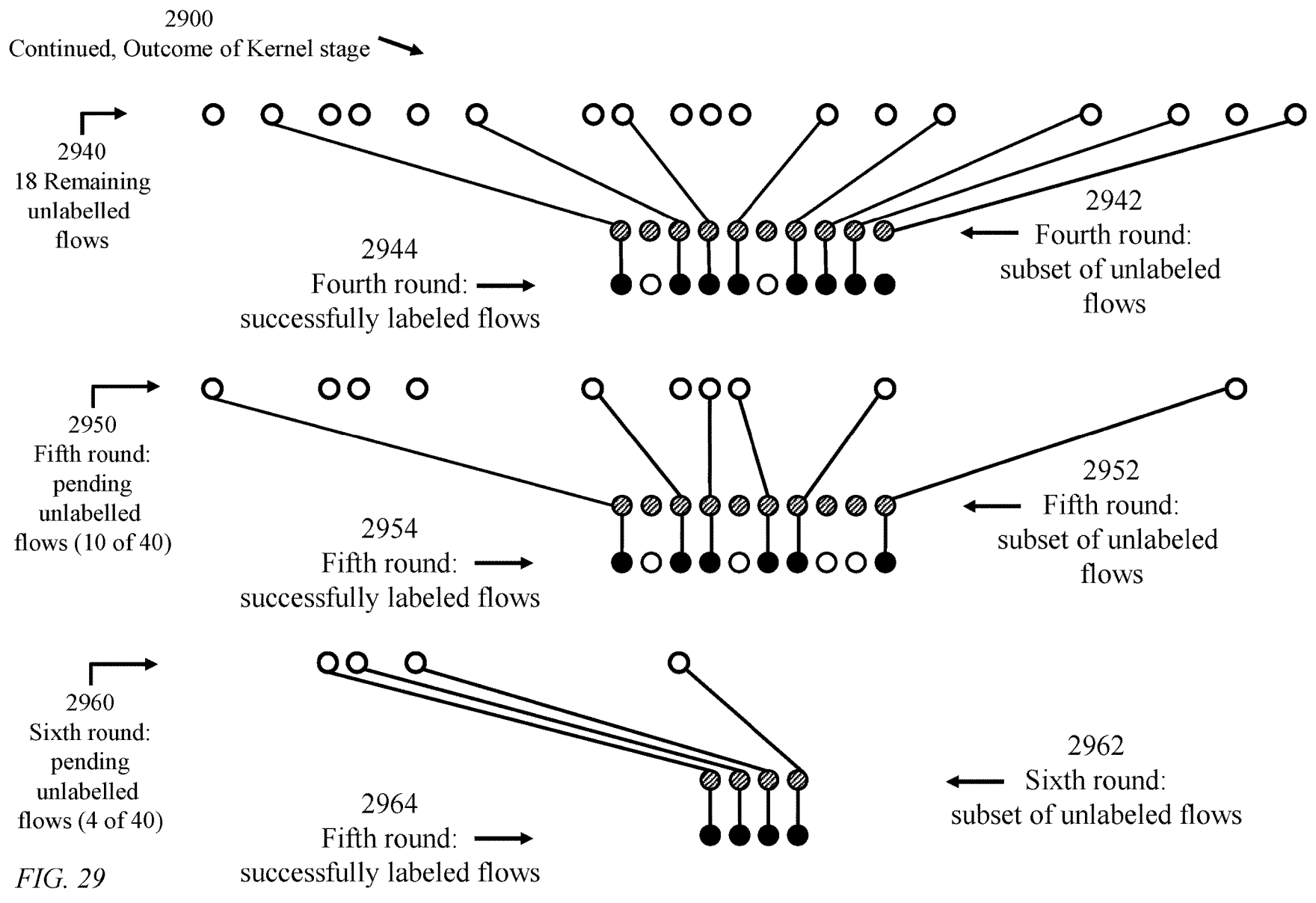

FIG. 28 illustrates intermediate results 2800 of the labeling stages of FIG. 26 and FIG. 27 for an exemplary case of a miniature global set of 40 flows representing the initial sample space 2810. FIG. 29 is a continuation 2900 of FIG. 28.

A first sample 2812 of ten flows of sample space 2810 is drawn of which six flows are successfully labeled (reference 2814). With six flows being labeled, the initial sample space 2810 is updated to sample space 2820 of 34 flows. A second sample 2822 of ten flows is drawn from the updated sample space 2820 of which eight flows (reference 2824) are successfully labeled. With a total of 14 flows being labeled, the sample space is updated to sample space 2830 which includes 26 unlabeled flows. A third sample 2832 of ten flows is drawn from the updated sample space 2830 of which eight flows (reference 2834) are successfully labeled. With a total of 22 flows being labeled, the remaining unlabeled flows (reference 2835) constitute a current updated sample space of 18 flows.

A fourth sample 2942 of 10 flows is drawn from the updated sample space 2940 of which eight flows (reference 2944) are successfully labeled, yielding an updated sample space 2950 of ten flows. A fifth sample 2952 comprises the entire updated sample space 2950 of which six samples (reference 2954) are successfully labeled yielding an updated sample space 2960 of four flows. A sixth sample 2962 comprises the entire updated sample space 2960 all of which are successfully labeled (reference 2964).

Figure 30:
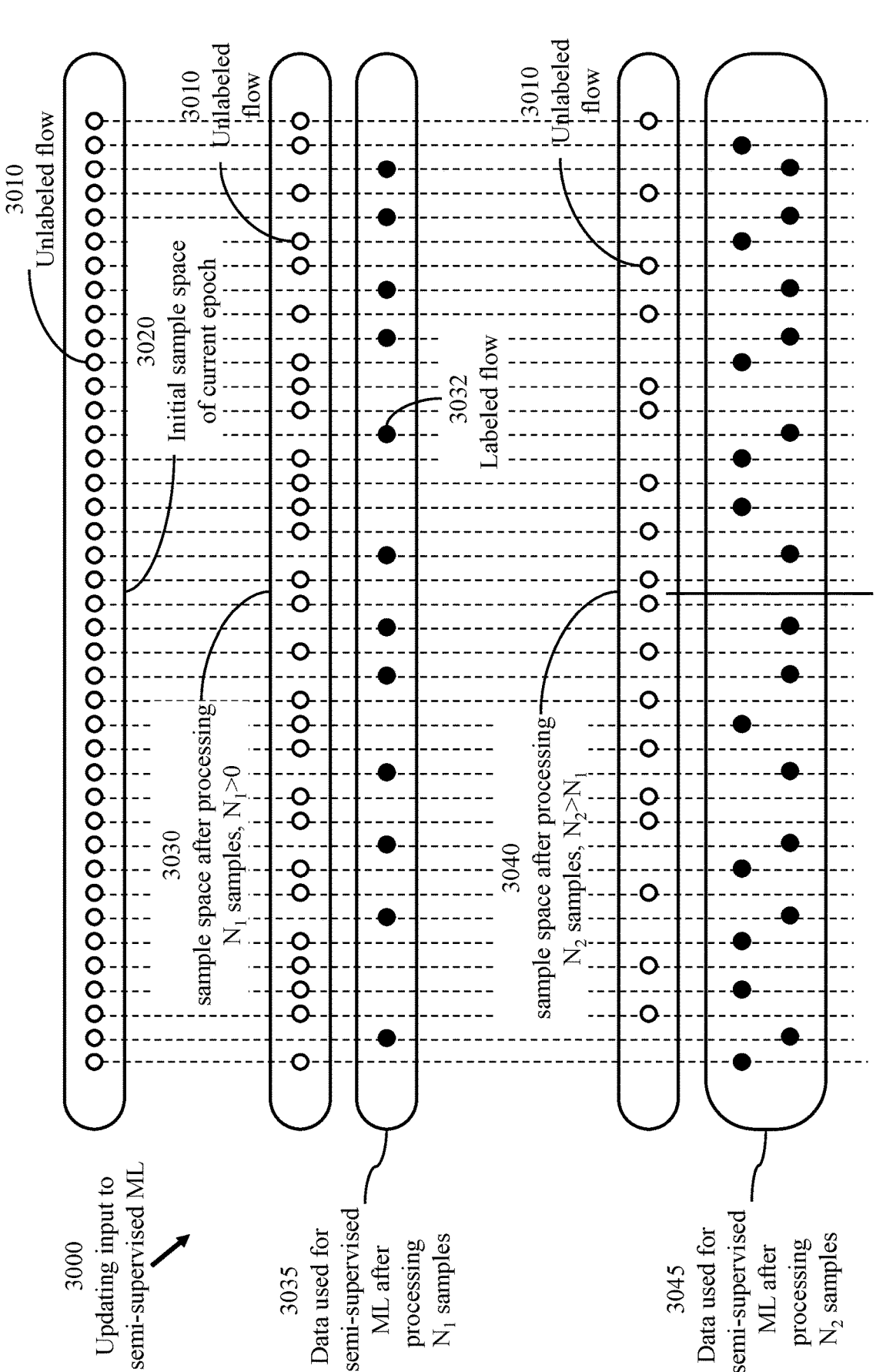
FIG. 30 illustrates a process of updating training data supplied to semi-supervised AI models, in accordance with an embodiment of the present invention.

FIG. 30 illustrates a process 3000 of updating training data supplied to semi-supervised models 2745. Initially, for a current epoch, the global file contains a set 3020 of unlabeled flows 3010. The set 3020 is a sample space of the current epoch (40 flows). After processing a number, $N_1$, of samples, $N_1 > 0$, the label file contains a set 3032 of labeled flows (12 flows) and the global file contains a reduced number (28) of unlabeled flows constituting updated sample space 3030. If the label file contains a number of labeled flows that at least equals a predefined threshold, the set 3032 would be used for training semi-supervised models 2745. After processing $N_2$ samples, $N_2 > N_1$, the label file contains a larger set 3045 of labeled flows (22 flows) and the updated sample space 3040 contains a reduced number (18) of unlabeled flows. Set 3045 is then used for training semi-supervised models 2745.

Figure 31:
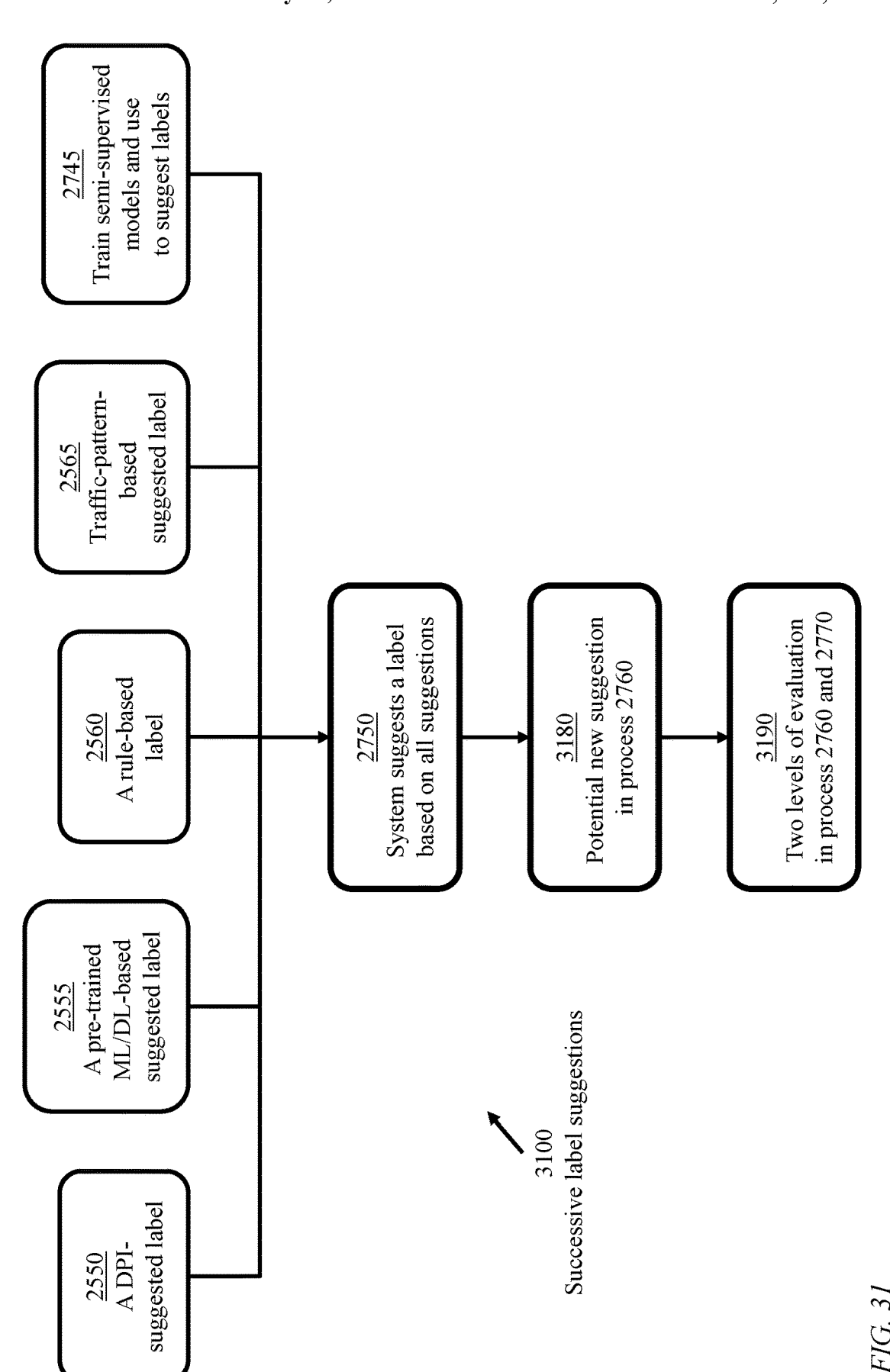
FIG. 31 illustrates a sequence of label suggestions for a flow.

FIG. 31 illustrates a sequence 3100 of generating a suggested label for a flow. Modules 2550, 2555, 2560, 2565 are described above with reference to FIG. 25. Modules 2745 and 2750 are defined in the description of FIG. 27. Process 2760 may suggest a new label (reference 3180). Evaluations (reference 3190) are performed in processes 2760 and 2770

In one embodiment, a label may be selected among multiple suggested labels using a voting method or a weighted voting method, where different weights are assigned to different suggested labels, please refer for example to an article in Wikipedia on "Weighted voting" cited in the Information Disclosure Statement.

AI ternatively, a Bayesian approach may be used for selecting a label among multiple suggested labels, to summarize the prediction result of each suggestor and give the agent the most reliable suggestion.

In one embodiment, the weight associated with the quality of pre-trained suggestors is determined either offline apriori using a system with pre-determined ground truth or utilizing the inherent expertise of the automaton. In either case, the system will utilize the most reliable suggestor's advice based on weights assigned to their suggestion. Each time the automaton/analyst accepts a suggested label, the Beta distribution of each suggestor is updated In one example, all the suggestors carry out a prediction for 50 flows, and are reviewed by the automaton/analyst, where α represents the number of correct predictions, and β represents the number of incorrect predictions:

Suggestor A: $\alpha 1 = 40$, $\beta 1 = 10$
Suggestor B: $\alpha 2 = 30$, $\beta 2 = 20$
Suggestor C: $\alpha 3 = 10$, $\beta 3 = 40$ As a result of the above, each suggestor will have a Beta distribution of beta (α, β), which is used to calculate the Posterior Distribution. The system will select the label predicted by the suggestor whose individual posterior has the highest mean as the most reliable. It will rely on this label as the system suggested label.

After the first round of labeling, the analyst feedback will result in a continuously updated beta distribution for each suggestor. If a suggestor predicted label is the same as the automator/analyst predicted label, the number of correct predictions will add up to α, the number of incorrect predictions will add up to β:

Suggestor A: $\alpha 1 = 40 + 5$, $\beta 1 = 10 + 5$
Suggestor B: $\alpha 2 = 30 + 9$, $\beta 2 = 20 + 1$
Suggestor C: $\alpha 3 = 10 + 1$, $\beta 3 = 40 + 9$ It is understood that although the above example is presented with a single semi-supervised learning suggestor, that one embodiment of the system could include two or more semi-supervised suggestors.

Figure 32:
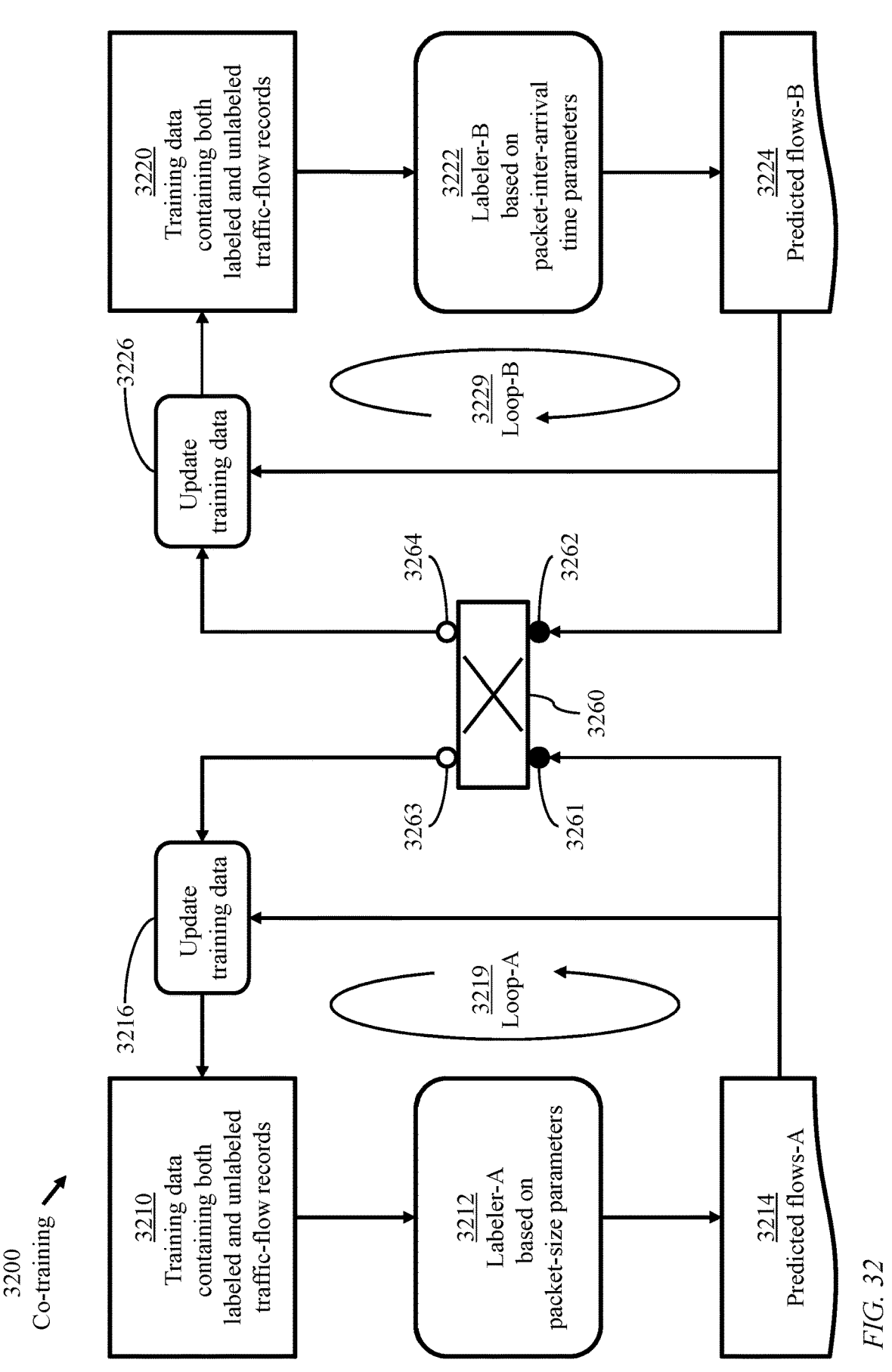
FIG. 32 illustrates a co-training process employing two labelers.

FIG. 32 illustrates processes 3200 of co-training employing two labelers (classifiers). A first labeler 3212 utilizes an AI model with features representing packet-size parameters. A second labeler 3222 utilizes an AI model with features representing packet inter-arrival times/patterns. The first labeler uses training dataset 3210 which is continually updated as more flow records are labeled. Likewise, the second labeler uses a training dataset 3220 which is continually updated as more flow records are labeled. Initially, training datasets 3210 and 3220 are identical.

Figure 33:
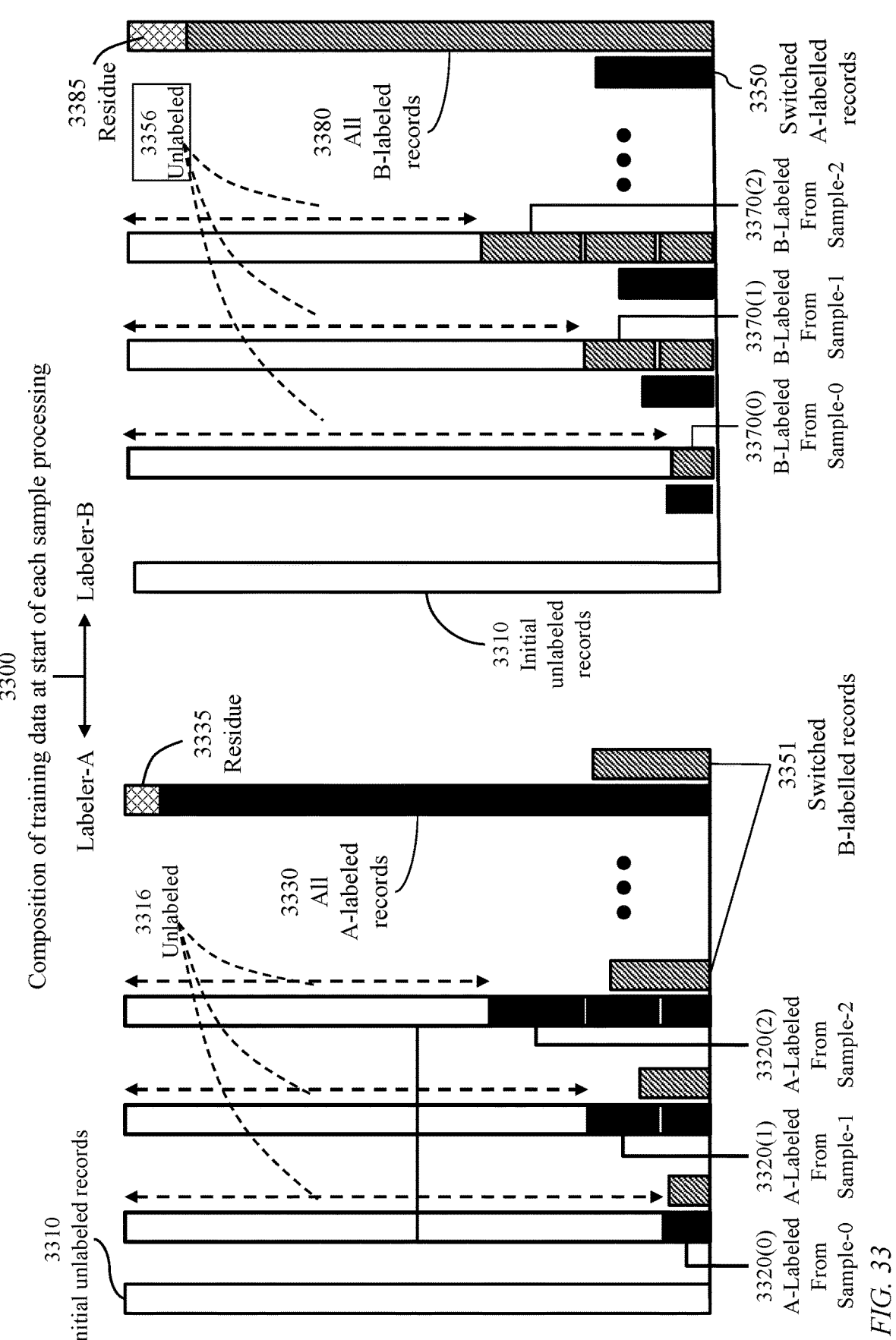
FIG. 33 illustrates a first method of formation of training data in a co-training process.

FIG. 33 illustrates unlabeled flow records 3316, gradually labeled flow records 3320 of training data set 3210, unlabeled flow records 3356, and gradually labeled flow records 3370 of training data set 3220.

Gradually labeled flow records 3320 of dataset 3210 are held in a storage medium 3214. Gradually labeled flow records 3370 of dataset 3220 are held in a storage medium 3224. Process 3216 updates training dataset 3210 as more unlabeled flow records change status from unlabeled to labeled. Likewise, process 3226 updates training dataset 3220 as more unlabeled flow records change status from unlabeled to labeled. Processing loop 3219 repeatedly activates labeler 3212 and updates dataset 3210 until a respective completion condition is met. Likewise, processing loop 3229 repeatedly activates labeler 3222 and updates dataset 3220 until a respective completion condition is met. The completion condition maybe any of: (1) all, or a prescribed proportion, of flow records have been labeled, (2) a labeler fails to increase the count of labeled records for a specified number of activations, indicating that remaining unlabeled flow records cannot be labeled.

A switch 3260 has two input ports 3261 and 3262 for supplying outputs of label predictors/suggestors 3212 and 3222, respectively to the switch. The switch has two output ports 3263 and 3264 for transferring switched flow records from labeler 3222 to update training data 3210 and transferring switched flow records from labeler 3212 to update training data 3220, respectively.

Figure 34:
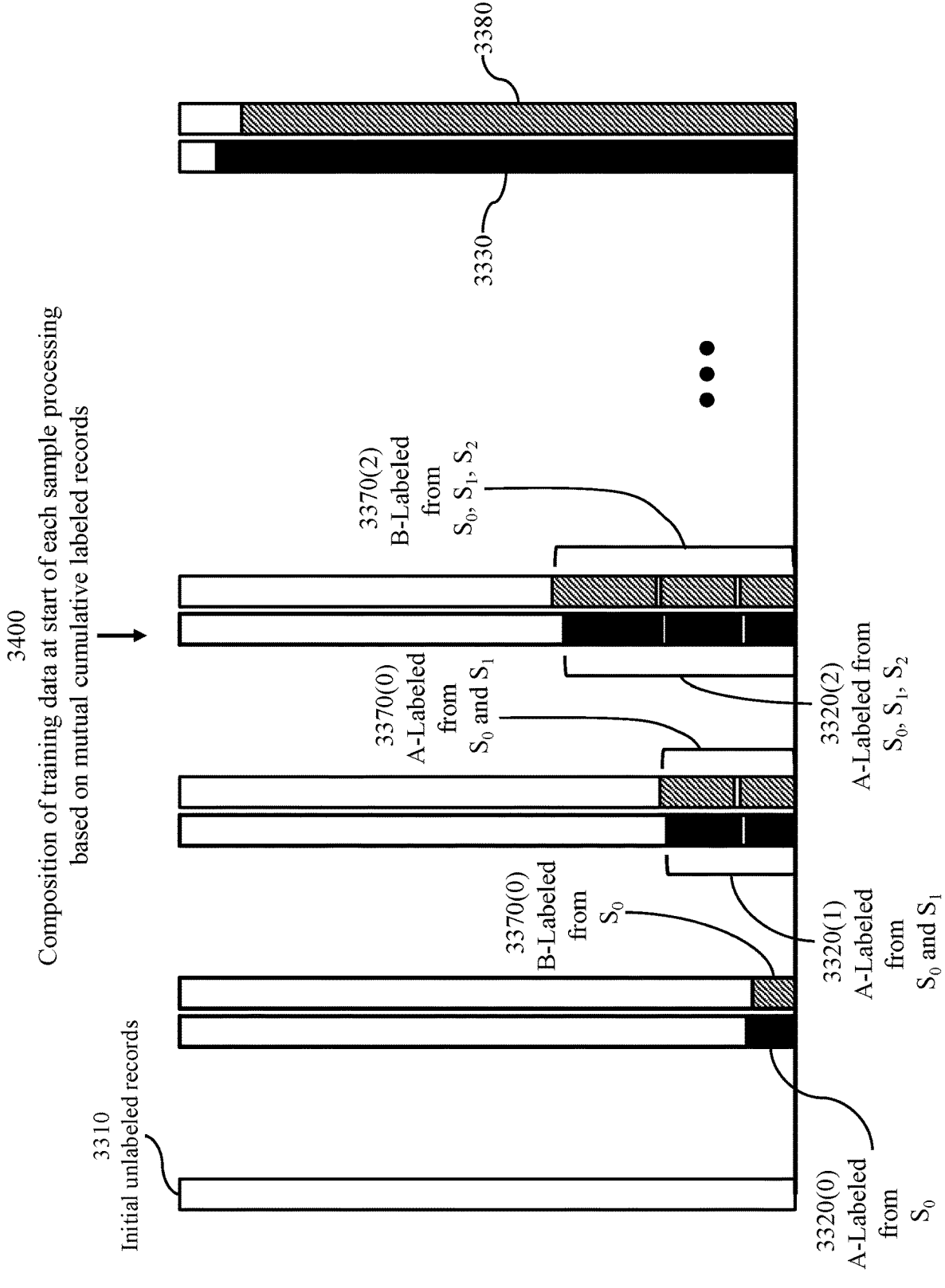
FIG. 34 illustrates a second method of formation of training data in a co-training process.

Switch 3260 connects input port 3261 to output port 3264 to provide labeled flow records produced at labeler 3212 to updating process 3226. The switch connects input port 3262 to output port 3263 to provide labeled flow records produced at labeler 3222 to updating process 3216. Thus, contents of labeled flow records held in storage medium 3214 are used to update both data sets 3210 and 3220. Likewise, contents of labeled flow records held in storage medium 3224 are used to update both data sets 3220 and 3210. The result of switching the unlabeled records between the two training models is to increase the likelihood that a flow label is predicted. In other words, if one label suggestion model cannot predict/suggest a label with high confidence, it is possible that by switching the unlabeled records to be predicted between the two models, that a desired result can be achieved. The exchange labeled flow records may be done according to different policies as illustrated in FIG. 33 and FIG. 34.

FIG. 33 illustrates composition 3300 of training data at start of labeling each sample of sampling stage according to a first co-training policy for a case of co-training where both of the candidate training data sets from this sample 3210 and 3220 initially contains unlabeled records 3310.

As illustrated, the output of the first labeler (labeler-A, also referenced as classifier-A) at the start of processing each sample, beyond the first sample which is labeled without the help of labeled flow records, comprises labeled records 3320(λ). λ≥0. Labeled records 3320(0) are produced during processing of sample(0) and used to label sample(1). Labeled records 3320(1) are produced during processing of sample(1) and used to label sample(2), and so on. Storage medium 3214 holds cumulative labeled records 3320(·). The count of cumulative labeled flow records 3330 after processing the last sample in the first labeler may be less than the count of the initial unlabeled flow records, the difference, referenced as residue 3335, may be further inspected for reasons other than labeling.

The output of the second labeler (labeler-B, also referenced as classifier-B) at the start of processing each sample, beyond the first sample which is labeled without the help of labeled flow records, comprises labeled records 3370(λ). λ≥0. Labeled records 3370(0) are produced during processing of sample(0) and used to label sample(1). Labeled records 3370(1) are produced during processing of sample (1) and used to label sample(2), and so on. Storage medium 3224 holds cumulative labeled records 3370(·). The count of cumulative labeled flow records 3380 after processing the last sample in the second labeler may be less than the count of the initial unlabeled flow records, the difference, referenced as residue 3385, may be further inspected for reasons other than labeling.

The training data available to the first labeler at the start of processing sample(k). k>0, includes cumulative labeled flow records {3320(0)+ . . . +3320(k−1)}, in addition to labeled flow records 3270(k−1). Likewise, the training data available to the second labeler at the start of processing sample(k). k>0, includes cumulative labeled flow records {3370(0)+ . . . +3320(k−1)}, in addition to labeled flow records 3220(k−1).

The switched labeled flow records from storage medium 3214 to updating process 3226 and from storage medium 3224 to updating process 3216 are indicated as 3250 and 3251, respectively. It is understood that in one embodiment, at the start of each sample, the cumulative labeled training records can be split with a portion of the training records utilized for one semi-supervised model which utilized packet size features and the remaining portion of the training records utilized for the second semi-supervised model which utilizes inter-arrival time features.

FIG. 34 illustrates composition 3400 of training data at start of labeling each sample of sampling stage according to a second co-training policy. The main difference between the two co-training policies is that the training data available to the first labeler at the start of processing sample(k). k>0, includes cumulative labeled flow records {3320(0)+ . . . +3320(k−1)}, in addition to cumulative labeled flow records {3370(0)+ . . . +3370(k−1)}. Likewise, the training data available to the second labeler at the start of processing sample(k). k>0, includes cumulative labeled flow records {3370(0)+ . . . +3320(k−1)}, in addition to cumulative labeled flow records {3320(0)+ . . . +3320(k−1)}. Thus, updated training data available to both labelers are the same, with the first labeler using packet-size parameters while the second labeler using time-domain packet-arrival patterns, including packet-inter-arrival time parameters. As well known, packet arrival patterns are analyzed as stochastic processes characterized using numerous parameters.

Figure 35:
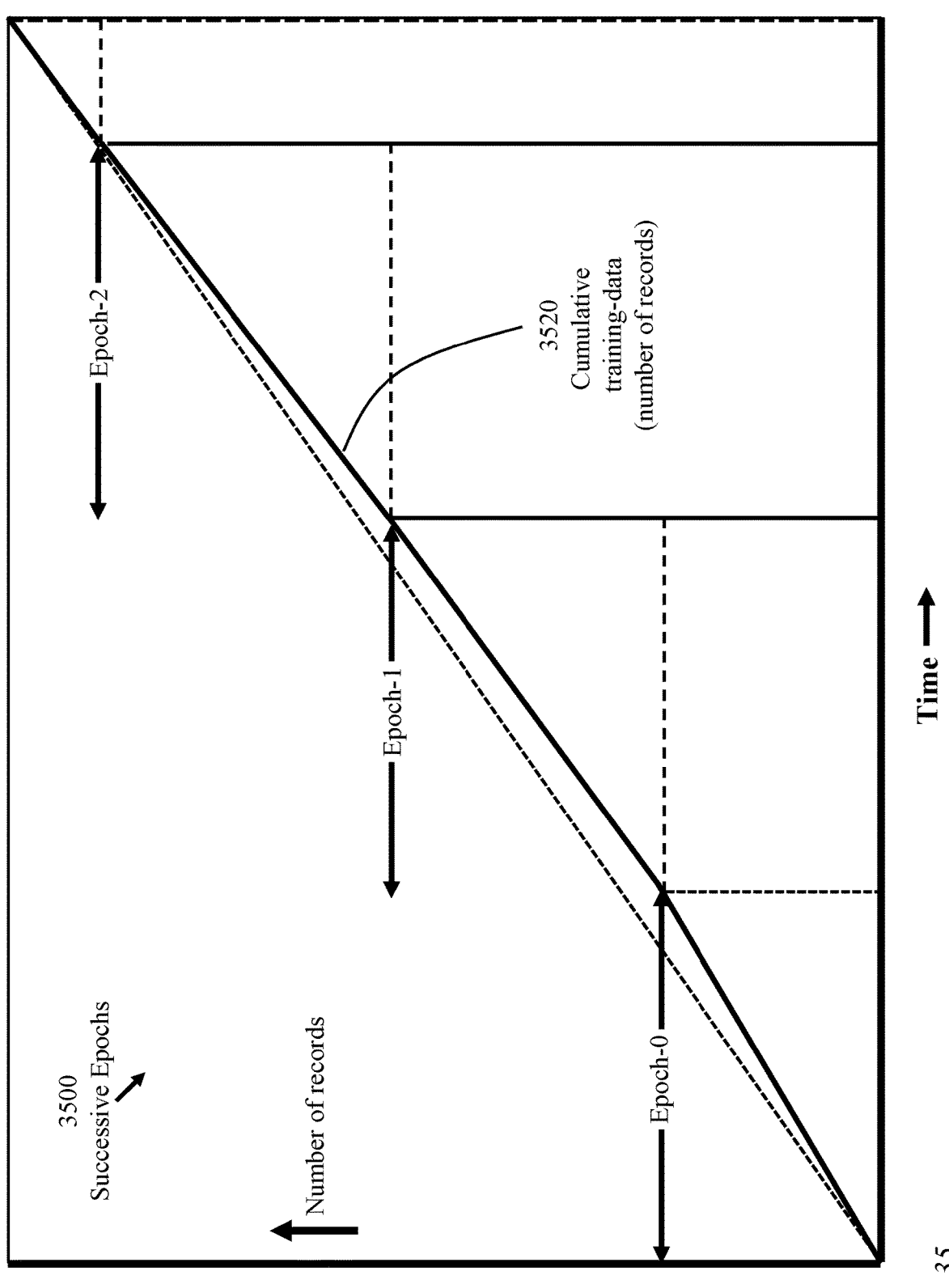
FIG. 35 illustrates training-traffic-data age for a case of successive, non-overlapping, training epochs.

FIG. 35 illustrates an example 3500 of training-data age for a case of successive training epochs. A prescribed number of cumulative labeled/classified flow records 3520 over multiple epochs are held in a circular buffer (not illustrated) for use in extracting a training dataset of a manageable size.

Figure 36:
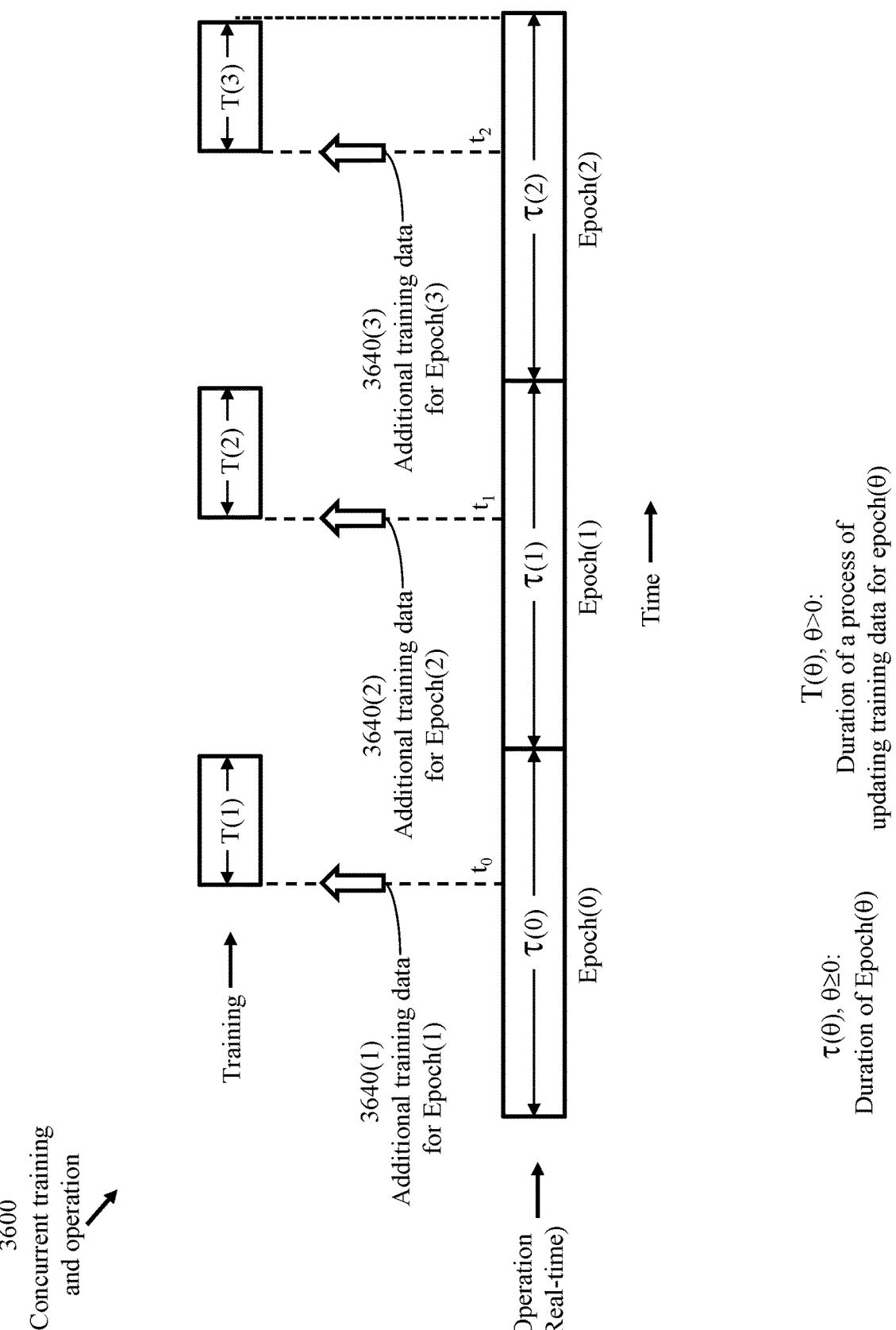
FIG. 36 illustrates a first scheme of concurrent processes of training and real-time classification, in accordance with an embodiment of the present invention.

FIG. 36 illustrates a first scheme 3600 of concurrent processes of training and real-time classification. During successive epochs of durations τ(0), τ(1), τ(2), . . . , flows received at Trafficwiz™ from clients are processed to determine respective classifications and records of successfully classified flows are communicated to concerned parities and also retained as additional training data for subsequent classification processes. Accumulated such records, reference 3640(·), during selected time periods each spanning two consecutive epochs, except for record 3640(1), are supplied to the training stage of Trafficwiz™ to update training data to be used for real-time classification during immediately succeeding epochs. For example, records 3640 (2) of successfully classified flows between time instant $t_0$ and $t_1$ are supplied to the training stage at time $t_1$. The training stage updates the training data during a period of time $T_2$ to be used in Epoch(2) of duration τ(2).

Figure 37:
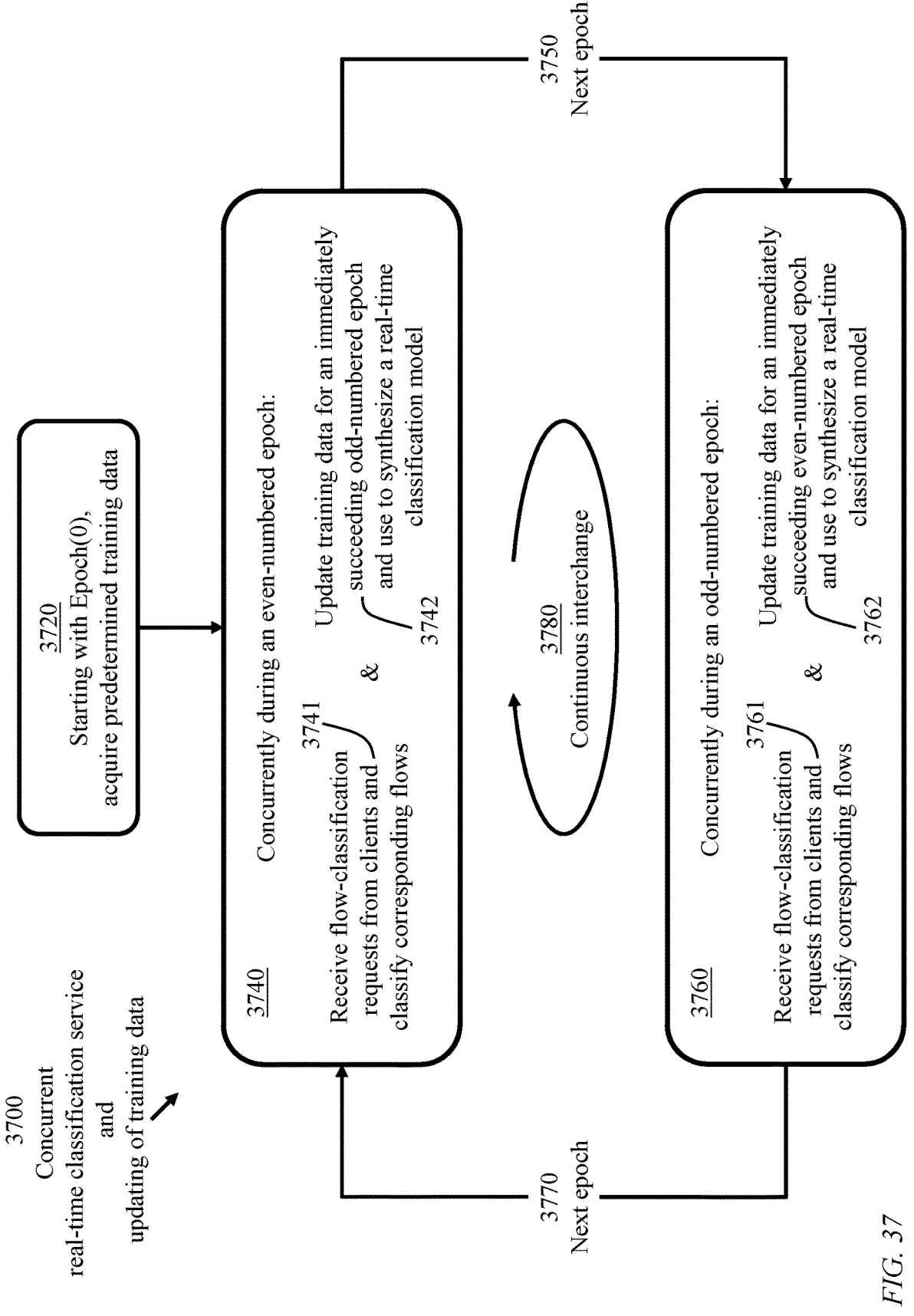
FIG. 37 illustrates a second scheme for periodically or regularly updating training traffic data, based on concurrent processes of real-time classification and updating of training data, in accordance with an embodiment of the present invention.

FIG. 37 illustrates a second scheme 3700 of concurrent processes of training and real-time classification. Process 3720 acquires predetermined training data to be used for synthesizing a real-time classification model for Epoch(0).

During even-numbered epochs, starting with Epoch(0), concurrent operations 3740 comprising real-time operations 3741 and operations 3742 of training-data updating are performed. Processes 3741 receives flow-classification requests from clients and attempts to determine a respective class for each flow. Processes 3742 updates training data for an immediately succeeding epoch (an odd-numbered epoch) and synthesizes a real-time classification model to be used in processes 3761. Process 3750 switches to subsequent-epoch (an odd-numbered epoch) processing.

During odd-numbered epochs, starting with Epoch(1), concurrent operations 3760 comprising real-time operations 3761 and operations 3762 of training-data updating are performed. Processes 3761 receives flow-classification requests from clients and attempts to determine a respective class for each flow. Processes 3762 updates training data for an immediately succeeding epoch (an even-numbered epoch) and synthesizes a real-time classification model to be used in processes 3741. Process 3770 switches to subsequent-epoch (an even-numbered epoch) processing.

Continual activation 3780 of the loop of concurrent operations 3740 and concurrent operations 3760, necessitates continuous concurrent activation of the training component 110 and the real-time operational component 120 of Trafficwiz™ (FIG. 1).

Figure 38:
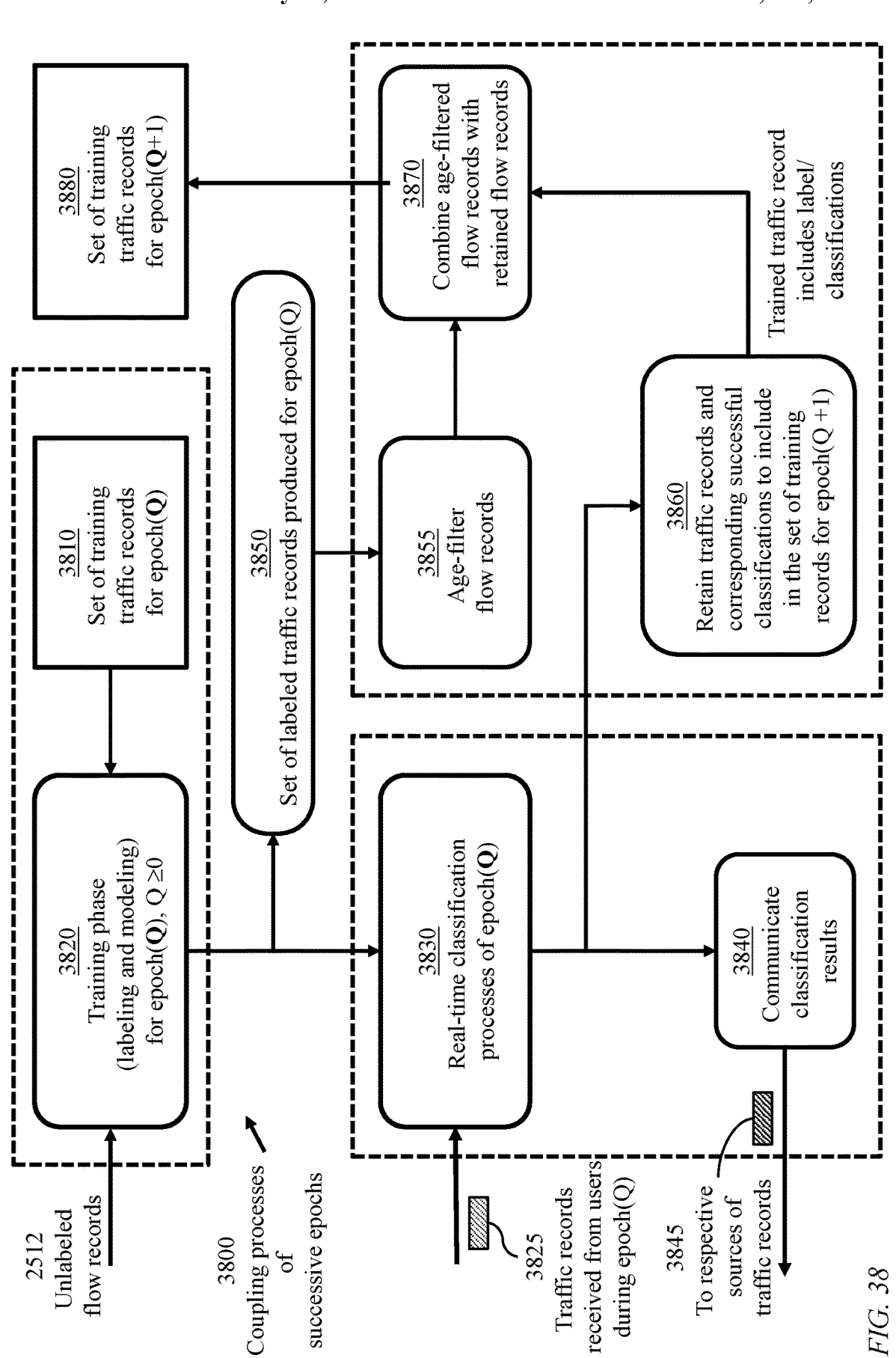
FIG. 38 illustrates coupling processes of non-overlapping training epochs to update training traffic records, in accor-dance with an embodiment of the present invention.

FIG. 38 illustrates an arrangement 3800 of coupling processes of successive training epochs to update training flow records of successive epochs.

For a current epoch of index Π, Π≥0, training-phase 3820 performs processes of labeling and modeling. For Epoch(0), the processes are based on a set 2512 of records of unlabeled flows (FIG. 25). For subsequent epochs (Π>0), synthesis of the Trafficwiz™ modeler (the classification modeler) relies on a (growing) set of already labeled flow records 3810. A set 3850 of labeled flow records produced for epoch(Q) is supplied to process 3855 of age-filtering, applicable to Epochs succeeding the initial Epoch(0), where records of flows exceeding a prespecified age are excluded.

Real-time classification processes 3830 receive flow records 3825 from clients during Epoch(Q) and employs the Trafficwiz™ modeler (the classification modeler) synthesized in training phase 3820 to attempt to classify each received flow record. Process 3840 communicates classification results to concerned parties and concurrently provides the classification results to process 3860 which retains traffic-flow records and corresponding successful classifications to include in the set of training records of epoch(Q+1). Process 3870 of combines age-filtered flow records received from process 3855 and retained flow records from process 3860 to produce a set of training data 3880 for epoch(Q+1).

Figure 39:
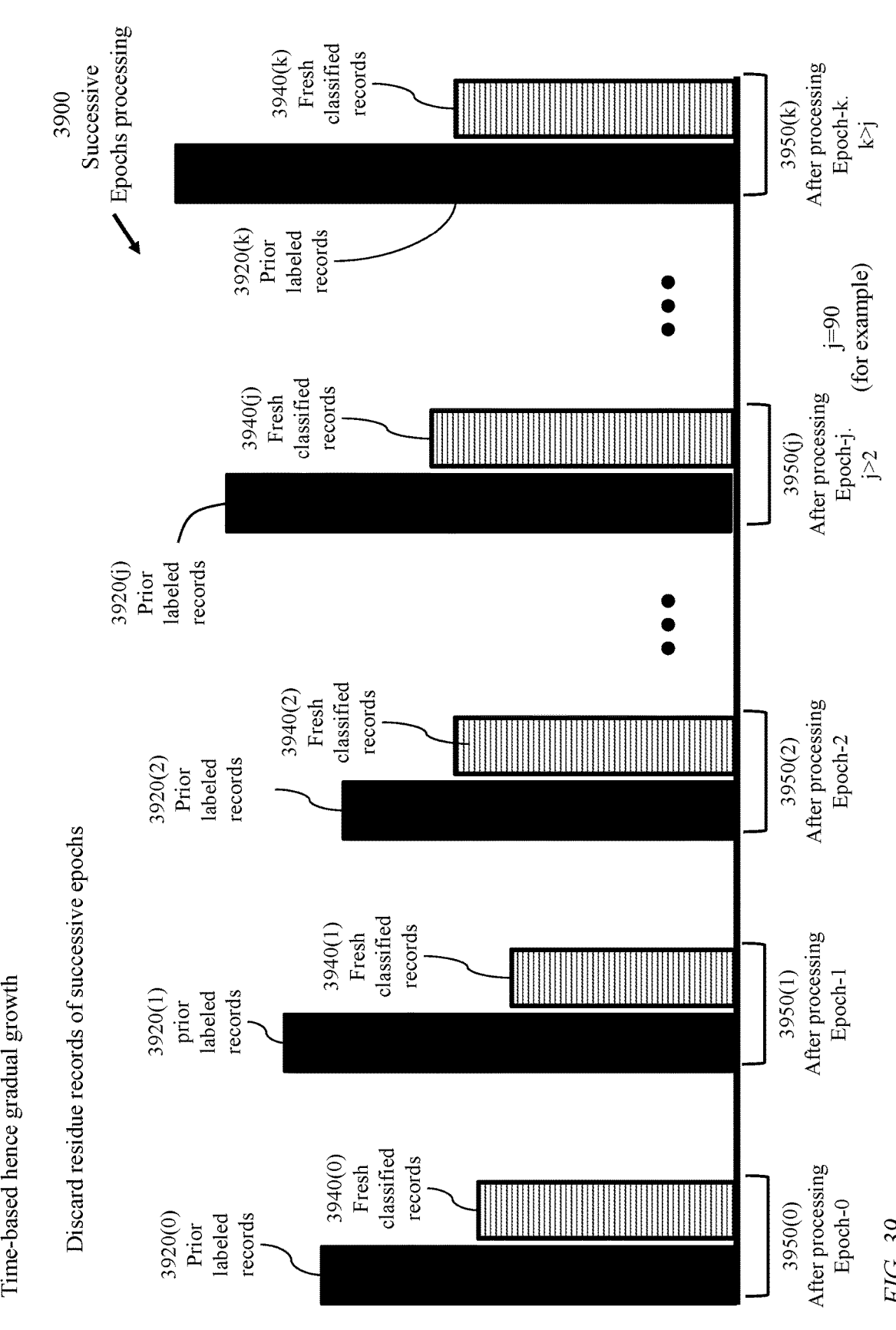
FIG. 39 illustrates exemplary outcome of the labeling stage for multiple training epochs.

FIG. 39 illustrates exemplary outcome 3900 of the labeling stage for multiple training epochs. After processing Epoch(Q), Π≥0, the training data available to a subsequent epoch comprises labeled records 3920(Q) used at the start of Epoch(Q) and records 3940(Q) of successfully classified flows corresponding to classification requests received from clients. The combination 3950(Q) of labeled flow records after completion Epoch(Q) serves as an input to the training phase 3820 of a subsequent epoch. Where the size of combination 3950(Π) exceeds practical limits, a permissible number of labeled flow records may be extracted to supply as prior labeled records to a subsequent epoch.

Figure 40:
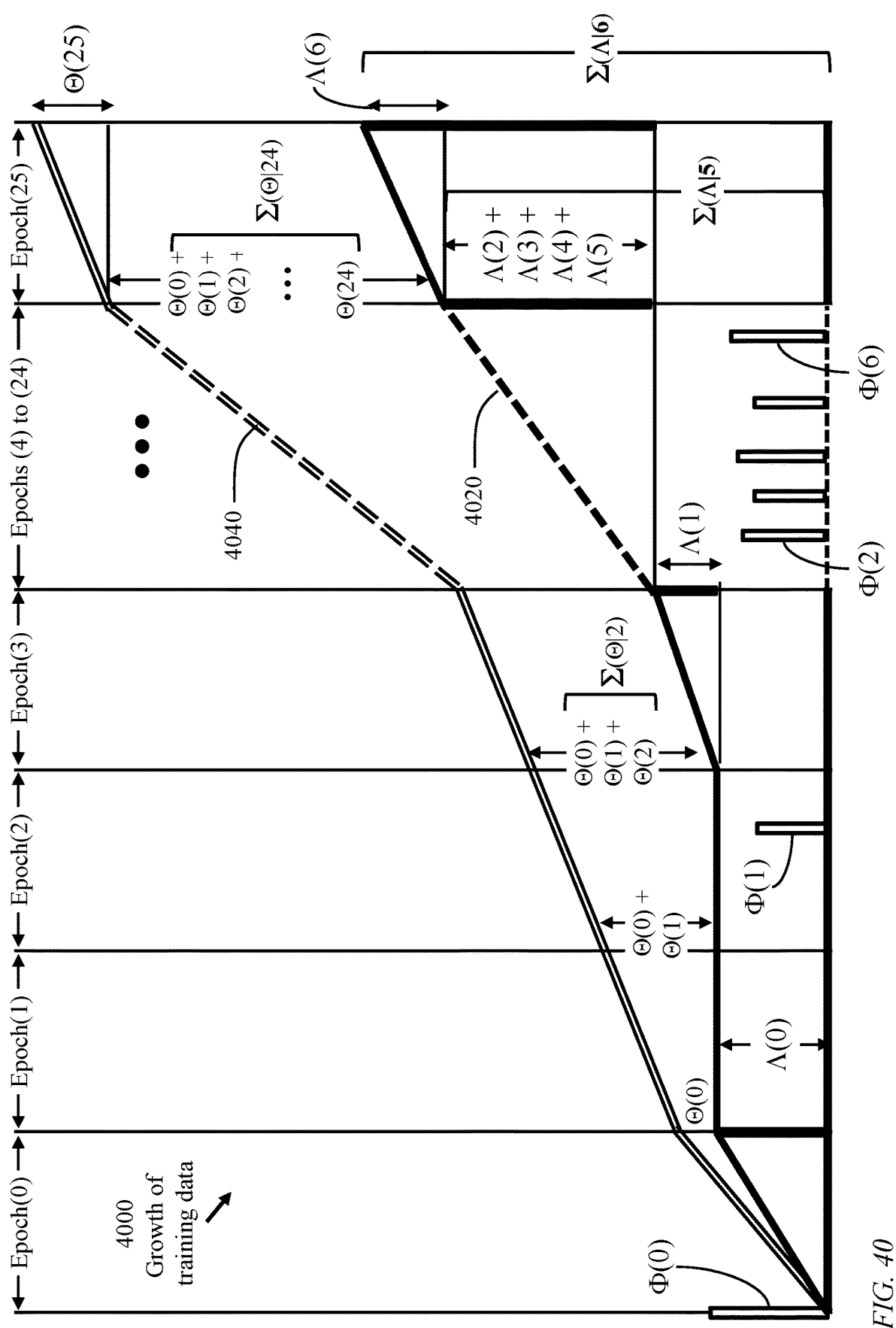
FIG. 40 illustrates growth of training data, in accordance with an embodiment of the present invention.

FIG. 40 illustrates a growth pattern 4000 of training data. Initially, a set of unlabeled flow records, denoted Φ(0), is acquired and supplied to a labeler 760 which produces a set, denoted Λ(0), of labeled flow records. The number of labeled records of set Λ(0) may be less than the number of unlabeled flow records of set Φ(0). The difference being a "residue" that could not be decisively labeled. As described above, labeling a set of unlabeled flow records is performed for successive subsets of the unlabeled set as illustrated in FIG. 26.

The labeled set Λ(0) is used to synthesize a modeler 770 to be supplied to a real-time classifier 780 to classify individual flows received from clients 610 (FIG. 6). The period of time, which may vary significantly from a few hours to several days, during which a modeler based on a specific set of labeled flow records is used in the operational phase is herein referenced as an "epoch". The duration of an epoch is a system parameter which may be based on a specified time interval or defined adaptively based on factors such as fluctuation of the volume of clients' traffic and/or availability of fresh unlabeled flow records.

Updating a modeler initiates a new epoch. Optionally, a set of flow records, denoted Θ(0), that are classified in the operational phase of the first epoch (referenced as Epoch(0) in FIG. 40) may be used as either labeled training data, to supplement the set of labeled flow records Λ(0), or as a set of new unlabeled flow records without using the already available classification. In the following, flow records classified in the operational phase are used to supplement already realized labeled flow records. The use of a combined labeled set Λ(0) and classified set Θ(0) to synthesise the modeler 770 leads to a new epoch, referenced as Epoch(1) in FIG. 40, where the modeler 770 is synthesized again based on the combined {Λ(0), Θ(0)} flow records. During Epoch(1), a set Θ(1) of clients' classified flow records is added to {Λ(0), Θ(0)} flow records and the modeler 770 is re-synthesized, for use in subsequent Epoch(2), based on labeled flow records {Λ(0), Θ(0), Θ(1)}.

During Epoch(2), a set Θ(2) of clients' classified flow records is created. Independently, a new set of unlabeled flow records, denoted Φ(1), is acquired (possibly automatically through network 220). Thus, at the start of Epoch(3), the training data comprises unlabeled set Φ(1), labeled set Λ(0), and classified sets {Θ(0), Θ(1), Θ(2)} denoted ΣΘI2. The acquisition of Φ(1) triggers activation of labeler 760 to produce a corresponding set, Λ(1), of labeled records. In the example of FIG. 40, Λ(1) is produced in a training phase concurrently with the operational phase of Epoch(3). Growth of the training data continues in this fashion. Independently, fresh unlabeled flow records Φ(2) to Φ(6) are acquired during a time span of Epoch(4) to Epoch(24) and processed in labeler 760 to produce labeled sets Λ(0) to Λ(6). The training data at the start of Epoch(25) would comprise Φ(6), {Λ(0) to Λ(5)}, and {Θ(0) to Θ(24)}.

A growing training dataset may be pruned for processing considerations and to account for obsolescence of aged flow records. In the example of FIG. 40, cumulative counts 4020 of flow records labeled in the training phase and cumulative counts 4040 of clients' flow records classified in the operational phase may be subjected to pruning according to respective rules as discussed below with reference to FIG. 43. Preferably, labeled flow records and classified flow records are held in respective memory blocks since they may be pruned differently. Pruning may be performed using different methods. One method may be based on random sampling. Another method may be based on using a fast-clustering method, such as the "k-means" clustering method where a large number of flow records may be clustered into a smaller number of clusters with representative flow records selected based on proximity to centroids of the produced clusters. In this case, flow records further away from each cluster centroid would be discarded and sampled data from each cluster discarded for bias avoidance.

Figure 41:
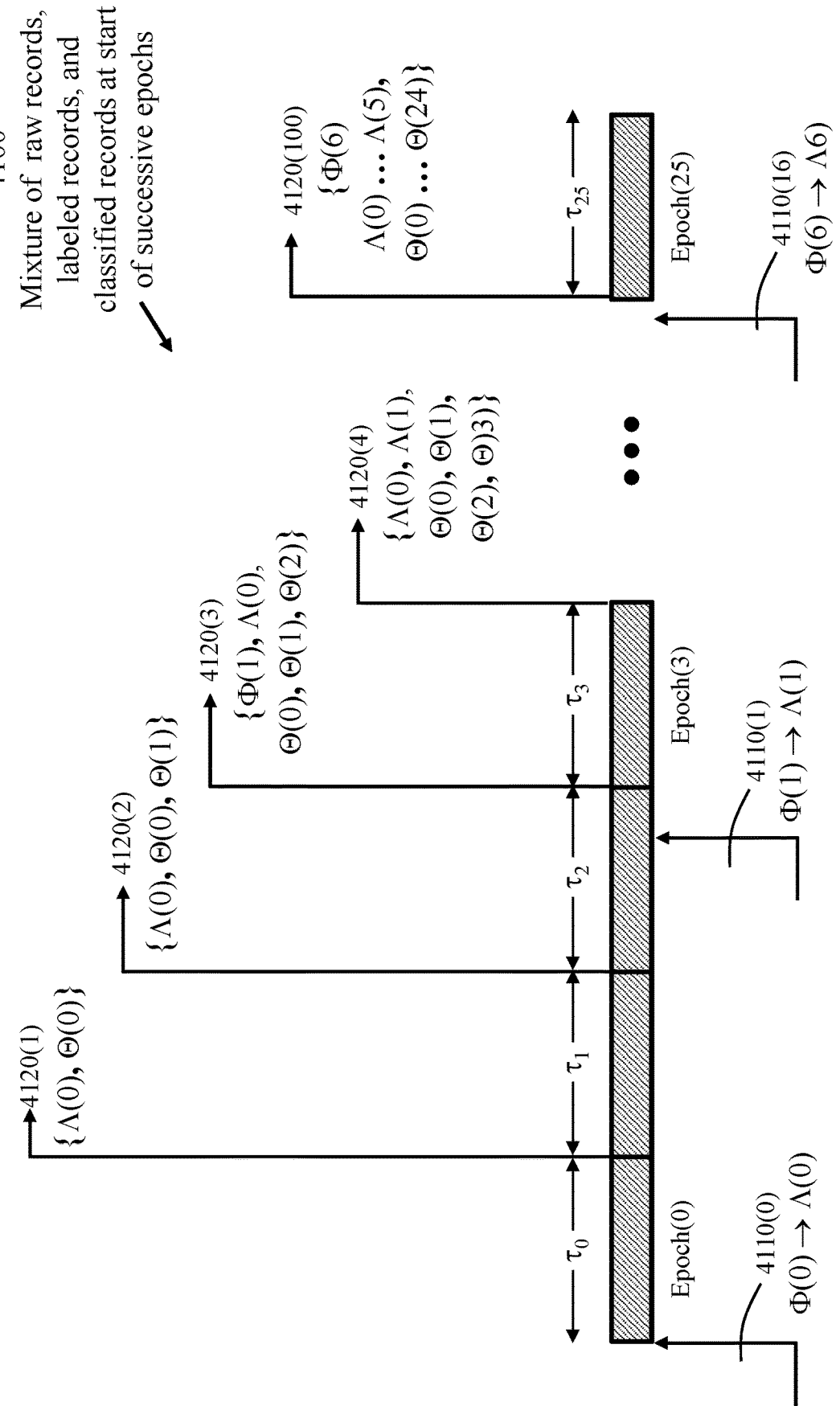
FIG. 41 illustrates composition of training data at succes-sive epochs.

FIG. 41 indicates the mixture 4100 of training data comprising raw unlabeled flow record {Φ(0), Φ(1), . . . }, labeled flow records {Λ(0), Λ(1), . . . }, and classified flow records {Θ(0), Λ(1), . . . }. Unlabeled flow records 4110, denoted Φ(0) to Φ(6) and individually referenced as 4110(0) to 4110(6), respectively, are acquired from external sources. Processing flow records 4110 produces sets Λ(0) to Λ(6) of labeled flow records. Sets Θ(0) to Θ(24) of classified clients' flow records are produced in the operational phase of successive epochs, unlike sets 79 (0) to Λ(6) which are produced in the training phase when unlabelled flow records Φ(0) to Φ(6) are acquired. The mixture of labeled records Λ(0) to Λ(6) and classified records Θ(0) to Θ(24) at the start of successive epochs, starting with Epoch(1), are referenced as 4120(1) to 4120(24).

FIG. 42 illustrates modes 4200 of operation of Trafficwiz™ according to composition of training data. Process 4210 assembles training data at start of a current epoch. Process 4220 skips the labeling stage and proceeds to synthesize the classification modeler if the training data does not contain unlabeled flow records. Otherwise, process 4220 continues to activate the labeler in process 4230. Process 4240 synthesizes the classification modeler which is employed in process 4250 for real-time classification of clients' flow records. In the example of FIG. 40 and FIG. 41, process 4230 is activated at the start of Epoch(0), Epoch(3), . . . , and Epoch(24) as indicated in tabular form in FIG. 42.

Figure 43:
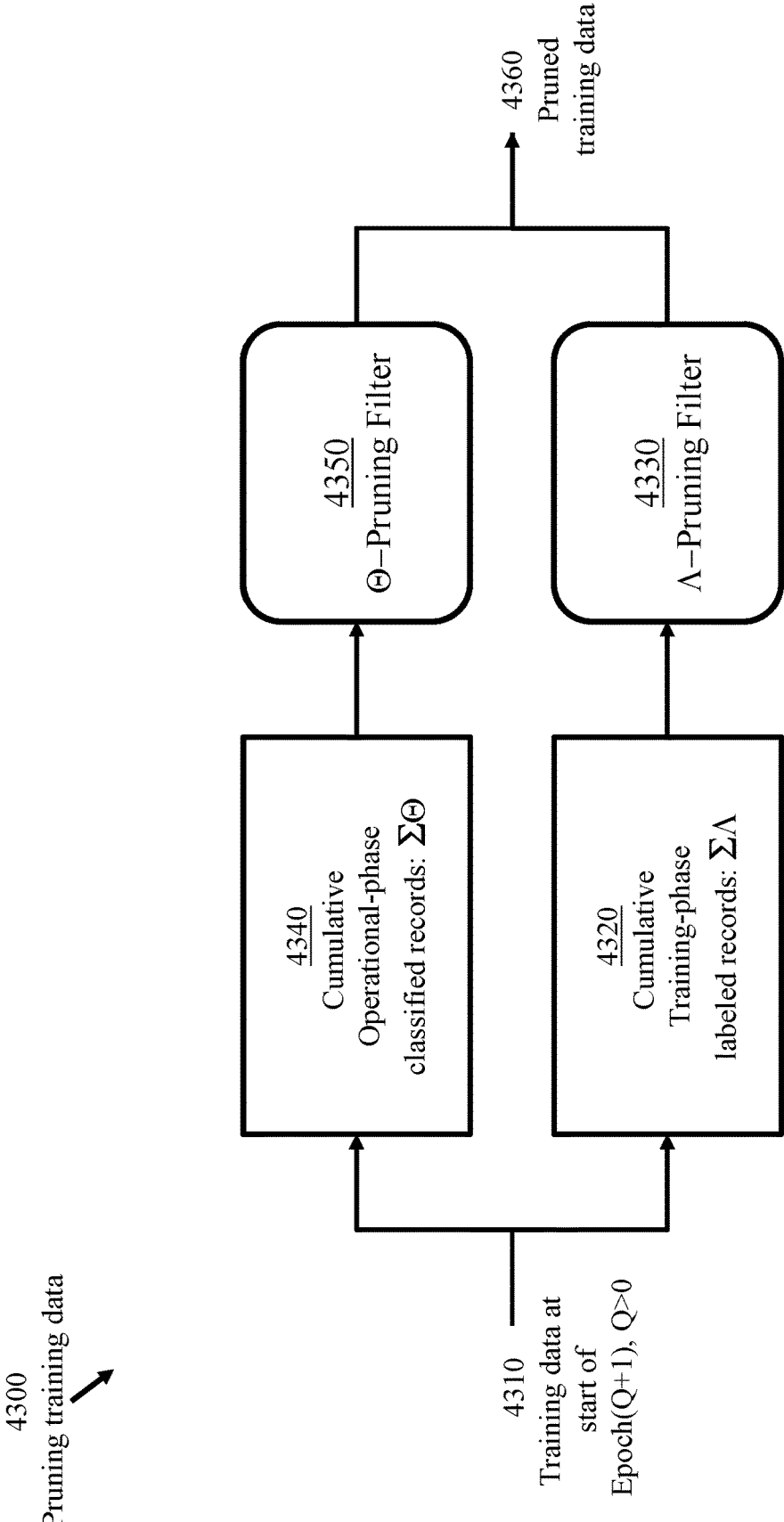
FIG. 43 illustrates a method of pruning training data, in accordance with an embodiment of the present invention.

FIG. 43 illustrates a process 4300 of pruning training data. Training data 4310 at start of an Epoch comprises cumulative labeled flow records 4320, denoted Σ(κIJ), J≥0, and cumulative classified clients' flow records 4340, denoted Σ(ΘIQ}, Q≥0.

A first pruning filter (Λ-pruning filter) 4330 selects labeled flow records to retain based on a first criterion. A second pruning filter (Θ-pruning filter) 4350 selects classified flow records to retain based on a second criterion. Both the first and second criteria may select flow records according to age, number of accumulated records, and a weighting factor relevant to the type of flow record (belonging to 4320 or 4340). The weighting factor may be a design parameter.

The Modeler and Classifier

The Classifier 780 combines the trained AI model created using the Modeler 770, with a packet capture and feature extraction engine (not shown), creating an efficient application for classifying encrypted network traffic. The Classifier 780 may be operated in two modes. In an "Offline mode", unlabeled encrypted flows are classified. In an operational "live mode", live network flows, which maybe encrypted, are captured and classified.

In one embodiment, a hierarchical classifier is employed, with real-time runtime performance and improves classification results. With a hierarchical classifier, several Machine-Learning models are used in succession to determine labels ultimately assigned to flows. The Machine-Learning models form a tree structure, where, aside from the root node, the input to one classifier is based on the output of another.

While the hierarchical classifier may comprise an arbitrary structure, with as many classification nodes as required to serve the intended purpose, one embodiment of the present invention has only two levels of classification. The first level is a binary classifier, splitting traffic flows into those containing payload and those without the payload. The non-payload flows are filtered out, passing on only payload carrying flows. The second level comprises a multi-class model, designed to infer labels for payload carrying flows. Traffic types can be specified in a configuration file. Traffic that does not belong to specified traffic types will be classified into the "Unknown" category. In practice, any suitable ML/DL model may be used for any node in the tree of hierarchical classifiers, allowing each to be trained independently, optimized for a specific purpose.

Non-payload flows, removed by the first level of the hierarchical AI model, include those which do not contain user content, such as application protocol handshake and signaling. It may also include some ancillary flows which are generated by, but do not pertain to, the main application; such content could confuse training models. The result of separating payload and non-payload carrying flows is a clean set of traffic flows, improving the training and performance of the second level model. It also improves the runtime performance of the classifier operating in live environments, since non-payload carrying flows are rejected early in the pipeline.

Using the ROC (Receiver Operating Characteristics) analysis, a preferred threshold is one that favors one type of error over the other; reducing false positives at the cost of true positives, or vice versa. It is useful to tune the model so that no payload data is excluded during the classification/prediction. The objective is to classify payload data with some latitude for false classification of non-payload traffic as payload traffic. The performance of the first level of classifier can be tuned by selecting a threshold on the ROC curve. The value is selected using hyper-parameter search procedure. It is understood that there are alternate methods which can be utilized to tune the classification model so that it achieves the trade off between accuracy and real-time performance.

Figures 44, 44A:
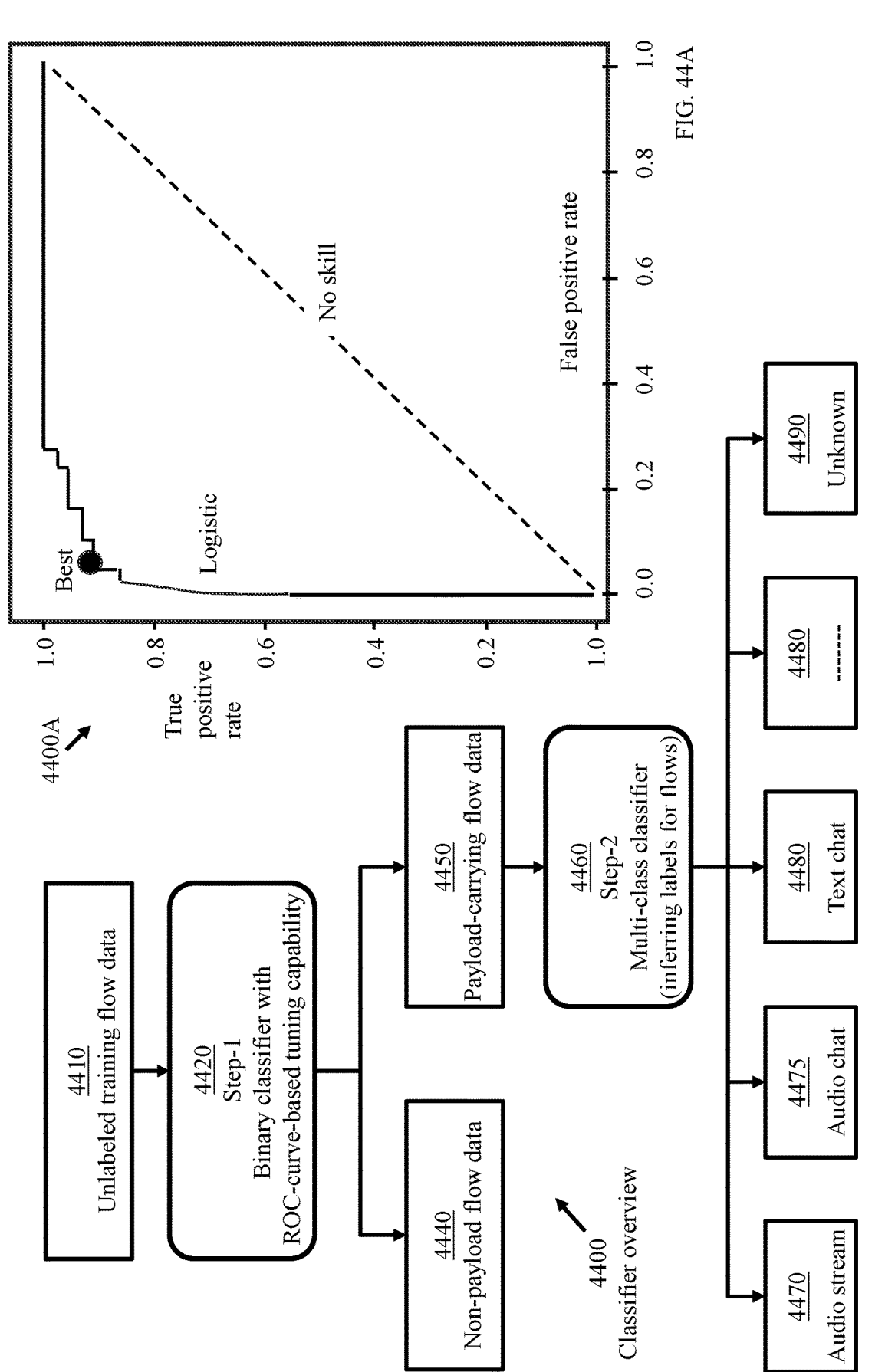
FIG. 44 is an overview of an implementation of the model creation and classifier.
FIG. 44A illustrates a Receiver-Operating-Characteristics (ROC) method for selecting an operational threshold for the binary classification.

FIG. 44 illustrates an implementation 4400 of the AI model and classifier 780. A Receiver-Operating-Characteristics (ROC) module 4420 is employed to tune the model so that it achieves class separation when predicting an unlabeled flow record 4410 as belonging to a non-payload class 4440 or a payload-carrying flow class 4450. A multi-class model 4460, configured to infer labels for flows, is subsequently used to classify the payload-carrying flow data 4450.

The proposed classifier 780 can support any ML/DL algorithm for model creation during Step 1 (box 4420) and Step 2 (box 4460). For example, the Random Forest algorithm may be utilized for the Step 1 model building while the XGBoost algorithm may be used for model creation during the Step 2 model building.

Binary classifiers, such as the Step 1 ML model, generally produce a score that is compared against a predetermined threshold to determine whether the result belongs to one class or the other. The threshold is chosen to give equal weight to both classes, but results can often be improved by adjusting the threshold. As mentioned above, one method of choosing an optimal threshold is by an analysis of the Receiver Operating Characteristic (ROC) curve. The ROC curve captures performance of a model by graphing the True Positive Rate (TPR) against False Positive Rate (FPR) for different threshold values.

The process for generating a ROC curve is as follows:
Using a trained model, generate scores for a validation dataset.
For a selected number of threshold values, determine labels for entries in the validation dataset using the scores produced in the first step. For example, one may evaluate 10 or 100 values between 0 and 1 when using probability scores.
For each threshold value, calculate TPR and FPR, given ground truth labels and predictions made using that threshold
Present the set of TPR vs FPR values graphically.
The optimal choice of threshold to maximize TPR while minimizing FPR is a threshold which produces a point closest to the upper-left corner of the ROC curve, as illustrated for example in FIG. 44A by the ROC diagram 4400A for selecting an operational threshold for the binary classification.

Working Example for Developing a Model which Distinguishes "Payload Data" v "Non-Payload Data"

As mentioned above, a Payload flow is an application specific flow which carries user data for the application.

Non-payload flow are flows which carry limited information, or flows which are not generated by application related activity. Non-payload flows include examples such as signaling, protocol handshake, advertisements (e.g. flows generated by DoubleClick and AMP project), control flows (e.g. flows generated by Google API, Amazon AWS, Meta Platform CDN) etc.

Non-payload flows contain both long flows and short flows. If the flow's bidirectional packet count is less than 10 (forward_pkt_count+backward_pkt_count<10), the flow is considered a short flow. Short flows are categorized as Non-payload. Long flows ((forward_pkt_count+backward_pkt_count>=10), can be Payload carrying flow or a Non-payload flow. Identification of long Non-payload flows is achieved using the 1st Step ML model outlined earlier.

In this working example, predicting a flow as belonging to Payload vs Non-payload is achieved as follows.
1. The ML Model is created using training data. The training data includes apriori labeled flows with Payload and Non-payload labels in the training dataset. The training data flows are labeled as one of Audio Chat, Video Chat, Text Chat, Audio Stream, Video Stream and P2P for the "Payload" training data, with other flows labeled as "Non-payload" training data.

2. Network Traffic Features utilized include

Packet length min, max, mean and standard deviation for both forward and backward directions;

Inter packet arrival time min, max, mean and standard deviation for both forward and backward directions;

Packet count for both forward and backward directions;

Total packet length for both forward and backward directions;

Total payload size for both forward and backward directions;

Number of payload packets for both forward and backward directions;

First payload packet size for both forward and backward directions;

Flow duration; etc.

The working example includes 27 network traffic features.

3. Algorithm XGB is applied, as cited in the Information Disclosure Statement, see Tianqi Chen and Carlos Guestrin "XGBoost: A Scalable Tree Boosting System".

4. ROC curve and determining the point on ROC curve during training

In network traffic analytics, payload carrying flows are more important than Non-payload flows. In a binary classifier, if one class is more important rather than the other, the probability or the 'roc_threshold' value can be calibrated to reduce errors and to classify one class over the other. The binary classifier predicting Payload-Nonpayload is tuned by selecting 'roc_threshold' from the ROC (Receiver Operating Characteristic) curve. ROC provides a useful graphical representation to evaluate the performance of a binary classifier and tune the AI model. The ROC curve illustrates the trade-off between 'True Positive Rate' (tpr) and 'False Positive Rate' (fpr) for a predictive model using different probability thresholds or referred to as 'roc_threshold'. This threshold value can be obtained from the ROC curve, or the best threshold value can also be calculated using Youden's J statistic: j=tpr−fpr. Please refer to the paper by W. J. Youden "Index for Rating Diagnostic Tests" cited in the Information Disclosure Statement.

The value of 'roc_threshold' ranges from 0.0 to 0.5. For example, the value 0.5 for this parameter represents that the first level classifier would not admit any flow into the second level for further analysis, if the flow prediction probability for the non-payload flow class is >=50%.

In practice, the model is run multiple times (5 times is a reasonable example) on train-test split data, then the mean value of the ROC threshold may be assigned as the optimal ROC threshold. The train-test ratio starts with about 50%-50% and incrementally increases the training portion of the data by 10% until the ratio reaches around 90%-10%.

5. At the operation stage

During the operation stage, the aforementioned network features are used by the HXGB classifier for its model. The first level XGB classifier will admit flows with prediction probability greater than the ROC threshold into the second level XGB traffic type classifier for further classification, while classifying the remaining flows as Non-payload.

Examples of Training-Dataset-Growth Control

Figure 45:
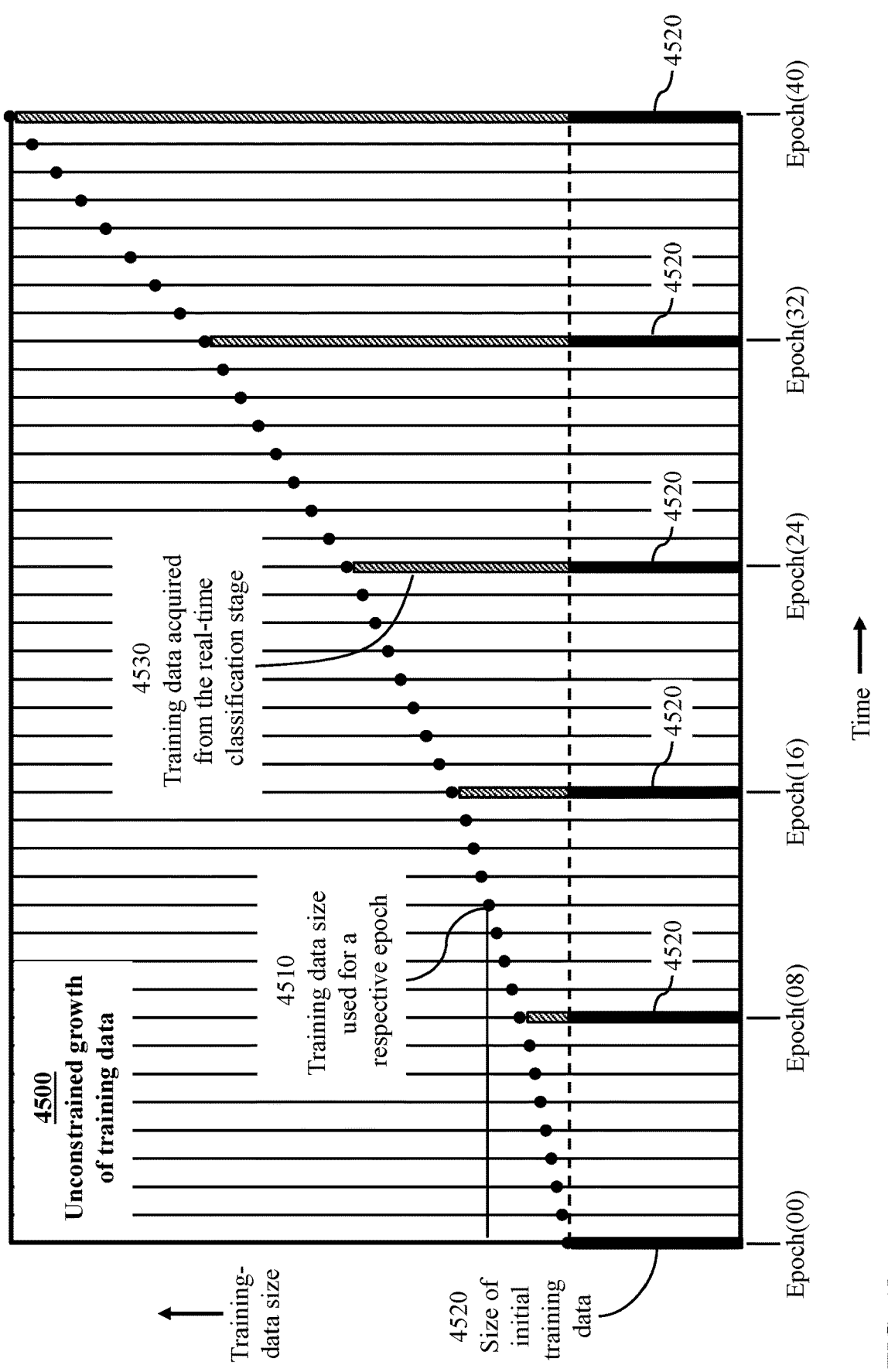
FIG. 45 illustrates growth of a training dataset with unconstrained inclusion of training data acquired from the real-time classification stages, in accordance with an embodiment of the present invention.

FIG. 45 illustrates an example 4500 of growth of a training dataset with unconstrained inclusion of training data acquired from the real-time classification stages over a period of 40 epochs of predetermined durations. The size 4510 of the training flow records at the beginning of each epoch succeeding Epoch(0) equals the sum of the size 4520 of an initial training dataset produced in Epoch(0) and the size 4530 of training data acquired from the real-time classification processes during preceding epochs.

Figure 46:
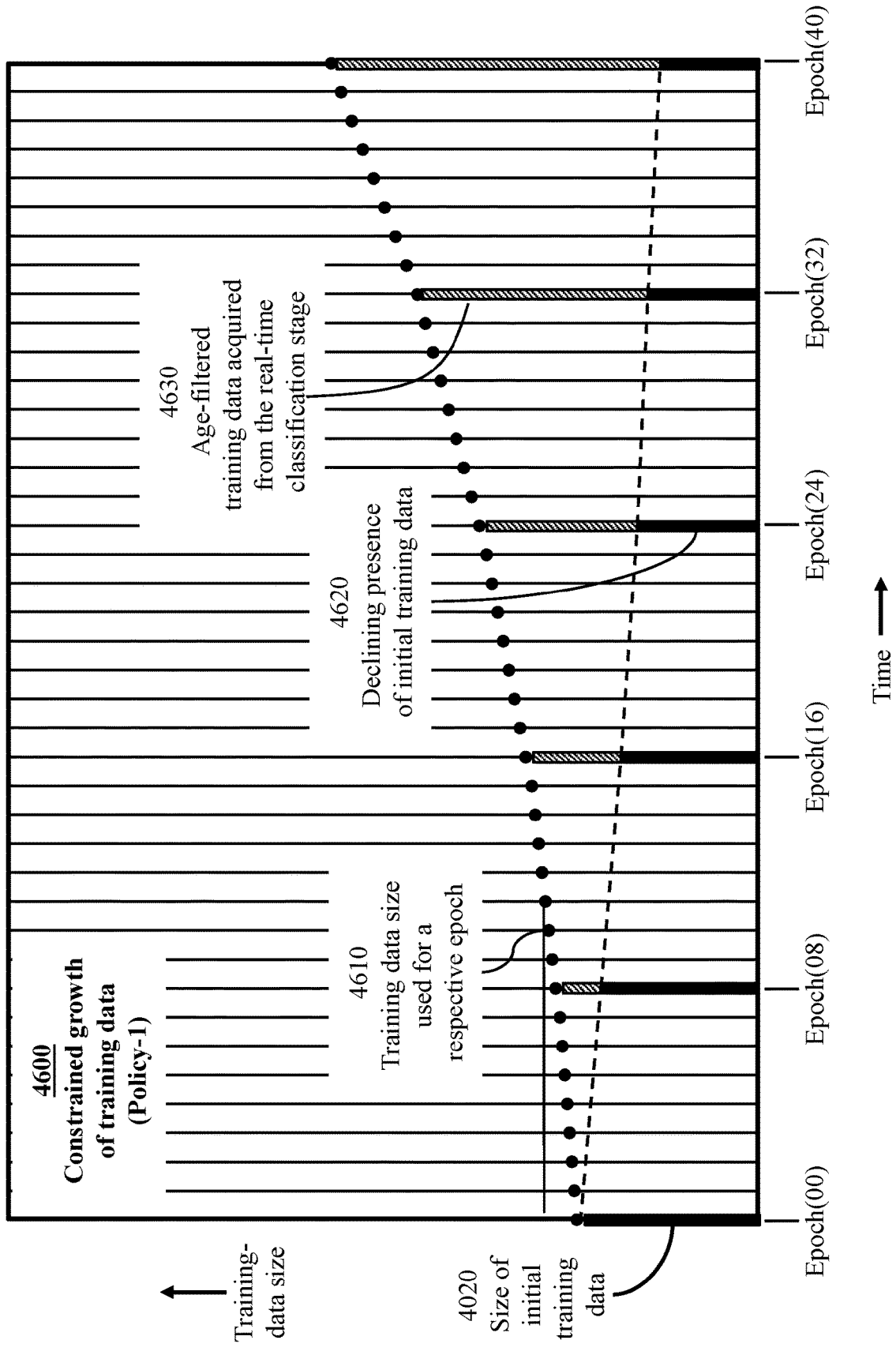
FIG. 46 illustrates growth of a training dataset with constrained inclusion of training data acquired from the real-time classification stages according to a first policy of age filtering of training data, in accordance with an embodi-ment of the present invention.

FIG. 46 illustrates an example 4600 of growth of a training dataset with constrained inclusion of training data acquired from the real-time classification stages according to a first policy of age filtering of training data. The size 4610 of the training flow records at the beginning of each epoch succeeding Epoch(0) equals the sum of the size 4620 of a subset of the initial training dataset 4520, selected according predefined rules, and the size 4630 of age-filtered training data extracted from the real-time classification stages of preceding epochs.

Figure 47:
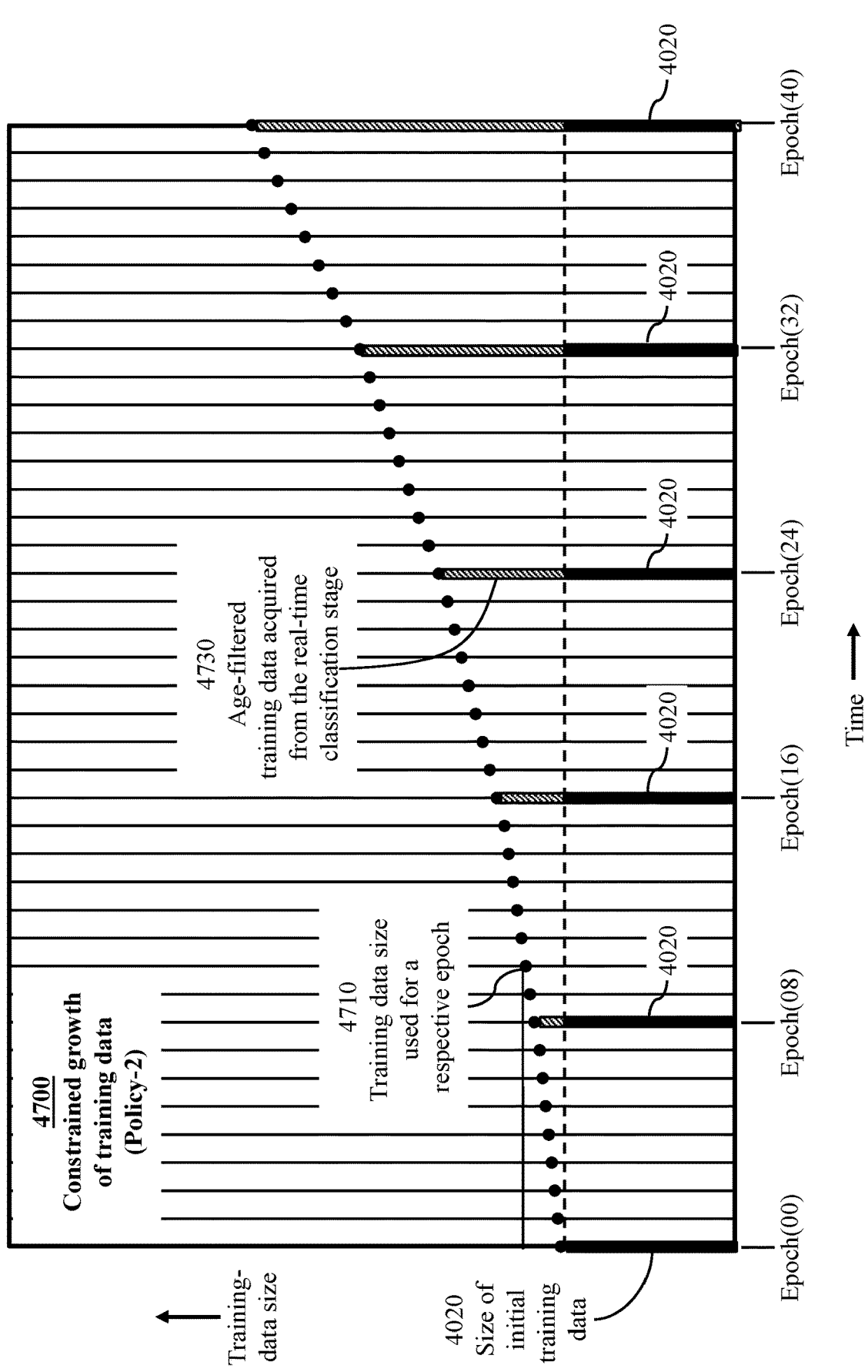
FIG. 47 illustrates growth of a training dataset with constrained inclusion of training data acquired from the real-time classification stages according to a second policy of age filtering of training data, in accordance with an embodiment of the present invention.

FIG. 47 illustrates an example 4700 of growth of a training dataset with constrained inclusion of training data acquired from the real-time classification stages according to a second policy of age filtering of training data. The size 4710 of the training flow records at the beginning of each epoch succeeding Epoch(0) equals the sum of the size 4520 of the initial training dataset and the size 4730 of age-filtered training data extracted from the real-time classification stages of preceding epochs.

The Modeler 770

Modeler 770 enables development, experimentation and validation of ML models for encrypted traffic classification. Modeler 770 is configured to support and create a ML pipeline with data pre-processing, transformation and a suitable ML algorithm. Feature selection, hyper-parameter tuning and various data transformations are utilized. Multiple iterations of ML models are built and iteratively evaluated to yield improved classification results. This process includes the analysis of results followed by modification of the pipeline or parameters and re-testing.

The Modeler provides a flexible platform to build and experiment with ML Models. The ability to select various pipeline functions and parameters are key to its design. The user creates an ML model using pipeline workflows, algorithm. and various parameters set in a configuration file.

ML pipeline functionalities and algorithms are based on existing libraries (e.g., scikit-learn, TensorFlow) or home-grown custom algorithms. Users are given an ability to experiment and build models using various machine learning pipelines and workflows. The final model may be exported in Open Neural Network Exchange (ONNX) format. The ONNX format allows the user to easily transition between various machine learning frameworks and tools and to leverage the capabilities of different platforms for the same ML models.

The Modeler 770 is configured to:

(d) Extract bi-directional flows and features for network traffic stored in unlabeled traffic-flows files. A set of 135 features (statistics) are computed for each network traffic flow. A flow is defined by a 5-tuple—Source IP address, Destination IP address, Source Port, Destination port and Protocol. A flow contains one or multiple packets. Flows in a network are bi-directional. Packets from the client to the server are part of forward flows (upstream flows). Packets from the server to the client are part of backward flows (downstream flows). Manipulate data and perform pre-processing of feature statistics computed in the earlier step. This includes data cleansing, creating balanced datasets, outlier detection and data augmentation.

(e) Create machine learning models based on user configurable ML pipelines. ML pipeline includes mechanism for data transformation, feature selection and model creation.

(f) Train an ML model and evaluate against test dataset and training dataset. Perform hyper-parameter optimization to identify model with best performance.

(g) Export the trained model to ONNX format for use in TrafficWiz Classifier for classification in a run-time environment.

(h) Create ML models to operate offline or in real-time. Offline operation is not performance-sensitive and the steps outlined above can be followed. However, for real-time operation, the ML models created above require additional fine tuning as there are time constraints on how long the Classifier 780 takes to classify a traffic flow in real-time. To enable a fast decision by the Classifier, the ML model built by Modeler 770 takes into account two key criteria:

(i) a decision needs to be made about the traffic class of the flow within the first 30 packets, or so. The system cannot wait for a large number (1000, for example) of packets in a flow, in the case of a Video Stream, for example. The system ensures the tradeoff and identifies that approximately 30 packets is sufficient to achieve the desired accuracy while meeting the performance constraints.

(ii) Computation of all 135 statistics is not practical in performance driven classification systems. As a result, the system of the present invention seeks to find the minimum number of statistics that can be computed without sacrificing accuracy. A sub-set of about 35 features (from about 135 features) achieves real-time classification performance while retaining accuracy to a desired level.

As outlined above, the ML pipeline supported by Modeler 770 includes a Feature Selection method using a genetic algorithm. The data features used to train the machine learning models have a significant influence on their performance. The irrelevant or partially relevant features can negatively impact the model performance. Feature selection is the process of reducing the number of input variables when developing a predictive model. The feature selection helps to reduce the computational cost of modeling and may improve the performance of the model.

After the feature computation, a sub-set of features are chosen for most effective prediction results. Thus, the 135 computed features are not required for best prediction for the classifier 780. A properly selected sub-set of features is sufficient. A feature selection algorithm for network flow feature selection is developed based on the use of Genetic Algorithms (GA), as will be described in more detail with regard to FIG. 49 below.

Genetic Algorithms are just one of a family of algorithms that aim to find optimal solutions to optimization problems. At a high level they share a general optimization process: candidate solutions are generated, evaluated, and ranked over many iterations, leading to high value or optimal results. Inspired by nature, candidate solutions in GAs are represented as strings of chromosomes and undergo genetic operations to produce subsequent generations of candidates. Two such genetic operations are mutation, which alters a single gene, and reproduction through crossover, which combines the genetic sequences of two parents to create two offspring.

The problem of flow feature selection is to choose the subset of features that provide the best result on the desired task. Candidate solutions are encoded as sequences of Boolean variables, indicating the presence or absence of a particular feature. In a bit string 0 and 1 will indicate inclusion or exclusion of one feature. Initially, a pool of several-hundred candidate solutions is created by random selection. Each iteration of the algorithm ranks the current set of candidate solutions and generates a new set through genetic operations. In this case, the ranking process is to train and test a classification model using the subset of features specified by the candidate solution, using the F1 score of a test set as an evaluation metric. Creation of the next generation involves repeatedly selecting two parent candidate solutions from the ranked list and applying mutation and crossover to produce new candidate solutions; higher scoring candidates are chosen to be parents with proportionately higher probability. The next iteration begins once enough solutions have been generated, and continues until the solution converges or for a fixed number of iterations.

Figure 48:
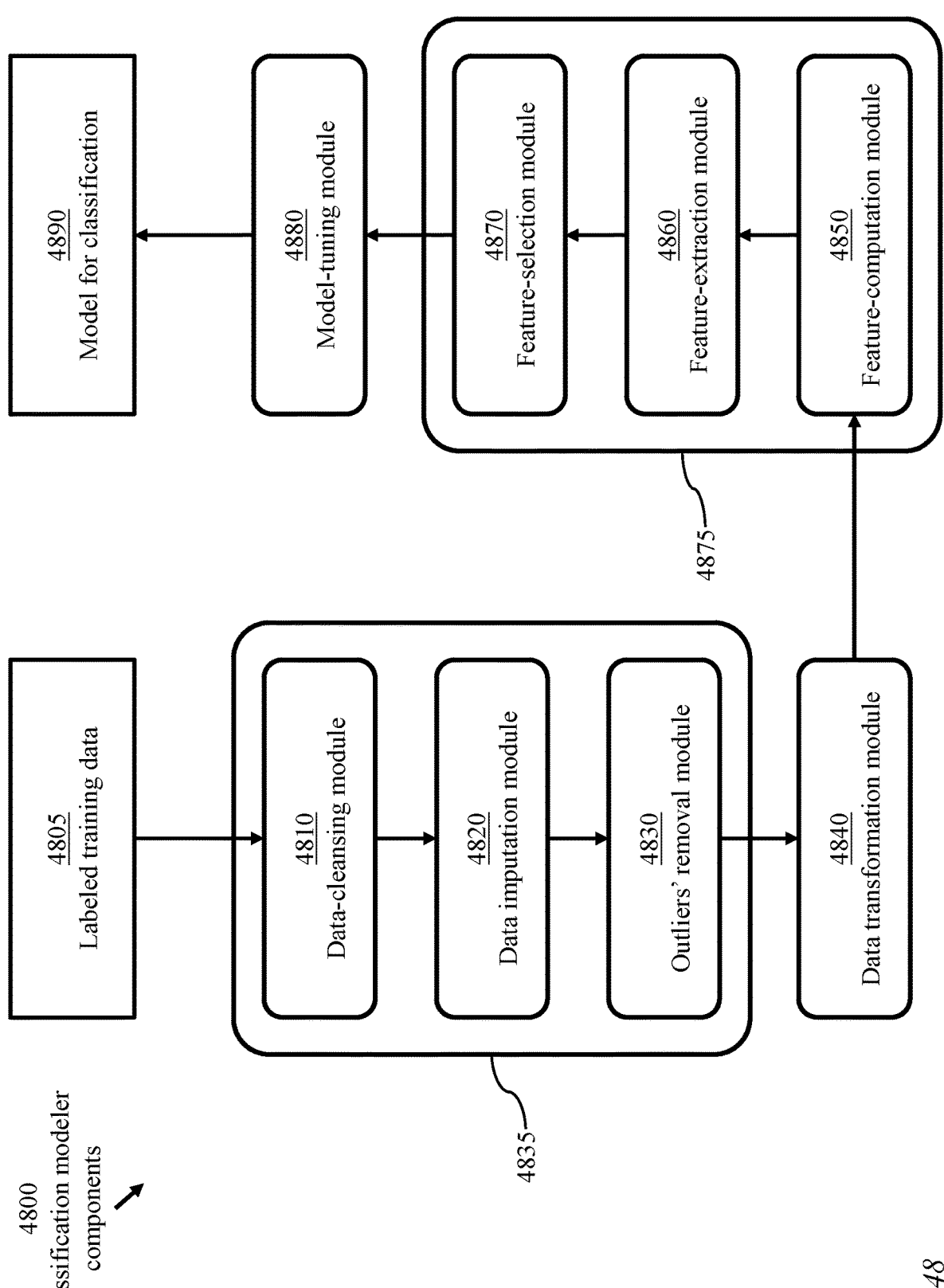
FIG. 48 illustrates a machine-learning pipeline for syn-thesizing a modeler to be used when developing an AI model for real-time classification of clients' flow, in accordance with an embodiment of the present invention.

FIG. 48 illustrates a machine-learning pipeline 4800 for synthesizing modeler 770. A storage medium 4805 holds labeled flow records received from labeler 760. A set of pre-processing modules 4835 includes a data-cleansing module 4810, a data imputation module 4820, and a module 4830 for removing flow records considered to be outliers. The set of pre-processing modules 4835 may not be needed if data cleansing, imputation, and filtering to remove outliers are performed in the training phase. A set of feature-related modules 4875 includes a feature-computation module 4850, a feature-extraction module 4860, and a feature-selection module 4870.

A data-transformation module 4840 prepares the pre-processed data, received from modules 4835, for processing in the feature-related modules. A model-tuning module 4880 prepares the model for use in real-time classification of clients' unlabeled flow data. A memory device 4890 holding an encoded modeler.

FIG. 49 illustrates a method 4900 for network feature selection using a genetic algorithm, and creating a machine learning classification model for the Modeler 770 based on the selected network features, for use in the Classifier 780.

Upon Start of the method 4900, N network traffic features characterizing the encrypted network traffic are collected/obtained, and an input (initial) set of candidate solutions is formed, which is a set of randomly selected traffic features, from the N network traffic features (box 4910). The input set of candidate solutions is feed in the genetic algorithm, performing crossover and mutations operations on the input set of candidate solutions (box 4920), and outputting an output set of candidate solutions, which is an output set of selected network features (arrow from box 4920 to box 4930).

Next, respective classification machine learning models for classification of the encrypted network traffic are created, corresponding to the output set of selected network features (box 4930). The classification models are trained and evaluated, where, for each model, an accuracy of classification results by each model is determined and compared with ground truth network traffic classification results (box 4940). Provided exit criteria for terminating the method have not been met (Exit No from box 4950), the output set of candidate solutions is assigned as the input set of candidate solutions, and the steps (b) to (d) are repeated (arrow from box 4950 to box 4920).

Provided exit criteria for terminating the method have been met (exit Yes from box 4950), choosing such machine learning model based on selected output network features that provides the highest accuracy, or highest ranking (box 4960), followed by termination of the method 4900. Exit criteria in box 4950 may include a predetermined number of iterations, or a predetermined accuracy of the classification model with the highest ranking. If the accuracy of the classification model with the highest ranking is still below a predetermined required accuracy, exit criteria may be updated for example by increasing the number of iterations, or increasing the total number of N network features. For example, we had about 30 network traffic features when we started our experiments. Then we have added more than 100 network traffic features after conducting a research for over 3 months. AI ternatively, we may have over 100 network traffic features available at the beginning, but decided to use only a subset of the features for reducing computational time, which number is further reduced by the genetic algorithm.

A total number of collected network traffic features may be fairly large, for example around or below a few hundred features, for example below or equal to N=500 features. Some features such as byte distribution alone may contain 256 features. AI ternatively, N may be chosen equal to about 135; or N may be in a range from about N=70 to about N=150; or N may be in a range from about N=30 to about N=135.

The reduced number M of network traffic features after the genetic algorithm has been from about 10 to about 30 features in our experiments, with about 30 features being used for 100 Gbps network traffic, and about 10 features being used for Tb/s network traffic.

Another factor is a number of packets monitored to compute the statistics/feature in each flow. For currently available computational processing powers, to achieve 1 Tbit/second, not only M should be around 10 features, but the number of packets used to compute the features should be limited to 15-40 packets. Using less than 15 packets could provide speed but reduces accuracy. It is understood that the number M of selected features, and the number of packets may be increased in the future as the computational power of processors increases. In general, the number of M selected network features and the number of monitored packets for each network feature are selected experimentally, depending on the data flow rate of the network traffic: for the same processing power, the higher is the data flow rate of the network traffic, the lower is the number of M selected features and the lower is the number of monitored packets. The lowest number of M selected features and the monitored packets is determined by a low threshold of an acceptable accuracy.

Figure 50:
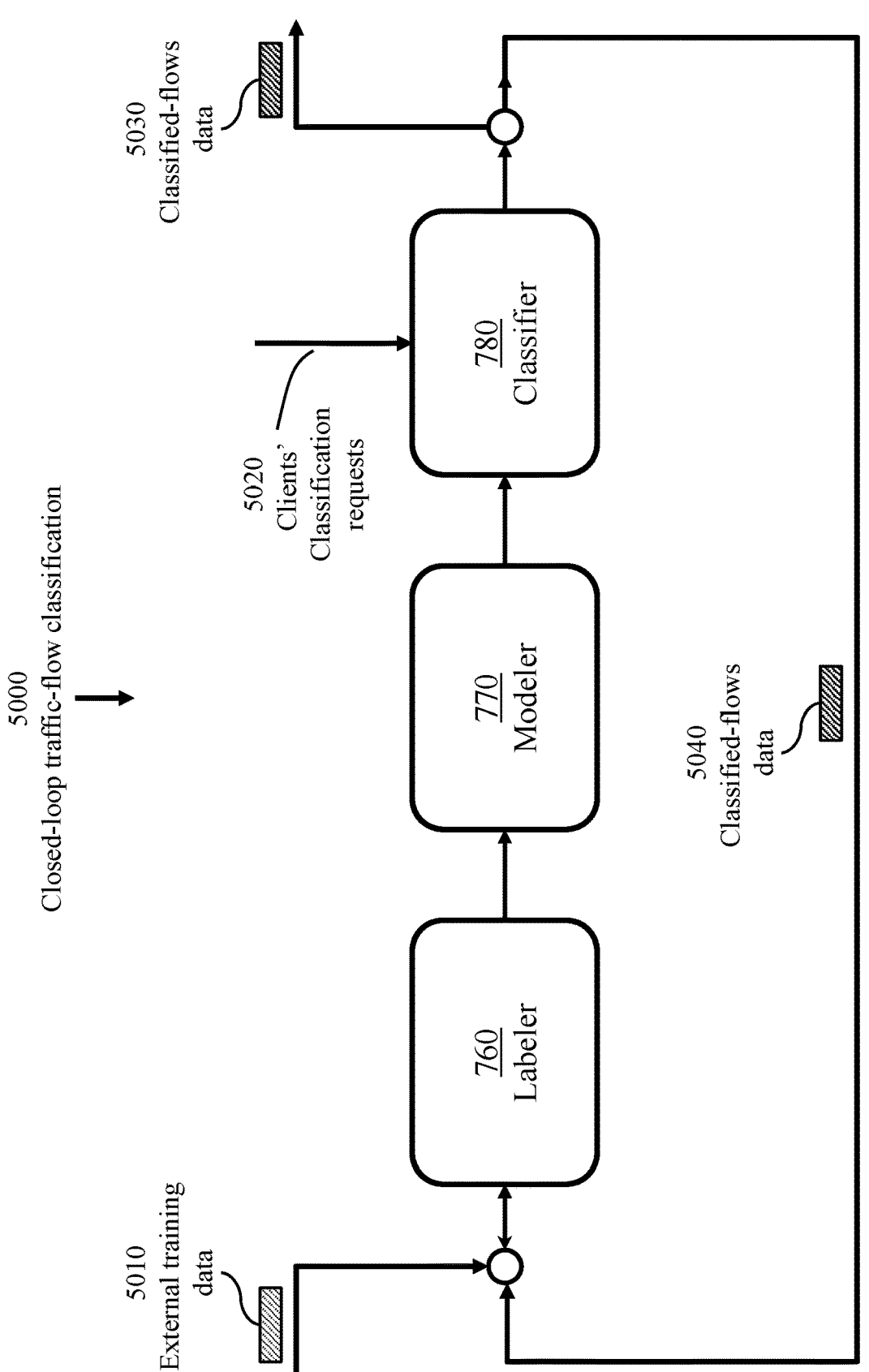
FIG. 50 illustrates a closed-loop flow-classification arrangement of a labeler, a modeler, and a classifier, in accordance with an embodiment of the present invention.

FIG. 50 illustrates a closed-loop flow-classification arrangement 5000 of a labeler 760, a modeler 770, and a classifier 780. The labeler receives external training data 5010 in addition to data relevant to classified clients-defined flows which is feedback to the labeler to be used as training data. Clients' classification requests 5020 are processed to produce classified-flow data 5030 sent to clients. Classified-flow data 5040 are sent to the labeler for use as additional training data.

FIG. 51 illustrates a method 5100 of concurrent activation of labeler 760, synthesis of modeler 770, and real-time classification at classifier 780 as illustrated in FIG. 40. Definitions of the notations Φ, Λ, Θ, ΣΛ, and ΣΘ are indicated in the figure. Process 5110 initializes variables. Process 5120 receives fresh training data. Process 5130 branches to process 5140 to activate the labeler if any fresh training data has not been processed. Otherwise, process 5160 determines if there is a sufficient number of labeled flows to synthesize the modeler in process 5170. Process 5175 continuously receive clients' classification requests which are processed in the classifier (reference 5180). Process 5150 and process 5190 update results.

The following notation is used in FIG. 51:

Φ: Fresh training flow data

Λ: Labeled flow data of Φ

Θ: Classified flow data derived from clients' classification requests

ΣΛ: Cumulative value of Λ

ΣΘ: Cumulative value of Θ

Process 5110 initializes ΣΛ and ΣΘ. Process 5120 receives fresh training data, Φ, at different instants of time which may be irregularly spread in the time domain. A received collection of training-flows records is preferably, or inevitably, handled as successive samples of limited sizes (limited number of records) each, as illustrated in FIG. 26. Thus, upon receiving such a collection, process 5130 determines whether the entire collection is presented to the labeler 760. If there are pending training training-flow records, the labeler is activated in process 5140 to produce more labeled flow records Λ and process 5150 updates ΣΛ according to results of process 5140. If the entire collection has been processed in the labeler 760, process 2160 determines whether a sufficient number of labeled records, at least equal to a predefined value $\Sigma_{min}$, has been reached.

If ΣΛ is less than, $\Sigma_{min}$, process 5120 is revisited to wait for receiving more training data. Otherwise, process 5170 is activated to synthesize an updated modeler 770. The updated modeler is used in process 5180 to classify clients-specified flow records extracts from received classification requests of process 5175. Upon updating ΣΘ in process 5190, process 5170 is revisited. Meanwhile, independent process 5120 and process 5175 continue ad infinitum to receive training data and clients' requests, respectively.

In general, Encrypted network traffic flows are analyzed using multiple techniques including:

(1) Clustering of flow data using unsupervised machine learning clustering algorithm Density-based Spatial Clustering of Applications with Noise (DBSCAN);

(2) Mapping IP address to DNS name to obtain results from reverse-DNS (IP address to DNS name mapping is used to infer flow network traffic type);

(3) Extracting Server Name Indicators from TLS traffic exchange (also used to infer flow network traffic type);

(4) Obtaining results from Deep Packet Inspection software (also used to infer flow network traffic type);

(5) Using previously trained supervised ML model, and (6) Inspecting network traffic characteristics including for example packet sizes, total bytes, number of packets, flow duration, bit rate in both forward and backward directions.

Applying the above techniques facilitates suggesting a label for a traffic flow.

The results may be collectively used to infer a label for a network traffic flow.

A proposed heuristic attempts to identify a particular class of traffic by analyzing its traffic characteristics using a set of rules. Table 1 presents results for six traffic classes (Audio Chat, Video Stream, Audio Stream, Text Chat, Video Chat and Peer-to-Peer).

TABLE 1

| Traffic Type | Payload Character | Filter Applied | Feature Criteria Reference |
|---|---|---|---|
| | | | Results of applying a labeling heuristic for common payload flows. |
| Audio Chat | Both directions | Total time ≥2 | The 'mean packet size' forward and backward are comparable - between 100 and 200 bytes. The flow 'packet count' forward and backward are approximately the same for mobile and wireline data. They are comparable and usually more than 1000. The 'flow payload size' forward and backward are large (e.g. flow payload size in one direction should be more than 0.1 MB) |
| Video Stream | Backward direction | Total time ≥2 | The 'mean packet size' forward is less than 100, and 'mean packet size' backward is more than 1000. The 'flow payload size' backward is significantly larger than forward direction. The rate is usually more than 400 kbps. |
| Audio Stream | Backward direction | Total time ≥2 | The 'mean packet size' forward is less than 100, and 'mean packet size' backward is more than 1000. The flow duration is usually more than 10 s. The rate is more than 1.6 kbps but less than 150 kbps. If rate is greater than 150 kbps but the flow duration is less than 30 s then these flows are still strong candidate of payload data. |
| Text Chat | Both directions | Total time ≥2 | The 'mean packet size' forward and backward should be around 100 and comparable. The flow 'packet count' forward and backward are comparable and more than 10. The flow duration is usually more than 5 s. The rate can be very small and usually less than 10 kbps. |
| Video Chat | Both directions | Total time ≥2 | The 'mean packet size' forward and backward should be similar and more than 500. The flow 'packet count' forward and backward is comparable. The flow duration is usually more than 10 s. The rate is usually more than 1000 kbps. |
| Peer-to-Peer | Both directions | Total time ≥5 | The rate is usually more than 100 kbps. One direction of 'mean packet size' is usually over 1000, the opposite direction is usually less or around 100 The flow duration is usually more than 10 s. |

Salting

It has been found experimentally that adding a small fraction of network flows from the real-time encrypted traffic from the deployment site to the training data set, improves the performance of the Labeler 760. The fraction of the network flows needs to be representative of all types of all real-time encrypted traffic flows and substantially smaller than the training data set. We refer to this technique as "salting".

Consider two datasets, dataset-A and dataset-B, which are captured separately from network traffic at different times and different locations. When a model is trained on dataset (A) and tested on dataset (B), the performance of the classification model is lower than when the same model is trained on one portion of dataset-A and tested on another portion of dataset-A.

In a salting process, a small portion (0.02 to 0.05) of dataset-B, covering all the traffic types, is added to the training dataset-A on which the model is to be trained. When the model is trained on the new augmented dataset, comprising dataset-A plus a relatively small number of flows of dataset-B, the model also learns the temporal and spatial characteristics of dataset-B. As a result, the trained model can predict the traffic classes with higher accuracy.

In a test case, a dataset containing 5 traffic classes was used to train the model; the traffic classes being audio chat, audio stream, peer-to-peer, text chat, and video stream. The training dataset-A was captured in year 2020 on a wireline network. Dataset-B also consists of same set of traffic classes but was captured in the year 2019 on a wireline network.

In test-case-1 (Table-A), a model using a Random Forest classifier is trained on dataset-A and tested on dataset B, and the overall performance (F1-Score) of the model was determined as 67.6%. However, when a small portion of dataset-B (0.02 to 0.05) is added to training dataset-A and tested on the remaining part of dataset-B, a significant increase in overall F-score of the model is observed (test-case-2, test-case-3). Using the same methodology, in test-case-4, test-case-5, and text case-6, similar results were observed but with a different model using an XGBoost classifier.

TABLE A

| Test case | Training Dataset | Test Dataset | Model | F1-Score (%) |
|---|---|---|---|---|
| | | Test cases based on dataset A and B | | |
| 1 | A | B | Random | 67.6 |
| 2 | A + 2% flows of B | 98% flows of B | Forest | 85.79 |
| 3 | A + 5% flows of B | 95% flows of B | Classifier | 87.19 |
| 4 | A | B | XGBoost | 58.65 |
| 5 | A + 2% flows of B | 98% flows of B | Classifier | 84.14 |
| 6 | A + 5% flows of B | 95% flows of B | | 85.83 |

In another example, the same experiment was repeated but with different test dataset (Table-2). In this experiment a dataset-C was used as a test dataset, which was captured in year 2020 using a 5G network.

TABLE B

| Test case | Training Dataset | Test Dataset | Model | F1-Score (%) |
|---|---|---|---|---|
| | | Test cases based on dataset A and C | | |
| 1 | A | C | Random | 73.11 |
| 2 | A + 2% flows of C | 98% flows of C | Forest | 85.12 |
| 3 | A + 5% flows of C | 95% flows of C | Classifier | 86.55 |
| 4 | A | B | XGBoost | 69.65 |
| 5 | A + 2% flows of C | 98% flows of C | Classifier | 85.09 |
| 6 | A + 5% flows of C | 95% flows of C | | 86.13 |

In test-Case-1 (Table-B), the model using a random forest classifier is trained on dataset A and tested on dataset C, and the over all performance (F1-Score) of the model is 73.11%. However, when a small portion of dataset-C is added to training dataset A, and tested on the remaining dataset, a significant increase in overall F1-score of the model (Test case2, testcase-3). Using the same methodology, in test case-4, test case-5, and test case-6, similar results were observed but with a different model using XGBoost classifier.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Methods and systems of the present invention have tangible and practical advantages, providing more expedient and more reliable identification of network topology, and classification and identification of devices in networks.

Systems and apparatus of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of classifying encrypted dataflows in a data network, the method comprising:

employing a hardware network appliance incorporating a machine-learning mechanism to capture a seed set of encrypted dataflows and extract, from each encrypted dataflow, respective metadata;

obtaining from said respective metadata measurable characteristics of said each encrypted dataflow;

initializing a count and a set of approved labels as an empty set;

repeatedly, until a completion condition is met, performing a training procedure of:

increasing said count;

generating for a randomly selected encrypted dataflow of said seed set a respective set of label suggestions based on respective measurable characteristics;

where said count is an integer multiple of a specified spacing integer and said set of approved labels contains at least a predetermined number of approved labels, training a semi-supervised machine-learning model to generate an additional label suggestion, based on said set of approved labels, to be added to said respective set of label suggestions;

determining whether any label suggestion of said respective set of label suggestions is a valid label suggestion to be appended to said set of approved labels while removing said randomly selected encrypted dataflow from said seed set;

and continually receiving requests to classify fresh dataflows and producing respective classifications using said semi-supervised machine-learning model;

thereby facilitating enhanced operation and security of the data network.

2. The method of claim 1, wherein said generating is based on comparing measurable dataflow characteristics, determined through detection of encrypted dataflow patterns, with characteristics of a specified set of recognized dataflow classifications.

3. The method of claim 1, further comprising appending said respective classifications to said set of approved labels during successive epochs of prescribed durations:

thereby maintaining continuously updated labeled dataflows.

4. The method of claim 1, wherein said completion condition is one of:

a number of remaining encrypted dataflows of said seed set of encrypted dataflows is less than a predetermined lower bound; and a succession of a predetermined number of executing said performing said training procedure fails to produce any further approved label.

5. The method of claim 2, wherein said measurable encrypted dataflow characteristics comprise:

a range of values, a mean value, and a standard deviation of a packet size;

a range of values, a mean value, and a standard deviation of packet inter-arrival time;

a measure of randomness of packet sizes; and a measure of randomness of packet inter-arrival time.

6. The method of claim 2, wherein said recognized dataflow classifications comprise a set of homogeneous dataflows, and predefined composite dataflows each formed as a multiplex of a respective subset of the set of homogeneous dataflows, the homogeneous dataflows comprising one or more of the following:

an audio stream; an audio conversation; a one-directional text; a two directional text; a file transfer; an e-mail message; a point-to-point communication; a web browsing session; a low-resolution video-stream of a first type; and a high-definition video stream.

7. The method of claim 2, further comprising producing a further label suggestion based on using an unsupervised learning algorithm.

8. The method of claim 2, further comprising determining said respective set of label suggestions, based on respective measurable characteristics, according to a set of rules.

9. The method of claim 1, further comprising using a label spreading algorithm for training said semi-supervised machine learning model.

10. The method of claim 1, further comprising performing a two-view co-training process for training said semi-supervised machine learning model employing a first labeler based on packet-size parameters of encrypted packets, and a second labeler based on packet inter-arrival time parameters of encrypted packets.

11. The method of claim 10, further comprising:

supplying training data to the first labeler comprising cumulative labeled encrypted dataflows determined at the first labeler in addition to switched labeled encrypted dataflows of a respective most-recent subset of a predetermined number of encrypted dataflows of said seed set determined at the second labeler; and supplying training data to the second labeler comprising cumulative labeled encrypted dataflows determined at the second labeler in addition to switched labeled encrypted dataflows of a respective most-recent subset of said predetermined number of encrypted dataflows of said seed set determined at the first labeler.

12. The method of claim 10, further comprising:

supplying training data to the first labeler comprising cumulative labeled encrypted dataflows determined at the first labeler in addition to switched cumulative labeled encrypted dataflows determined at the second labeler; and supplying training data to the second labeler comprising cumulative labeled encrypted dataflows determined at the second labeler in addition to switched cumulative labeled encrypted dataflows determined at the first label.

13. The method of claim 1, wherein said seed set of encrypted dataflows excludes detected encrypted dataflows determined to be outliers according to respective criteria.

14. The method of claim 1, further comprising:

configuring said network appliance as a geographically distributed appliance, comprising a central training module and multiple operational modules connected in a star configuration to the central training module through said data network;

at said central training module:

executing said processes of repeatedly performing said training procedure; and distributing said semi-supervised machine-learning model to the operational modules;

and at said operational modules:

processing requests from respective users for classifying respective fresh encrypted dataflows; and communicating resulting classifications to said central training module;

thereby realizing classifications based on current labeled encrypted dataflows.

15. A hardware network appliance for classifying encrypted dataflows in a data network, comprising:

a training component comprising a machine-learning mechanism configured to:

acquire, through a first network interface, a seed set of encrypted dataflows;

extract, from each encrypted dataflow, of said seed set, respective metadata;

obtain from said respective metadata measurable characteristics of said each dataflow;

initialize a count and a set of approved labels as an empty set;

repeatedly, until a completion condition is met:

increase said count;

generate for a randomly selected dataflow of said seed set a respective set of label suggestions based on respective measurable characteristics;

where said count is an integer multiple of a specified spacing integer and said set of approved labels contains at least a predetermined number of approved labels, train a semi-supervised machine learning model to generate an additional label suggestion, based on said set of approved labels, to be added to said respective set of label suggestions;

and determine whether any label suggestion of said respective set of label suggestions is a valid label suggestion to be appended to said set of approved labels while removing said randomly selected encrypted dataflow from said seed set;

and an operational component configured to classify fresh encrypted dataflows using said semi-supervised machine-learning model.

16. The network appliance of claim 15, wherein said set of label suggestions is based on comparing measurable dataflow characteristics, determined through detection of encrypted dataflow patterns, with characteristics of a specified set of recognized dataflow classifications.

17. The network appliance of claim 15, wherein said operational component is further configured to append resulting classifications of said operational component to said set of approved labels of the training component during each of successive epochs of prescribed durations;

thereby maintaining continuously updated training data.

18. The network appliance of claim 16, wherein said training component is configured to produce a further label suggestion based on using an unsupervised learning algorithm.

19. The network appliance of claim 15, wherein said training component is further configured to use a label spreading algorithm to train said semi-supervised machine learning model.

20. The network appliance of claim 15, wherein said training component is further configured to perform a two-view co-training process to train said semi-supervised machine learning model employing a first labeler based on packet-size parameters of encrypted packets and a second labeler based on packet inter-arrival time parameters of encrypted packets.

* * * * *